(12) United States Patent
Tran

(10) Patent No.: US 9,015,504 B2
(45) Date of Patent: Apr. 21, 2015

(54) MANAGING POWER OF THREAD PIPELINES ACCORDING TO CLOCK FREQUENCY AND VOLTAGE SPECIFIED IN THREAD REGISTERS

(75) Inventor: Thang Tran, Austin, TX (US)

(73) Assignee: Texas Instruments Incorporated, Dallas, TX (US)

(*) Notice: Subject to any disclaimer, the term of this patent is extended or adjusted under 35 U.S.C. 154(b) by 866 days.

(21) Appl. No.: 12/986,127

(22) Filed: Jan. 6, 2011

(65) Prior Publication Data

US 2011/0099393 A1 Apr. 28, 2011

Related U.S. Application Data

(60) Division of application No. 11/466,621, filed on Aug. 23, 2006, now Pat. No. 7,890,735, and a continuation-in-part of application No. 11/210,428, filed on Aug. 24, 2005, now Pat. No. 7,328,332, and a continuation-in-part of application No. 11/210,354, filed on Aug. 24, 2005, now Pat. No. 7,752,426, said application No. 11/466,621 is a continuation-in-part of application No. 11/133,870, filed on May 18, 2005, now abandoned.

(60) Provisional application No. 60/712,635, filed on Aug. 31, 2005, provisional application No. 60/605,846, filed on Aug. 30, 2004, provisional application No. 60/605,837, filed on Aug. 30, 2004.

(51) Int. Cl.
| | |
|---|---|
| *G06F 1/32* | (2006.01) |
| *G06F 9/46* | (2006.01) |
| *G06F 9/38* | (2006.01) |
| *G06F 9/32* | (2006.01) |
| *G06F 9/30* | (2006.01) |

(52) U.S. Cl.
CPC .............. *G06F 9/3851* (2013.01); *G06F 9/324* (2013.01); *G06F 1/3296* (2013.01); *G06F 1/324* (2013.01); *G06F 9/30181* (2013.01); *G06F 9/3822* (2013.01); *G06F 9/3838* (2013.01); *G06F 9/3861* (2013.01); *G06F 9/3885* (2013.01); *G06F 9/3857* (2013.01)

(58) Field of Classification Search
None
See application file for complete search history.

(56) References Cited

U.S. PATENT DOCUMENTS

| | | | |
|---|---|---|---|
| 5,212,777 A | 5/1993 | Gove et al. | |
| 5,239,654 A | 8/1993 | Ing-Simmons et al. | |

(Continued)

FOREIGN PATENT DOCUMENTS

WO WO 01/46827 A1 6/2001

OTHER PUBLICATIONS

European Patent Office, Supplementary European Search Report and Annex thereto, issued Sep. 7, 2009, 9 pages.

(Continued)

*Primary Examiner* — Kenneth Kim
(74) *Attorney, Agent, or Firm* — Lawrence J. Bassuk; Frederick J. Telecky, Jr.

(57) ABSTRACT

A multi-threaded microprocessor for processing instructions in threads, including, in one embodiment, (1) at least one processor pipeline for the instructions; (2) a storage for a thread power management configuration; and (3) a power control circuit coupled to said at least one processor pipeline and responsive to said storage for thread power management configuration to control power used by different parts of the at least one processor pipeline depending on the threads, wherein said power control circuit is operable to establish different power voltages in different parts of the at least one processor pipeline depending on the threads.

5 Claims, 33 Drawing Sheets

(56) References Cited

U.S. PATENT DOCUMENTS

| | | | |
|---|---|---|---|
| 5,287,467 A | 2/1994 | Blaner et al. | |
| 5,371,896 A | 12/1994 | Gove et al. | |
| 5,404,469 A | 4/1995 | Chung et al. | |
| 5,522,083 A | 5/1996 | Gove et al. | |
| 5,613,146 A | 3/1997 | Gove et al. | |
| 5,696,913 A | 12/1997 | Gove et al. | |
| 5,761,723 A | 6/1998 | Black et al. | |
| 5,822,575 A | 10/1998 | Tran | |
| 5,933,627 A | 8/1999 | Parady | |
| 5,935,241 A | 8/1999 | Shiell et al. | |
| 5,978,906 A | 11/1999 | Tran | |
| 6,021,489 A | 2/2000 | Poplingher et al. | |
| 6,081,887 A | 6/2000 | Steely, Jr. et al. | |
| 6,105,127 A | 8/2000 | Kimura et al. | |
| 6,151,668 A | 11/2000 | Pechanek et al. | |
| 6,185,676 B1 | 2/2001 | Poplingher et al. | |
| 6,189,091 B1 | 2/2001 | Col et al. | |
| 6,205,519 B1 | 3/2001 | Aglietti et al. | |
| 6,272,616 B1 | 8/2001 | Fernando et al. | |
| 6,272,623 B1 | 8/2001 | Talcott | |
| 6,430,674 B1 | 8/2002 | Trivedi et al. | |
| 6,446,191 B1 | 9/2002 | Pechanek et al. | |
| 6,526,502 B1 | 2/2003 | Col et al. | |
| 6,553,488 B2 | 4/2003 | Yeh et al. | |
| 6,609,193 B1 * | 8/2003 | Douglas et al. | 712/219 |
| 6,631,439 B2 | 10/2003 | Saulsbury et al. | |
| 6,697,935 B1 | 2/2004 | Borkenhagen et al. | |
| 6,745,323 B1 | 6/2004 | Sinharoy | |
| 6,766,441 B2 | 7/2004 | Sinharoy | |
| 6,795,845 B2 | 9/2004 | Kalafatis et al. | |
| 6,795,909 B2 | 9/2004 | Barry et al. | |
| 6,816,961 B2 | 11/2004 | Rice et al. | |
| 6,829,713 B2 * | 12/2004 | Cooper et al. | 713/320 |
| 6,850,961 B2 | 2/2005 | Kalafatis et al. | |
| 6,868,490 B1 | 3/2005 | Barry et al. | |
| 6,871,275 B1 | 3/2005 | Poplingher et al. | |
| 6,886,093 B2 | 4/2005 | Henry et al. | |
| 6,889,319 B1 | 5/2005 | Rodgers et al. | |
| 6,892,295 B2 | 5/2005 | Saulsbury | |
| 6,904,511 B2 | 6/2005 | Kokenek et al. | |
| 6,912,608 B2 | 6/2005 | Wolff et al. | |
| 6,915,414 B2 | 7/2005 | Yearsley et al. | |
| 6,938,147 B1 | 8/2005 | Joy et al. | |
| 6,981,077 B2 | 12/2005 | Modelski et al. | |
| 6,981,261 B2 | 12/2005 | Kalafatis et al. | |
| 6,988,181 B2 | 1/2006 | Saulsbury et al. | |
| 7,013,400 B2 * | 3/2006 | Kalla et al. | 713/320 |
| 7,051,329 B1 | 5/2006 | Boggs et al. | |
| 7,111,296 B2 | 9/2006 | Wolrich et al. | |
| 7,155,600 B2 | 12/2006 | Burkey et al. | |
| 7,219,349 B2 | 5/2007 | Merchant et al. | |
| 7,237,088 B2 | 6/2007 | Barry et al. | |
| 7,266,674 B2 | 9/2007 | Carrie | |
| 7,383,426 B2 * | 6/2008 | Chung et al. | 712/220 |
| 7,418,576 B1 | 8/2008 | Lindholm et al. | |
| 7,523,330 B2 * | 4/2009 | Golla et al. | 713/322 |
| 7,770,034 B2 * | 8/2010 | Nanja | 713/300 |
| RE41,703 E | 9/2010 | Pechanek et al. | |
| 2002/0019928 A1 | 2/2002 | Saulsbury et al. | |
| 2002/0023201 A1 | 2/2002 | Saulsbury et al. | |
| 2002/0031166 A1 | 3/2002 | Subramanian et al. | |
| 2002/0120798 A1 | 8/2002 | Modelski et al. | |
| 2002/0144082 A1 | 10/2002 | Barry et al. | |
| 2003/0046462 A1 | 3/2003 | Wolff et al. | |
| 2003/0074542 A1 | 4/2003 | Sasagawa | |
| 2003/0079109 A1 | 4/2003 | Pechanek et al. | |
| 2004/0088488 A1 | 5/2004 | Ober et al. | |
| 2004/0153634 A1 | 8/2004 | Barry et al. | |
| 2004/0162971 A1 | 8/2004 | Joy et al. | |
| 2004/0193857 A1 | 9/2004 | Miller et al. | |
| 2004/0215932 A1 | 10/2004 | Burky et al. | |
| 2004/0215984 A1 | 10/2004 | Kalla et al. | |
| 2004/0216101 A1 | 10/2004 | Burky et al. | |
| 2004/0216113 A1 | 10/2004 | Armstrong et al. | |
| 2004/0243868 A1 | 12/2004 | Toll et al. | |
| 2005/0005088 A1 | 1/2005 | Yearsley et al. | |
| 2005/0027438 A1 | 2/2005 | Rockett et al. | |
| 2005/0027793 A1 | 2/2005 | Hass | |
| 2005/0027975 A1 | 2/2005 | Frommer et al. | |
| 2005/0125629 A1 | 6/2005 | Kissell | |
| 2005/0125795 A1 | 6/2005 | Kissell | |
| 2005/0149936 A1 | 7/2005 | Pilkington | |
| 2005/0177703 A1 | 8/2005 | Norden et al. | |
| 2005/0240936 A1 | 10/2005 | Jones et al. | |
| 2006/0004989 A1 | 1/2006 | Goila | |
| 2006/0004995 A1 | 1/2006 | Hetherington et al. | |
| 2006/0005051 A1 | 1/2006 | Goila et al. | |
| 2006/0020831 A1 | 1/2006 | Goila et al. | |
| 2006/0123251 A1 | 6/2006 | Nakajima et al. | |
| 2006/0136915 A1 | 6/2006 | Aingaran et al. | |
| 2006/0136919 A1 | 6/2006 | Aingaran et al. | |
| 2006/0190703 A1 | 8/2006 | Carrie | |
| 2006/0224860 A1 | 10/2006 | Colavin et al. | |

OTHER PUBLICATIONS

Prasadh, et al., "A Benchmark Evaulation of a Multi-Threaded RISC Processor Architecture," 1991, International Confernce on Parall Processing, pp. I-84-I-91, Figs. 1-4.

Byrd, et al., "Multithreaded Processor Architectures," Aug. 1995, IEEE Spectrum, pp. 38-46, all figs.

Gulati, et al., "Performance Study of a Multithreaded Superscalar Microprocessor," Apr. 1996, Proceedings, 2nd International Conference on High-Performance Computer Architect.

Baron, "Rive Chips From TI—Or, Is It Six?" Mar. 17, 2003, Microprocessor Report, Figs. 1,3,4.

Krewell, "Intel Embraces Multithreading," Sep. 17, 2001, Microprocessor Report, pp. 1-2, Fig. 1, pp. 2.

Halfhill, "Ubicom's New NPU Stays Small," Apr. 21, 2003, Microprocessor Report, pp. 1-7, Fig. 1, pp. 3-5.

Baron, "Two Threads for TriCore 2," Sep. 8, 2003, Microprocessor Report, pp. 1-4, Figs. 1-2, pp. 2-4.

Levy, "Multithread Technologies Disclosed at MPR," Nov. 10, 2003, Micrprocessor Report, pp. 1-4, Fig. 2, pp. 2-3.

Halfhill, "MIPS Threads the Needle," Feb. 27, 2006, Microprocessor Report, pp. 1, 5-10, Fig. 3, pp. 5-9.

\* cited by examiner

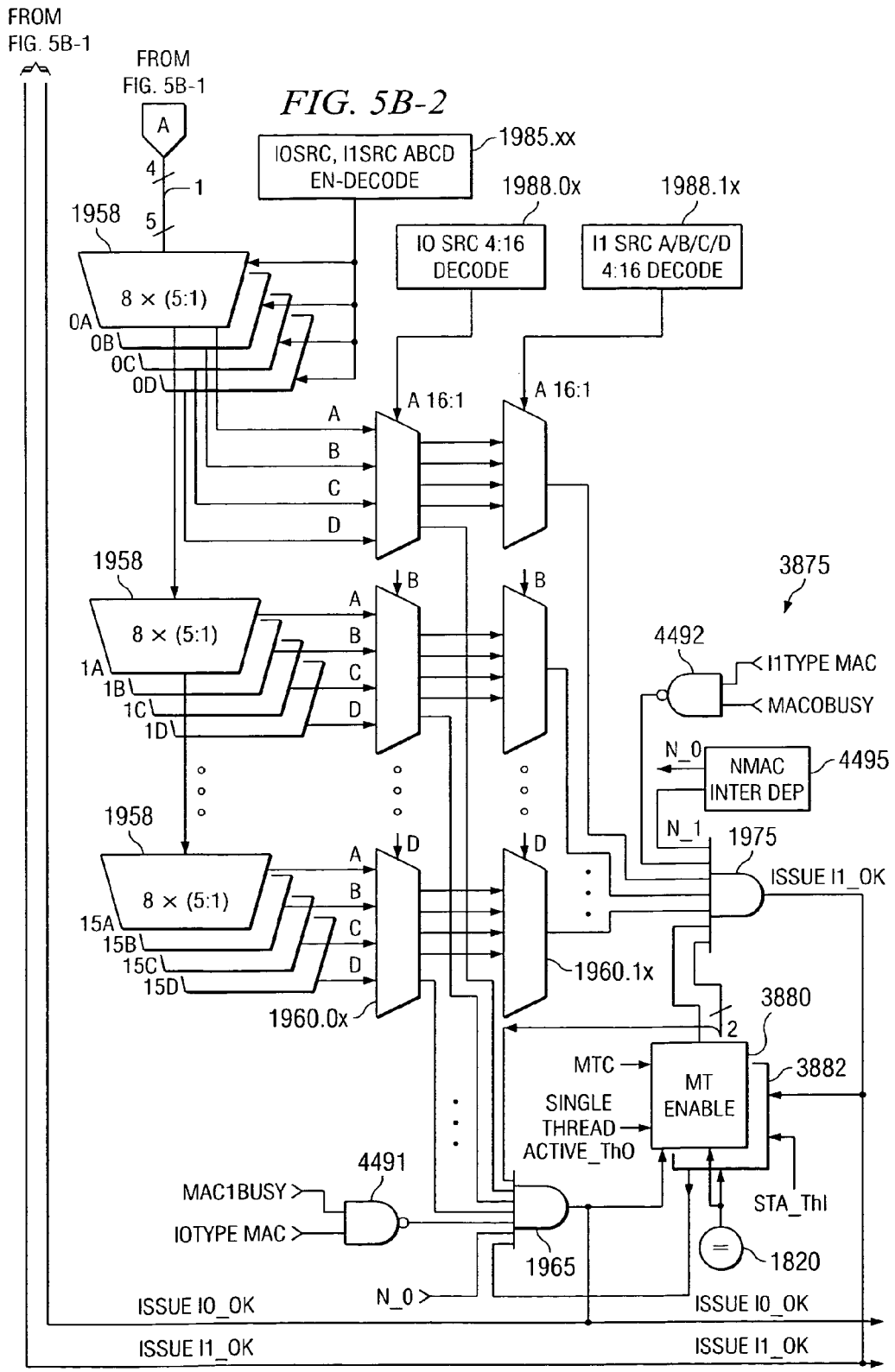

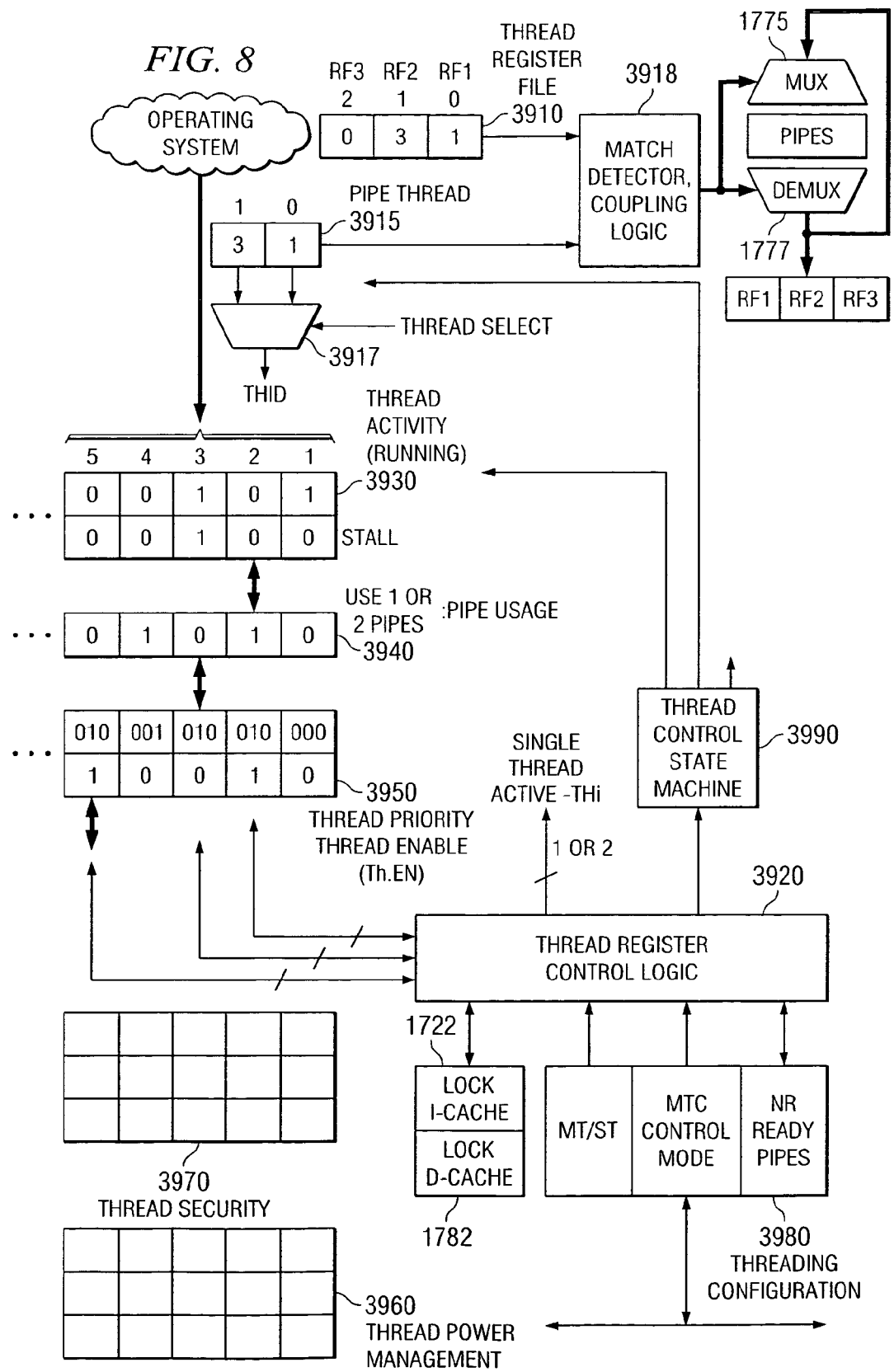

3960

| THREAD ID | PIPE USAGE | PIPE ON/OFF | PIPE CLOCK RATE | PIPE VOLTS | DYNAMIC POWER |
|---|---|---|---|---|---|
| 1 | | | | | 0 |
| 2 | | | | | 0 |
| 3 | | | | | 1 |
| 4 | | | | | 1 |
| 5 | | | | | 1 |
| 6 | | | | | 1 |
| 7 | | | | | 1 |
| 8 | | | | | 1 |
| ⋮ | | | | | |
| N | | | | | |

FROM FIG. 8D-1

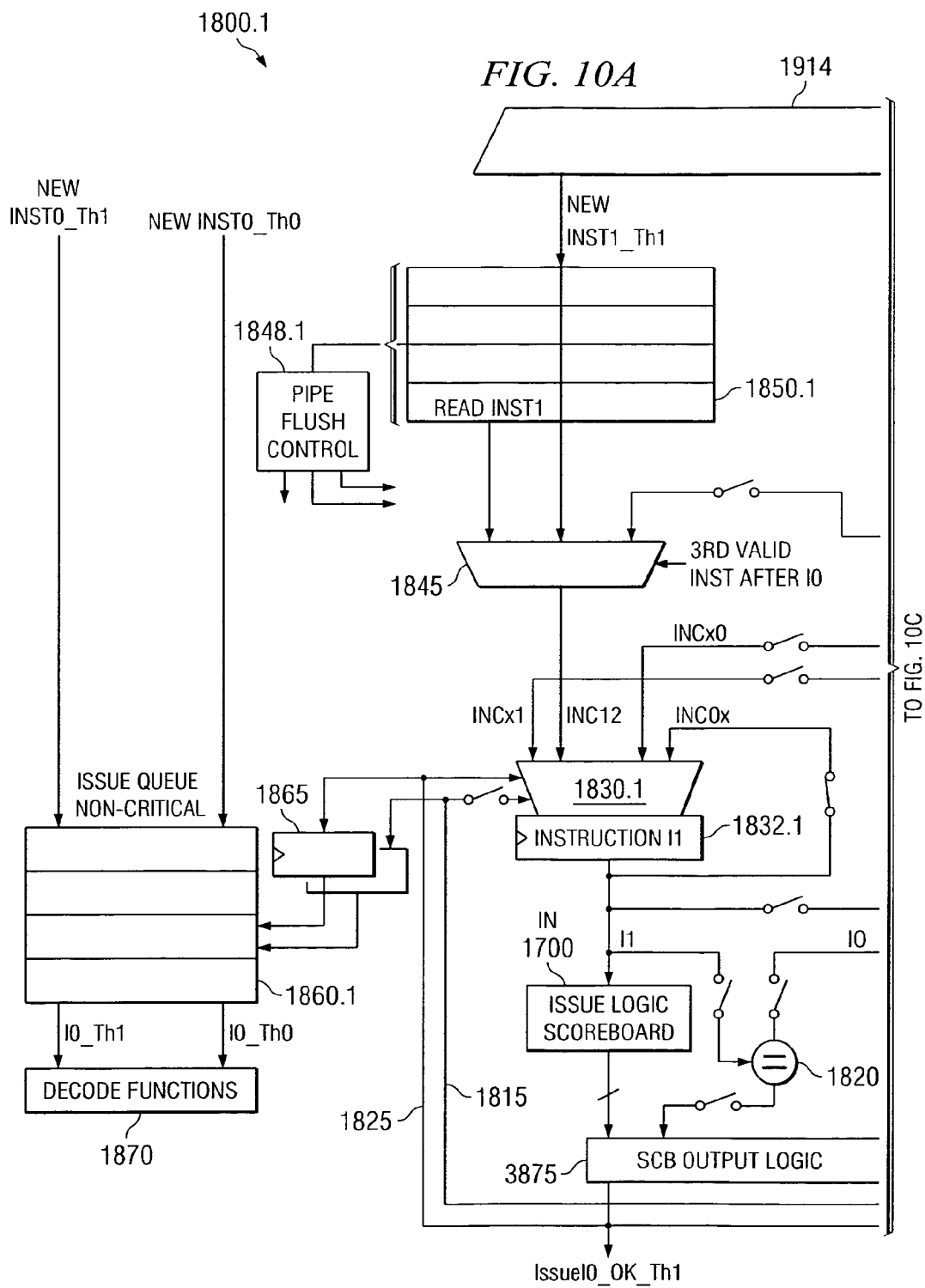

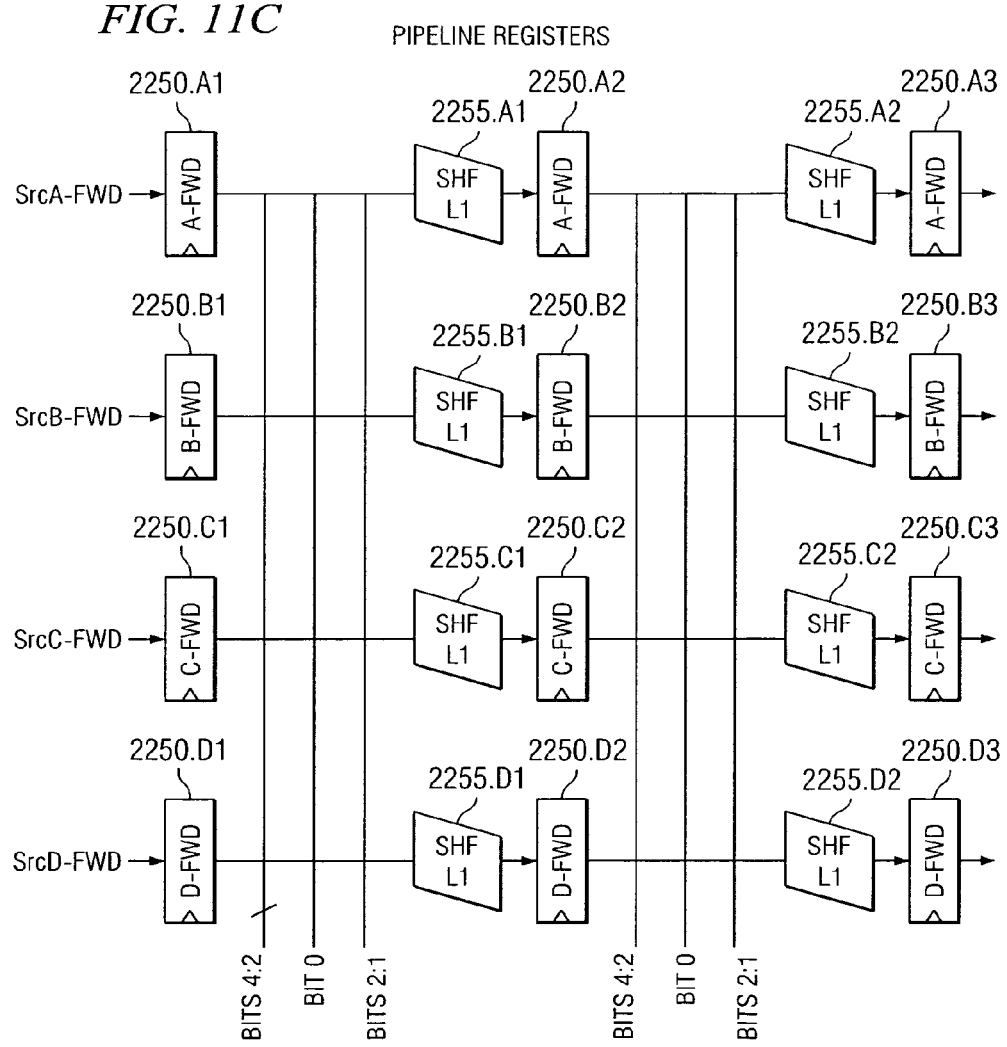

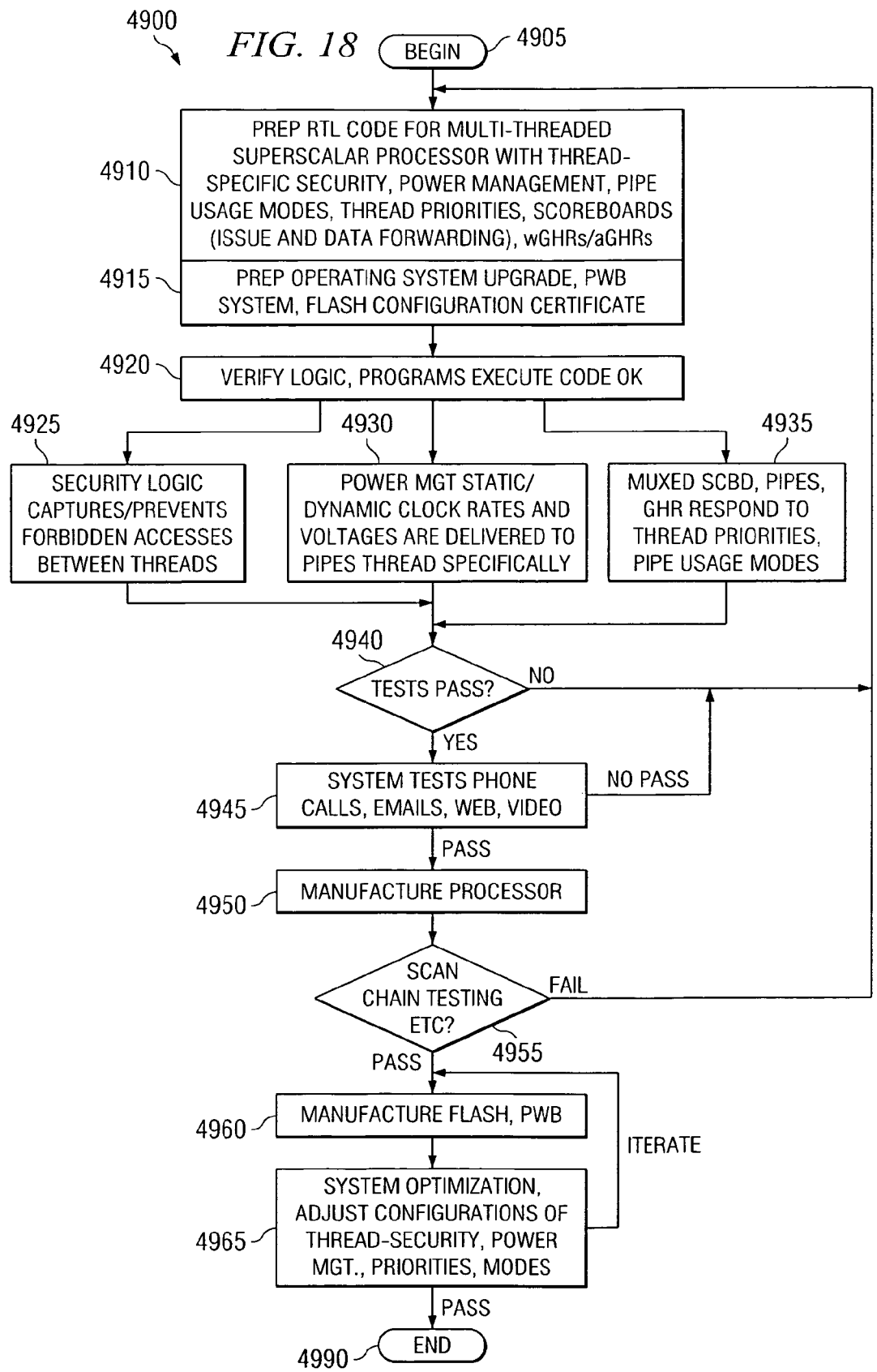

MANAGING POWER OF THREAD PIPELINES ACCORDING TO CLOCK FREQUENCY AND VOLTAGE SPECIFIED IN THREAD REGISTERS

CROSS-REFERENCE TO RELATED APPLICATIONS

This application is related to and is a divisional of U.S. patent application Ser. No. 11/466,621 (TI-38352AA), filed Aug. 23, 2006, now U.S. Pat. No. 7,890,735, issued Feb. 15, 2011, for which priority, under 35 U.S.C. 120 and 35 U.S.C. 121, is hereby claimed to such extent as may be applicable and application TI-38352AA is also hereby incorporated herein by reference.

This application is related to provisional U.S. Patent Application Ser. No. 60/712,635, (TI-38352P51) filed Aug. 30, 2005, titled "Improved Multi-Threading Processors, Integrated Circuit Devices, Systems, And Processes of Operation," for which priority under 35 U.S.C. 119(e)(1) is hereby claimed and TI-38352PS1 is hereby also incorporated herein by reference.

This application is related to and a continuation-in-part of non-provisional U.S. patent application Ser. No. 11/210,428, (TI-38195) filed Aug. 24, 2005, titled "Processes, Circuits, Devices, and Systems for Branch Prediction and Other Processor Improvements," for which priority under 35 U.S.C. 120 is hereby claimed and application TI-38195 is also hereby incorporated herein by reference.

Application TI-38195 is related to provisional U.S. Patent Application Ser. No. 60/605,846, (TI-38352PS) filed Aug. 30, 2004, titled "Dual Pipeline Multi-Threading," for which priority under 35 U.S.C. 119(e)(1) is claimed in that application and thereby applicable for priority purposes to the present application and TI-38352PS is also hereby incorporated herein by reference.

This application is related to provisional U.S. Patent Application Ser. No. 60/605,837, (TI-38195PS) filed Aug. 30, 2004, titled "Branch Target FIFO and Branch Resolution in Execution Unit," for which priority under 35 U.S.C. 119(e)(1) is claimed in that TI-38195 application and thereby applicable for priority purposes to the present application, and TI-38195PS is also hereby incorporated herein by reference.

This application is related to and a continuation-in-part of non-provisional U.S. patent application Ser. No. 11/210,354, (TI-38252) filed Aug. 24, 2005, titled "Processes, Circuits, Devices, and Systems for Branch Prediction and Other Processor Improvements," for which priority under 35 U.S.C. 120 is hereby claimed to such extent as may be applicable and application TI-38252 is also hereby incorporated herein by reference.

This application is related to provisional U.S. Patent Application Ser. No. 60/605,846, (TI-38252PS) filed Aug. 30, 2004, titled "Global History Register Optimizations," for which priority under 35 U.S.C. 119(e)(1) is claimed in that TI-38252 application and thereby claimed to such extent as may be applicable for priority purposes to the present application, and TI-38252PS is also hereby incorporated herein by reference.

This application is related to and a continuation-in-part of U.S. patent application Ser. No. 11/133,870 (TI-38176), filed May 18, 2005, titled "Processes, Circuits, Devices, And Systems For Scoreboard And Other Processor Improvements," for which priority under 35 U.S.C. 120 is hereby claimed to such extent as may be applicable and application TI-38176 is also hereby incorporated herein by reference.

STATEMENT REGARDING FEDERALLY SPONSORED RESEARCH OR DEVELOPMENT

Not applicable.

BACKGROUND OF THE INVENTION

This invention is in the field of information and communications, and is more specifically directed to improved processes, circuits, devices, and systems for information and communication processing, and processes of operating and making them. Without limitation, the background is further described in connection with wireless communications processing.

Wireless communications of many types have gained increasing popularity in recent years. The mobile wireless (or "cellular") telephone has become ubiquitous around the world. Mobile telephony has recently begun to communicate video and digital data, in addition to voice. Wireless devices, for communicating computer data over a wide area network, using mobile wireless telephone channels and techniques are also available.

The market for portable devices such as cell phones and PDAs (personal digital assistants) is expanding with many more features and applications. The increased number of application on the cell phone will increasingly demand multiple concurrent running applications. More features and applications call for microprocessors to have high performance but with low power consumption. Multi-threading can contribute to high performance in this new realm of application. Branch prediction accuracy should desirably not suffer if multi-threading is used, since impaired branch prediction accuracy in a multi-threading process could reduce the instruction efficiency of a superscalar processor or superpipeline processor and increase the power consumption. Clearly, keeping the power consumption for the microprocessor and related cores and chips near a minimum, given a set of performance requirements, is very important in many products and especially portable device products.

Wireless data communications in wireless local area networks (WLAN), such as that operating according to the well-known IEEE 802.11 standard, has become especially popular in a wide range of installations, ranging from home networks to commercial establishments. Short-range wireless data communication according to the "Bluetooth" technology permits computer peripherals to communicate with a nearby personal computer or workstation.

Security is important in both wireline and wireless communications for improved security of retail and other business commercial transactions in electronic commerce and wherever personal and/or commercial privacy is desirable. Added features and security add further processing tasks to the communications system. These potentially mean added software and hardware in systems where cost and power dissipation are already important concerns.

Improved processors, such as RISC (Reduced Instruction Set Computing) processors and digital signal processing (DSP) chips and/or other integrated circuit devices are essential to these systems and applications. Increased throughput allows more information to be communicated in the same amount of time, or the same information to be communicated in a shorter time. Reducing the cost of manufacture, increasing the efficiency of executing more instructions per cycle, and addressing power dissipation without compromising performance are important goals in RISC processors, DSPs, integrated circuits generally and system-on-a-chip (SOC) designs. These goals become even more important in hand held and mobile applications where small size is so important, to control the cost and the power consumed.

As an effort to increase utilization of microprocessor hardware and improve system performance, multi-threading is used. Multi-threading is a process by which two or more independent programs, each called a "thread," interleave execution in the same processor. A little reflection shows that multi-threading is not a simple problem. Different programs may write to and read from the same registers in a register file. The execution histories of the programs may be relatively independent so that global branch prediction based on history patterns of Taken and Not-Taken branches in the interleaved execution of the programs would confuse the history patterns and degrade the performance of conventional branch prediction circuits. Efficiently handling long-latency cache misses can pose a problem. These and other problems confront attempts in the art to provide efficient multi-threading processors and methods.

It would be highly desirable to solve these and other problems as well as problems of how to perform multithreaded scoreboarding to efficiently and economically determine whether to issue an instruction. Also, solutions to problems of how to forward data to an instruction in the pipeline from another instruction in the pipeline in an optimized manner would be highly desirable in a multithreaded processor. All these problems need to be solved with respect to CPI (cycles per instruction) efficiency and operating frequency and with economical real-estate efficiency in superscalar, deeply pipelined microprocessors and other microprocessors.

It would be highly desirable to solve any or all of the above problems, as well as other problems by improvements to be described hereinbelow.

SUMMARY OF THE INVENTION

Generally and in a form of the invention, a multi-threaded microprocessor for processing instructions in threads includes first and second decode pipelines, first and second execute pipelines, and coupling circuitry operable in a first mode to couple first and second threads from the first and second decode pipelines to the first and second execute pipelines respectively, and the coupling circuitry operable in a second mode to couple the first thread to both the first and second execute pipelines.

Generally and in another form of the invention, a multi-threaded microprocessor for processing instructions in threads includes first and second instruction dependency scoreboards, first and second instruction input coupling circuits each having a coupling input and first and second coupling outputs and together operable to selectively feed said first and second instruction dependency scoreboards, and output coupling logic having first and second coupling inputs fed by said first and second scoreboards, and having first and second instruction issue outputs.

Generally and in still another form of the invention, a telecommunications unit includes a wireless modem, and a multi-threaded microprocessor for processing instructions of a real-time phone call-related thread and a non-real-time thread. The microprocessor is coupled to said wireless modem and the microprocessor includes a fetch unit, first and second decode pipelines coupled to said fetch unit, first and second execute pipelines, and coupling circuitry operable in a first mode to couple the real-time phone call-related thread and non-real-time thread from said first and second decode pipelines to said first and second execute pipelines respectively, and said multiplexer circuitry operable in a second mode to couple the real-time phone call-related thread to both said first and second execute pipelines. A microphone is coupled to the multi-threaded microprocessor.

Generally and in an additional form of the invention, a multi-threaded microprocessor for processing instructions in threads includes a fetch unit having a branch target buffer for sharing by the threads, first and second decode pipelines coupled to said fetch unit, first and second execute pipelines respectively coupled to said first and second decode pipelines to execute threads, and first and second thread-specific register files respectively coupled to said first and second execute pipelines.

Generally and in yet another form of the invention, a multi-threaded microprocessor for processing instructions in threads includes an instruction issue unit, at least two execute pipelines coupled to said instruction issue unit, at least two register files, a storage for first thread identifications corresponding to each register file and second thread identifications corresponding to each execute pipeline, and coupling circuitry responsive to the first thread identifications and to the second thread identifications to couple each said execute pipeline to each said register file for which the first and second thread identifications match.

Generally and in a further form of the invention, a multi-threaded microprocessor for processing instructions in threads includes a processor pipeline for the instructions, a first storage coupled to said processor pipeline and operable to hold first information for access by a first thread and second information for access by a second thread. a storage for a thread security configuration, and a hardware state machine responsive to said storage for thread security configuration to protect the first information in said first storage from access by the second thread depending on the thread security configuration.

Generally and in a yet further form of the invention, a multi-threaded microprocessor for processing instructions in threads includes at least one processor pipeline for the instructions, a storage for a thread power management configuration, and a power control circuit coupled to said at least one processor pipeline and responsive to said storage for thread power management configuration to control power used by different parts of the at least one processor pipeline depending on the threads.

Generally and in another additional form of the invention, a telecommunications unit includes a limited-energy source, a wireless modem coupled to said limited energy source, a multi-threaded microprocessor coupled to said limited energy source and to said wireless modem and said microprocessor operable for processing instructions in threads and including at least one processor pipeline for the instructions, a storage for a thread power management configuration, and a power control circuit coupled to said at least one processor pipeline and responsive to said storage for thread power management configuration to control power used by different parts of the at least one processor pipeline depending on the threads; and a microphone coupled to said multi-threaded microprocessor.

Generally and in yet another additional form of the invention, a multi-threaded processor for processing instructions of plural threads includes first and second decode pipelines, issue circuitry respectively coupled to said first and second decode pipelines, first and second execute pipelines respectively coupled to said issue circuitry to execute instructions of threads, a shared execution unit coupled to said issue circuitry, and a busy-control circuit coupled to said issue circuitry and operable to prevent issue of an instruction from one of the threads to operate the shared execute unit when the shared execute unit is busy executing an instruction from another of the threads.

Generally and in still another additional form of the invention, a multi-threaded processor for processing instructions of plural threads includes a fetch unit having branch prediction circuitry, first and second parallel pipelines coupled to said fetch unit and operable for encountering branch instructions in either thread for prediction by said branch prediction circuitry, said branch prediction circuitry including at least two global history registers (GHRs) for different threads and a shared global history buffer (GHB) to supply branch prediction information.

Generally and in still another further form of the invention, a multi-threaded processor for processing instructions of plural threads includes first and second issue queues, issue circuitry respectively coupled at least to said first and second issue queues, first and second execute pipelines respectively coupled to said issue circuitry to execute instructions of threads, and control circuitry having a first single thread active line for dual issue to said first and second execute pipelines based from the first issue queue being primary, and a second single thread active line for dual issue to said first and second execute pipelines based from the second issue queue being primary, and for controlling multithreading by independent single-issue of threads to said first and second execute pipelines respectively.

Generally and in yet another further form of the invention, a multi-threaded processor for processing instructions of plural threads includes first and second decode pipelines, issue circuitry respectively coupled at least to said first and second decode pipelines, first and second execute pipelines respectively coupled to said issue circuitry to execute instructions of the threads, and control circuitry having a storage for thread priorities and enabled thread identifications and responsive to select at least first and second highest priority enabled threads as first and second selected threads, and to launch the first selected thread into the first decode pipeline and launch the second selected thread into the second decode pipeline.

Generally, and in a still further form of the invention, a process of manufacturing a multithreaded processor includes preparing design code representing a multi-threaded superscalar processor having thread-specific security and thread-specific power management and thread-specific issue scoreboarding, verifying that the thread-specific security prevents forbidden accesses between threads and verifying that the thread-specific power management circuitry selectively delivers thread-specific power controls, and fabricating units of the multithreaded superscalar processor.

Generally, and in a still yet further form of the invention, a multi-threaded microprocessor for processing instructions of threads includes at least one execute pipeline for executing the instructions of threads, at least two register files for data respective to at least two threads and coupled to said at least one execute pipeline, and a scratch memory coupled to at least one said register file for transfer of data from the at least one said register file to said scratch memory and data for at least one additional thread from said scratch memory to the at least one said register file.

Other forms of the invention involving processes of manufacture, articles of manufacture, processes and methods of operation, circuits, devices, and systems are disclosed and claimed.

BRIEF DESCRIPTION OF THE DRAWINGS

FIGS. 5B-1 and 5B-2 are two halves of a partially block, partially schematic composite diagram of an inventive circuitry for multiplexed scoreboard arrays and issue logic for handling one or more threads in the processor of FIG. 5A.

FIGS. 6A and 6B provide an example of more detail of a fetch unit for use in FIGS. 3, 4, 5 and 5A.

FIG. 8 is a block diagram of an inventive Thread Register Control Logic and associated control registers for superscalar multi-threading, thread security and thread power management, the registers configured by a Boot routine and then by an Operating System (OS).

FIGS. 8D-1 and 8D-2 together are a partially-flow, partially-block diagram of an inventive power management block including a power control block for configured static or dynamic power control for use in the control logic of FIG. 8 and the processing circuitry of FIGS. 2, 3, 4, 5, 5A, 8 and as applicable elsewhere herein.

FIGS. 10A and 10B are two parts of a composite partially-block, partially schematic diagram of an inventive issue queue and scoreboard circuit for dual-issue instruction scheduling control to two execute pipelines, such as for use in an inventive multi-mode superscalar multi-threaded processor in FIGS. 4, 5 and 5A. In one mode, the circuitry of FIGS. 10A and 10B operates like the dual-issue circuitry of FIG. 10, and in another mode, the circuitry of FIGS. 10A and 10B operate like two parallelized circuits using the FIG. 9 circuitry twice.

FIG. 11C is a block diagram of auxiliary registers and shift units for use in pipelining information for multithreading from the improved upper scoreboard in FIG. 11A.

FIG. 18 is a flow diagram of an inventive process of manufacturing multi-threaded processors and systems of the Figures elsewhere herein.

DETAILED DESCRIPTION OF EMBODIMENTS

Figure 1:
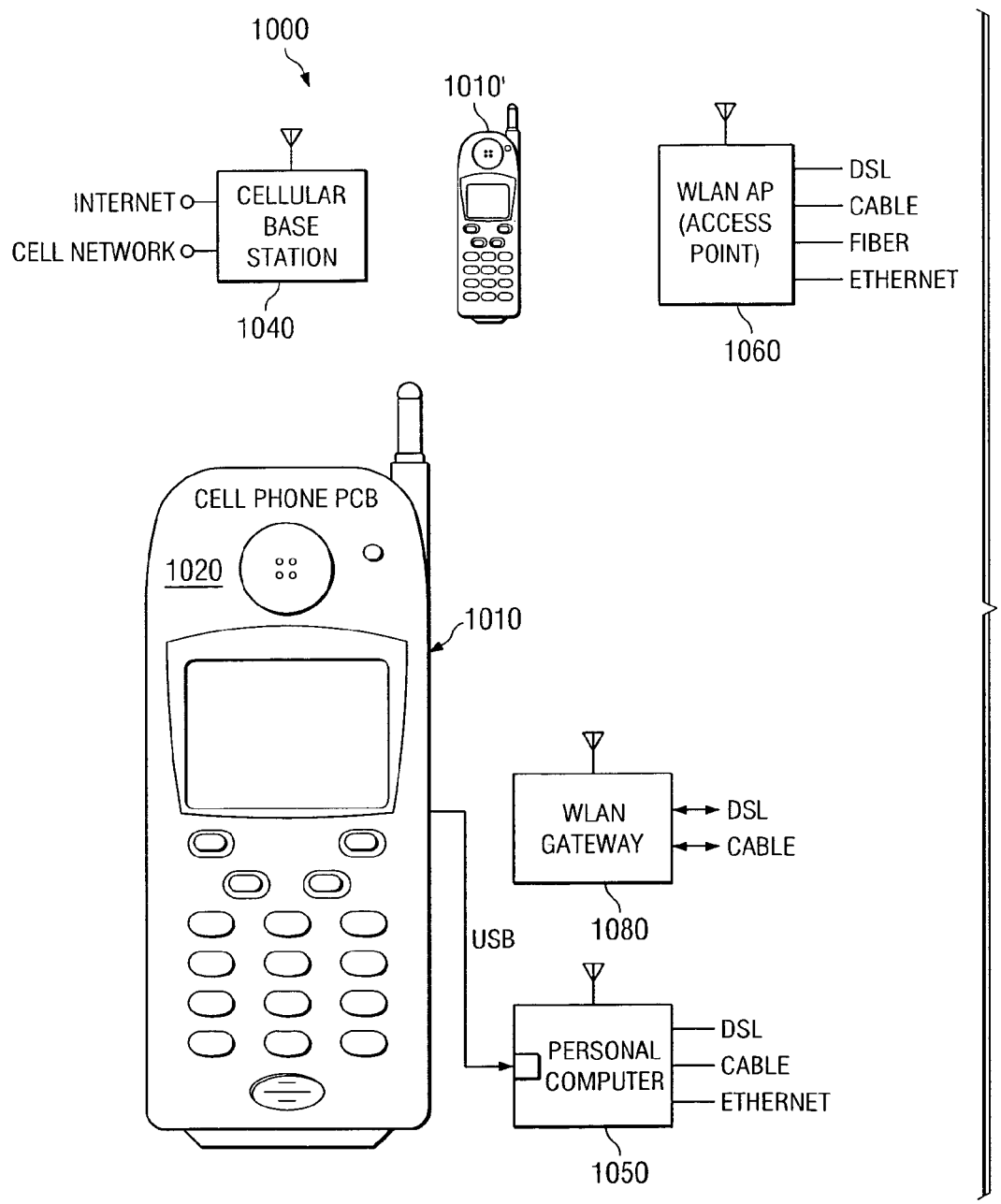
FIG. 1 is a pictorial diagram of a communications system including a cellular base station, a WLAN AP (wireless local area network access point), a WLAN gateway, a WLAN station on a PC/Laptop, and two cellular telephone handsets, any one, some or all of the foregoing improved according to the invention.

In FIG. 1, an improved communications system 1000 has system blocks with increased metrics of features per watt of power dissipation, cycles per watt, features per unit cost of manufacture, greater throughput of instructions per cycle, and greater efficiency of instructions per cycle per unit area (real estate) of processor integrated circuitry, among other advantages.

Any or all of the system blocks, such as cellular mobile telephone and data handsets 1010 and 1010', a cellular (telephony and data) base station 1040, a WLAN AP (wireless local area network access point, IEEE 802.11 or otherwise) 1060, a Voice WLAN gateway 1080 with user voice over packet telephone, and a voice enabled personal computer (PC) 1050 with another user voice over packet telephone, communicate with each other in communications system 1000. Each of the system blocks 1010, 1010', 1040, 1050, 1060, 1080 are provided with one or more PHY physical layer blocks and interfaces as selected by the skilled worker in various products, for DSL (digital subscriber line broadband over twisted pair copper infrastructure), cable (DOCSIS and other forms of coaxial cable broadband communications), premises power wiring, fiber (fiber optic cable to premises), and Ethernet wideband network. Cellular base station 1040 two-way communicates with the handsets 1010, 1010', with the Internet, with cellular communications networks and with PSTN (public switched telephone network).

In this way, advanced networking capability for services, software, and content, such as cellular telephony and data, audio, music, voice, video, e-mail, gaming, security, e-commerce, file transfer and other data services, internet, world wide web browsing, TCP/IP (transmission control protocol/Internet protocol), voice over packet and voice over Internet protocol (VoP/VoIP), and other services accommodates and provides security for secure utilization and entertainment appropriate to the just-listed and other particular applications, while recognizing market demand for different levels of security.

The embodiments, applications and system blocks disclosed herein are suitably implemented in fixed, portable, mobile, automotive, seaborne, and airborne, communications, control, set top box, and other apparatus. The personal computer (PC) is suitably implemented in any form factor such as desktop, laptop, palmtop, organizer, mobile phone handset, PDA personal digital assistant, internet appliance, wearable computer, personal area network, or other type.

Figure 2:
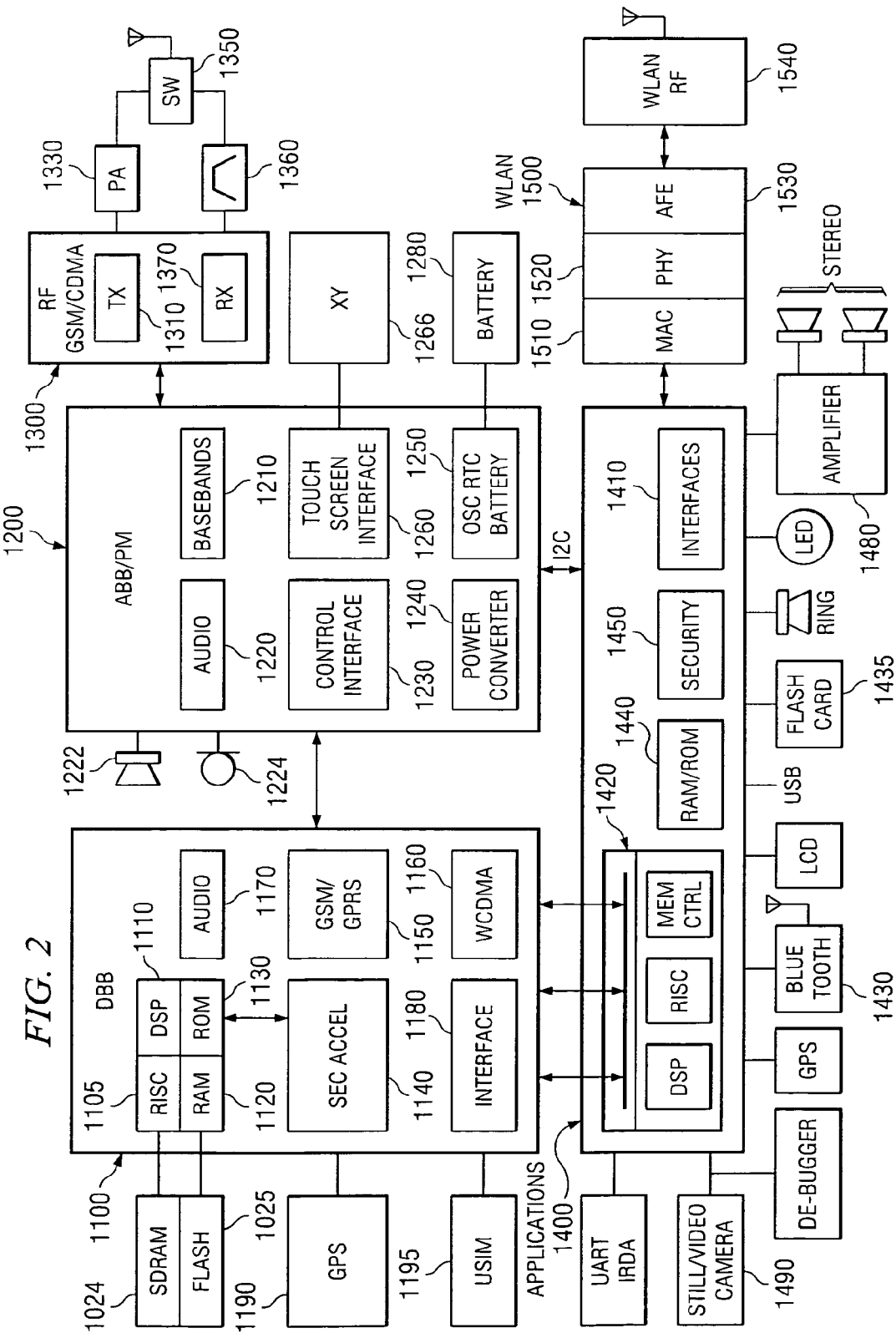
FIG. 2 is a block diagram of an inventive integrated circuit chip for use in the blocks of the communications system of FIG. 1.

For example, handset 1010 is improved and remains interoperable and able to communicate with all other similarly improved and unimproved system blocks of communications system 1000. On a cell phone printed circuit board (PCB) 1020 in handset 1010, FIGS. 1 and 2 show a processor integrated circuit and a serial interface such as a USB interface connected by a USB line to the personal computer 1050. Reception of software, intercommunication and updating of information are provided between the personal computer 1050 (or other originating sources external to the handset 1010) and the handset 1010. Such intercommunication and updating also occur automatically and/or on request via WLAN, Bluetooth, or other wireless circuitry.

FIG. 2 illustrates inventive integrated circuit chips including chips 1100, 1200, 1300, 1400, 1500 for use in the blocks of the communications system 1000 of FIG. 1. The skilled worker uses and adapts the integrated circuits to the particular parts of the communications system 1000 as appropriate to the functions intended. For conciseness of description, the integrated circuits are described with particular reference to use of all of them in the cellular telephone handsets 1010 and 1010' by way of example.

It is contemplated that the skilled worker uses each of the integrated circuits shown in FIG. 2, or such selection from the complement of blocks therein provided into appropriate other integrated circuit chips, or provided into one single integrated circuit chip, in a manner optimally combined or partitioned between the chips, to the extent needed by any of the applications supported by the cellular telephone base station 1040, personal computer(s) 1050 equipped with WLAN, WLAN access point 1060 and Voice WLAN gateWay 1080, as well as cellular telephones, radios and televisions, fixed and portable entertainment units, routers, pagers, personal digital assistants (PDA), organizers, scanners, faxes, copiers, household appliances, office appliances, combinations thereof, and other application products now known or hereafter devised in which there is desired increased, partitioned or selectively determinable advantages next described.

In FIG. 2, an integrated circuit 1100 includes a digital baseband (DBB) block 1110 that has a RISC processor (such as MIPS core, ARM processor, or other suitable processor) 1105, a digital signal processor (DSP) 1110, communications software and security software for any such processor or core, security accelerators 1140, and a memory controller. The memory controller interfaces the RISC and the DSP to Flash memory 1025 and SDRAM 1024 (synchronous dynamic random access memory). The memories are improved by any one or more of the processes herein. On chip RAM 1120 and on-chip ROM 1130 also are accessible to the processors 1105 and 1110 for providing sequences of software instructions and data thereto.

Digital circuitry 1150 on integrated circuit 1100 supports and provides wireless interfaces for any one or more of GSM, GPRS, EDGE, UMTS, and OFDMA/MIMO (Global System for Mobile communications, General Packet Radio Service, Enhanced Data Rates for Global Evolution, Universal Mobile Telecommunications System, Orthogonal Frequency Division Multiple Access and Multiple Input Multiple Output Antennas) wireless, with or without high speed digital data service, via an analog baseband chip 1200 and GSM transmit/receive chip 1300. Digital circuitry 1150 includes ciphering processor CRYPT for GSM ciphering and/or other encryption/decryption purposes. Blocks TPU (Time Processing Unit real-time sequencer), TSP (Time Serial Port), GEA (GPRS Encryption Algorithm block for ciphering at LLC logical link layer), RIF (Radio Interface), and SPI (Serial Port Interface) are included in digital circuitry 1150.

Digital circuitry 1160 provides codec for CDMA (Code Division Multiple Access), CDMA2000, and/or WCDMA (wideband CDMA) wireless with or without an HSDPA/HSUPA (High Speed Downlink Packet Access, High Speed Uplink Packet Access) (or 1xEV-DV, 1xEV-DO or 3xEV-DV) data feature via the analog baseband chip 1200 and an RF GSM/CDMA chip 1300. Digital circuitry 1160 includes blocks MRC (maximal ratio combiner for multipath symbol combining), ENC (encryption/decryption), RX (downlink receive channel decoding, de-interleaving, viterbi decoding and turbo decoding) and TX (uplink transmit convolutional encoding, turbo encoding, interleaving and channelizing.). Block ENC has blocks for uplink and downlink supporting confidentiality processes of WCDMA.

Audio/voice block 1170 supports audio and voice functions and interfacing. Applications interface block 1180 couples the digital baseband 1110 to an applications processor 1400. Also, a serial interface in block 1180 interfaces from parallel digital busses on chip 1100 to USB (Universal Serial Bus) of a PC (personal computer) 1050. The serial interface includes UARTs (universal asynchronous receiver/transmitter circuit) for performing the conversion of data between parallel and serial lines. Chip 1100 is coupled to location-determining circuitry 1190 for GPS (Global Positioning System). Chip 1100 is also coupled to a USIM (UMTS Subscriber Identity Module) 1195 or other SIM for user insertion of an identifying plastic card, or other storage element, or for sensing biometric information to identify the user and activate features.

In FIG. 2, a mixed-signal integrated circuit 1200 includes an analog baseband (ABB) block 1210 for GSM/GPRS/EDGE/UMTS which includes SPI (Serial Port Interface), digital-to-analog/analog-to-digital conversion DAC/ADC block, and RF (radio frequency) Control pertaining to GSM/GPRS/EDGE/UMTS and coupled to RF (GSM etc.) chip 1300. Block 1210 suitably provides an analogous ABB for WCDMA wireless and any associated HSDPA data (or 1xEV-DV, 1xEV-DO or 3xEV-DV data and/or voice) with its respective SPI (Serial Port Interface), digital-to-analog conversion DAC/ADC block, and RF Control pertaining to WCDMA and coupled to RF (WCDMA) chip 1300.

An audio block 1220 has audio I/O (input/output) circuits to a speaker 1222, a microphone 1224, and headphones (not shown). Audio block 1220 is coupled to a voice codec and a stereo DAC (digital to analog converter), which in turn have the signal path coupled to the baseband block 1210 with suitable encryption/decryption activated or not.

A control interface 1230 has a primary host interface (I/F) and a secondary host interface to DBB-related integrated circuit 1100 of FIG. 2 for the respective GSM and WCDMA paths. The integrated circuit 1200 is also interfaced to an I2C port of applications processor chip 1400 of FIG. 2. Control interface 1230 is also coupled via access arbitration circuitry to the interfaces in circuits 1250 and the baseband 1210.

A power conversion block 1240 includes buck voltage conversion circuitry for DC-to-DC conversion, and low-dropout (LDO) voltage regulators for power management/sleep mode of respective parts of the chip regulated by the LDOs. Power conversion block 1240 provides information to and is responsive to a power control state machine shown between the power conversion block 1240 and circuits 1250.

Circuits 1250 provide oscillator circuitry for clocking chip 1200. The oscillators have frequencies determined by one or more crystals. Circuits 1250 include a RTC real time clock (time/date functions), general purpose I/O, a vibrator drive (supplement to cell phone ringing features), and a USB On-The-Go (OTG) transceiver. A touch screen interface 1260 is coupled to a touch screen XY 1266 off-chip.

Batteries such as a lithium-ion battery 1280 and backup battery provide power to the system and battery data to circuit 1250 on suitably provided separate lines from the battery pack. When needed, the battery 1280 also receives charging current from a Battery Charge Controller in analog circuit 1250 which includes MADC (Monitoring ADC and analog input multiplexer such as for on-chip charging voltage and current, and battery voltage lines, and off-chip battery voltage, current, temperature) under control of the power control state machine.

In FIG. 2 an RF integrated circuit 1300 includes a GSM/GPRS/EDGE/UMTS/CDMA RF transmitter block 1310 supported by oscillator circuitry with off-chip crystal (not shown). Transmitter block 1310 is fed by baseband block 1210 of chip 1200. Transmitter block 1310 drives a dual band RF power amplifier (PA) 1330. On-chip voltage regulators maintain appropriate voltage under conditions of varying power usage. Off-chip switchplexer 1350 couples wireless antenna and switch circuitry to both the transmit portion 1310, 1330 and the receive portion next described. Switchplexer 1350 is coupled via band-pass filters 1360 to receiving LNAs (low noise amplifiers) for 850/900 MHz, 1800 MHz, 1900 MHz and other frequency bands as appropriate.

Depending on the band in use, the output of LNAs couples to GSM/GPRS/EDGE/UMTS/CDMA demodulator 1370 to produce the I/Q or other outputs thereof (in-phase, quadrature) to the GSM/GPRS/EDGE/UMTS/CDMA baseband block 1210.

Further in FIG. 2, an integrated circuit chip or core 1400 is provided for applications processing and more off-chip peripherals. Chip (or core) 1400 has interface circuit 1410 including a high-speed WLAN 802.11a/b/g interface coupled to a WLAN chip 1500. Further provided on chip 1400 is an applications processing section 1420 which includes a RISC processor (such as MIPS core, ARM processor, or other suitable processor), a digital signal processor (DSP), and a shared memory controller MEM CTRL with DMA (direct memory access), and a 2D (two-dimensional display) graphic accelerator.

The RISC processor and the DSP have access via an on-chip extended memory interface (EMIF/CF) to off-chip memory resources 1435 including as appropriate, mobile DDR (double data rate) DRAM, and flash memory of any of NAND Flash, NOR Flash, and Compact Flash. On chip 1400, the shared memory controller in circuitry 1420 interfaces the RISC processor and the DSP via an on-chip bus to on-chip memory 1440 with RAM and ROM. A 2D graphic accelerator is coupled to frame buffer internal SRAM (static random access memory) in block 1440. A security block 1450 includes secure hardware accelerators having security features and provided for accelerating encryption and decryption of any one or more types known in the art or hereafter devised.

On-chip peripherals and additional interfaces 1410 include UART data interface and MCSI (Multi-Channel Serial Interface) voice wireless interface for an off-chip IEEE 802.15 ("Bluetooth" and high and low rate piconet and personal network communications) wireless circuit 1430. Debug messaging and serial interfacing are also available through the UART. A JTAG emulation interface couples to an off-chip emulator Debugger for test and debug. Further in peripherals 1410 are an I2C interface to analog baseband ABB chip 1200, and an interface to applications interface 1180 of integrated circuit chip 1100 having digital baseband DBB.

Interface 1410 includes a MCSI voice interface, a UART interface for controls, and a multi-channel buffered serial port (McBSP) for data. Timers, interrupt controller, and RTC (real time clock) circuitry are provided in chip 1400. Further in peripherals 1410 are a MicroWire (u-wire 4 channel serial port) and multi-channel buffered serial port (McBSP) to off-chip Audio codec, a touch-screen controller, and audio amplifier 1480 to stereo speakers. External audio content and touch screen (in/out) and LCD (liquid crystal display) are suitably provided. Additionally, an on-chip USB OTG interface couples to off-chip Host and Client devices. These USB communications are suitably directed outside handset 1010 such as to PC 1050 (personal computer) and/or from PC 1050 to update the handset 1010.

An on-chip UART/IrDA (infrared data) interface in interfaces 1410 couples to off-chip GPS (global positioning system) and Fast IrDA infrared wireless communications device. An interface provides EMT9 and Camera interfacing to one or more off-chip still cameras or video cameras 1490, and/or to a CMOS sensor of radiant energy. Such cameras and other apparatus all have additional processing performed with greater speed and efficiency in the cameras and apparatus and in mobile devices coupled to them with improvements as described herein. Further in FIG. 2, an on-chip LCD controller and associated PWL (Pulse-Width Light) block in interfaces 1410 are coupled to a color LCD display and its LCD light controller off-chip.

Further, on-chip interfaces 1410 are respectively provided for off-chip keypad and GPIO (general purpose input/output). On-chip LPG (LED Pulse Generator) and PWT (Pulse-Width Tone) interfaces are respectively provided for off-chip LED and buzzer peripherals. On-chip MMC/SD multimedia and flash interfaces are provided for off-chip MMC Flash card, SD flash card and SDIO peripherals.

In FIG. 2, a WLAN integrated circuit 1500 includes MAC (media access controller) 1510, PHY (physical layer) 1520 and AFE (analog front end) 1530 for use in various WLAN and UMA (Unlicensed Mobile Access) modem applications. PHY 1520 includes blocks for BARKER coding, CCK, and OFDM. PHY 1520 receives PHY Clocks from a clock generation block supplied with suitable off-chip host clock, such as at 13, 16.8, 19.2, 26, or 38.4 MHz. These clocks are compatible with cell phone systems and the host application is suitably a cell phone or any other end-application. AFE 1530 is coupled by receive (Rx), transmit (Tx) and CONTROL lines to WLAN RF circuitry 1540. WLAN RF 1540 includes a 2.4 GHz (and/or 5 GHz) direct conversion transceiver, or otherwise, and power amplifer and has low noise amplifier LNA in the receive path. Bandpass filtering couples WLAN RF 1540 to a WLAN antenna. In MAC 1510, Security circuitry supports any one or more of various encryption/decryption processes such as WEP (Wired Equivalent Privacy), RC4, TKIP, CKIP, WPA, AES (advanced encryption standard), 802.11i and others. Further in WLAN 1500, a processor comprised of an embedded CPU (central processing unit) is connected to internal RAM and ROM and coupled to provide QoS (Quality of Service) IEEE 802.11e operations WME, WSM, and PCF (packet control function). A security block in WLAN 1500 has busing for data in, data out, and controls interconnected with the CPU. Interface hardware and internal RAM in WLAN 1500 couples the CPU with interface 1410 of applications processor integrated circuit 1400 thereby providing an additional wireless interface for the system of FIG. 2. Still other additional wireless interfaces such as for wideband wireless such as IEEE 802.16 "WiMAX" mesh networking and other standards are suitably provided and coupled to the applications processor integrated circuit 1400 and other processors in the system.

As described herein, Symmetrical Multi-threading refers to various system, device, process and manufacturing embodiments to address problems in processing technology.

At least two execution pipelines are provided and each of them have an architecture and clock rate high enough to meet the real-time demands of the applications to be run (e.g. several hundred MHz and/or over a GHz). For multi-threading, the instruction queue, issue queue, the register file, and store buffer are replicated. The execution pipelines independently execute threads or selectively share or multi-issue to pipelines to deliver more bandwidth to one or more threads.

Some embodiments include a MAC (multiply accumulate) unit and/or a skewed pipeline appended to one or more of the execution pipelines. Instruction dependencies may occur in embodiments wherein execution pipelines share a MAC and/or the skewed pipeline, and in such embodiments the issue unit is arranged to handle those dependencies.

Instruction fetch suitably alternates or rotates or prioritizes between fetching at least one instruction for one thread and instruction fetching for each additional thread. An instruction pipeline has a bandwidth sufficient to provide the bandwidth demanded by the execution pipelines that are fed in any given scenario of instruction issue from that instruction pipeline. For example, instruction fetch reads at least about two instructions per cycle, (e.g., for 32-bit instructions, reads 64 bits per cycle or 96 or 128 etc.), or more generally, a multithreading number N of instructions per cycle. For more than two execution pipelines, the instruction pipeline bandwidth is increased proportionally.

The instruction fetch pipeline has higher bandwidth than the rest of the pipeline so it can easily alternate fetches to different downstream pipelines. Cache misses are generated if applicable, in response to a single fetch.

Instruction decodes are suitably separate in multi-threading mode. In association with the register file, the scoreboard array for instruction dependency is replicated and mode-controlled for each thread. Incorporated U.S. patent application Ser. No. 11/133,870 (TI-38176) discloses examples of instruction fetch and scoreboarding circuitry which are improved upon and interrelated herein.

Multi-threaded embodiments as described are more efficient even with the same number of execute pipes provided for a single-thread. For single thread, there are stalls in the pipeline; branch mispredictions, L1 cache misses, and L2 cache misses. Multiple threads make more efficient use of the resources for one or more execute pipes per thread.

The multi-threaded embodiments can be more efficient even if pipeline bubbles are not filled up, and a pipe is flushed on a cache miss. An L2 cache miss on a first thread can impose a delay of hundreds of clock cycles in a single-threaded approach. In the multi-threaded embodiments, the second thread or even a third thread utilizes the execute pipes instead of leaving them idle. Different embodiments trade off real estate efficiency and instruction efficiency to some extent. For example, another symmetric multithreaded embodiment herein may accept a pipe stall delay interval on an L2 cache miss while providing a remarkably real-estate-economical structure and benefiting from the flexibility of multithreading.

An intermediate tradeoff provides both high instruction efficiency and high real-estate efficiency by providing a symmetric multithreaded embodiment that transitions from single issue to dual issue of a second already-active thread to keep the pipe active during L2 cache miss. Instruction efficiency is high when instances of L2 cache miss are infrequent because the miss recovery intervals of threads will mostly alternate in occurrence and not overlap, or will not occur at all.

Threads are selectively handled so that one thread occupies one or more pipelines concurrently, or multiple threads occupy at least one pipeline each concurrently. A single thread selectively uses a single execution pipeline or plural execution pipelines, thereby conferring a performance advantage for even single thread operation itself.

Still another symmetric multithreaded embodiment herein applies logic to the real estate to activate and issue a new thread into that pipe. Such embodiment concomitantly increases the instruction efficiency by occupying what would otherwise be a pipe stall delay interval on an L2 cache miss with the benefit of instruction execution of that new thread being issued into the pipe in the meantime. Not only does this embodiment include transitioning from single issue to dual issue of a second already-active thread, but also the new thread is suitably issued when its priority is appropriately high relative to the already-active other thread. And that already-active other thread suitably and efficiently continues single issue.

Furthermore, if in some cases the active threads in the pipeline both receive L2 cache miss recovery intervals that overlap, the control logic of some embodiments issues one or more new threads to keep the execute pipes occupied for very high instruction efficiency. As threads are issued over time of the overall period of operation of the processor, the L2 cache is large enough to store instructions from many threads.

Accordingly, instances of L2 cache miss on the new thread are rare on average. If such rare instances are encountered, the control logic suitably includes presence or absence of a candidate new thread in L2 cache in determining new thread to issue. Alternatively, the control logic is structured to simply limit to a predetermined number of new thread attempts to identify a new thread to fill a stalled pipe, and an L2 cache miss recovery interval is accepted.

In some embodiments, additional multiplexing hardware is provided for the scoreboard unit so that a scoreboard does issue scheduling for either single-issue to a single execute pipeline per thread or for dual-issue (or higher) of one thread to two execute pipelines.

Regarding data caches in one example, load-store pipeline hardware is coupled to a level-one (L1) data cache, which in turn is coupled to an L2 data cache. On a stall due to an L2 cache miss on a first thread, a second thread is allowed to take over both pipelines in FIG. 5. In another embodiment, a third thread is executed on a stall due to an L2 cache miss. When the L2 cache miss returns, the first thread returns to single pipeline mode. Some embodiments associate the execution pipeline with a no-stall with replay mechanism. The pipeline is desirably restarted without any interruption or delay in either pipeline or thread. The pipeline does not need to be cleared before a different thread starts instructions down that pipeline.

In an instruction issue stage, possible conflict of MAC and analogous special-purpose instructions in multiple threads is considered. Some embodiments use more MAC/SIMD threads than corresponding MAC/SIMD hardware units. Accordingly, the issue unit suitably delays dispatch to issue of one MAC/SIMD thread until the MAC and/or SIMD instructions of another thread are retired from the shared MAC/SIMD unit. In embodiments wherein the instruction frequency for a MAC unit 1745 is low (such as when instructions are sent relatively infrequently to the MAC unit 1745), then sharing of the MAC unit 1745 by multiple threads does not involve much dependency handling. Moreover, some embodiments have only one thread of MAC/SIMD type, or the operating system (OS) or other control activates at most one MAC/SIMD thread among multiple threads activated for execution, leaving single thread MAC dependencies but obviating multi-thread contention for a shared MAC unit. Those embodiments efficiently handle the single thread MAC dependencies.

When N pipelines (e.g., two) are independently executing N threads, the symmetric multi-threading in the same processor core remarkably offers a more hardware-efficient approach to multi-threading. This reduces die size and conserves die real estate compared to a multiple-core processor lacking symmetric multi-threading in a processor core.

Some embodiments obviate hardware in the pipeline that would otherwise be needed to support tagging of instructions or obviate pipelining instruction tags. Some embodiments simplify, reduce, or eliminate multiplexing of data in various places from decode through execution.

Some embodiments with two execute pipelines guarantee or reserve 50% or half of the execution bandwidth for a high-priority real-time thread. In this way, the real time thread delivers performance based on at least 50% of the execution bandwidth. Other thread-priority-based performance enhancements are also provided.

Power supply power, such as battery power, is reduced and more efficiently used and overall performance/real estate efficiency compared to both fine-grain (execute pipe loaded with different threads in different pipestages) and coarse-grain multi-threading (different processor cores for different threads).

Also, in some lower power mode embodiments, one of the execution pipelines is selectively shut off when a single thread is to be executed, provided that saving power is more important or has higher priority than delivering the bandwidth of an additional pipeline to that thread. Power control and clock control circuitry are each suitably made responsive to thread ID. In this way, an entire decode and execute pipeline pertaining to a given thread can be clock-throttled, run at reduced voltage, or powered-down entirely. In this way, flexible control of power management is provided.

Instruction efficiency is increased by allowing a single thread to use a single one or both of the execution pipelines depending on relative priorities of dissipation and bandwidth and depending on whether another enabled thread is present. Various embodiments approach the efficiency of dual processors with much less hardware.

Operating System OS takes advantage of the multithreading as if the multithreading were the same as in multiprocessors. As seen by the cache, some embodiments herein are like two or more microprocessors sharing the same cache, but with dramatic simplification relative to the microprocessors approach.

Among other improvements in FIGS. 3, 4, 5 and 5A refer to any one, some or all of the following items such as those in TABLE 1. The number N refers to a multi-threading number of threads so that the items can be provided per-thread.

TABLE 1

SYMMETRIC MULTI-THREADING BLOCKS

N scoreboard arrays
Issue unit responsive to a signal or flag identifying that the MAC is busy
N register files
N GHRs (global history registers) for the threads.
N independent decode pipelines
N execute pipelines with a branch prediction resolution stage in each execute pipeline
N Replay circuits or stall buffers
A MAC (multiply-accumulate) unit is shared by both execute pipelines instead of having the MAC associated with a predetermined one single execute pipeline.
N ports for one L1 data cache (or N L1 data caches, or mixture such that number of ports per L1 data cache times (or summed over) number of L1 data caches is at least equal to the multi-threading number N.)
N data tag arrays
N Load Store pipelines, each pipeline having one or more pipestages each to handle:
 address generation stage,
 L1 data cache access stage,
 L2 data cache access stage in case of L1 data cache miss, and circuitry to format cache line.

Either execute pipeline can utilize an appended skewed pipeline such as for SIMD instructions. The skewed pipeline is suitably implemented by a DSP architecture such as an architecture from the TMS320C55x™ family of digital signal processors from Texas Instruments Incorporated, Dallas, Tex.

Replay circuitry is replicated so that N (e.g., two) instructions can replay concurrently as needed. Cache access circuitry is augmented to handle each extra data cache miss. No change is needed in the L1-L2 cache access pipestages compared to a single-threaded approach.

Hardware and process in a multithreading control mode accomplishes a 2-thread to 1-thread dual-issue transition during a stall. The replay queue keeps information to restart the stalled thread. The instruction queue, scoreboard, issue logic, register file and write back logic have capability to handle multiple issue at least two instructions at a time.

Hardware empties one pipe and then issues the other thread with muxes appropriately set. The hardware in some embodiments includes extra muxes from IQ to decode, instruction restriction for two instructions (like only one branch per cycle), thread interdependency instruction, and extra port for scoreboard and register file.

No-stall with replay hardware and process suitably are provided so that the replay queue keeps all information to restart execution of a first thread once the load data is fetched/valid from L2 cache. Physically, the issue-pending queue is merged with the replay queue. The same queue circuitry supports both function of issue-pending queue and replay queue. Some multi-threading embodiments herein start another thread or additionally execute or continue another thread while the L2 cache miss of the first thread is being serviced. To avoid losing the first-thread instructions of the replay queue, the replay queue is saved during L2 miss in some multi-threading embodiments herein. This part of the process operates so that the replay queue can be reloaded with the first-thread instructions when the L2 cache miss data is fetched/valid. The instructions in the replay queue are thereupon restarted without any pipeline stall.

Compared to an architecture using N single-threaded processors in parallel, the Symmetric Multi-threading approach herein is more efficient. One thread can go down two (or more) pipes in FIGS. 3, 4, 5 and 5A. Two or more threads are selectively directed to go down separate respective pipes in FIGS. 3, 4, 5 and 5A. N program counters (PCs) support the multi-threading of N respective threads and are useful for various operating system (OS) programs and operations. Coarse-grained multi-threading, by contrast, imposes low performance, and fine-grained multithreading imposes high real-estate area and complexity. Here, the symmetric multi-threading circuitry offers simplicity and economy of real-estate area and, in various control modes, rapidly switches to execute another thread or to more rapidly execute an existing thread for high performance.

Estimated performance improvement in some embodiments is about 1.5 times, or about 50% improvement in performance over a single-threaded processor architecture. The improvement approach is architectural and thus independent of clock frequency and introduces little or no speed path considerations. Clocks can be faster, same, or even slower and still provide increased performance with the symmetric multi-threading improvements herein.

A lock down register is provided for and coupled to the L1 multi-way cache. See FIG. 4. The lock down register locks the ways and entries in the cache to prevent the other thread from thrashing the memory and is useful for processing real time threads, among others. For multithreading, L1 and L2 cache associativities are suitably maintained or increased relative to single threading to provide flexibility in cache locking.

Thus, a lockdown register circuit avoids thrashing the L1 memory in some of the multithreading embodiments. By setting a lock bit, the L1 cache way/bank is locked for a thread. Another thread cannot replace the cache line in the L1 cache way/bank that is locked by the other thread. Application software can set the lock such as in a case where frequently-used data or real-time information should be kept free of possible replacement. Expanding from this idea, a Thread ID is associated with that lock bit. Here is a case where a Thread ID is associated with a data cache and/or instruction cache herein. With a thread ID associated with it, instructions in the same thread can replace the data, but instructions in another thread are prevented or locked out from replacing that data. If no Thread ID is given, then no thread can replace that data. In this way, hardware and process use thread ID to manage the cache replacement algorithm. Software locks the way/bank in the cache. Thread ID is suitably added to allow cache replacement in the locked way/bank of information in a thread by information in the same thread. Security is thus enhanced relative to the memory regions.

Figure 3:
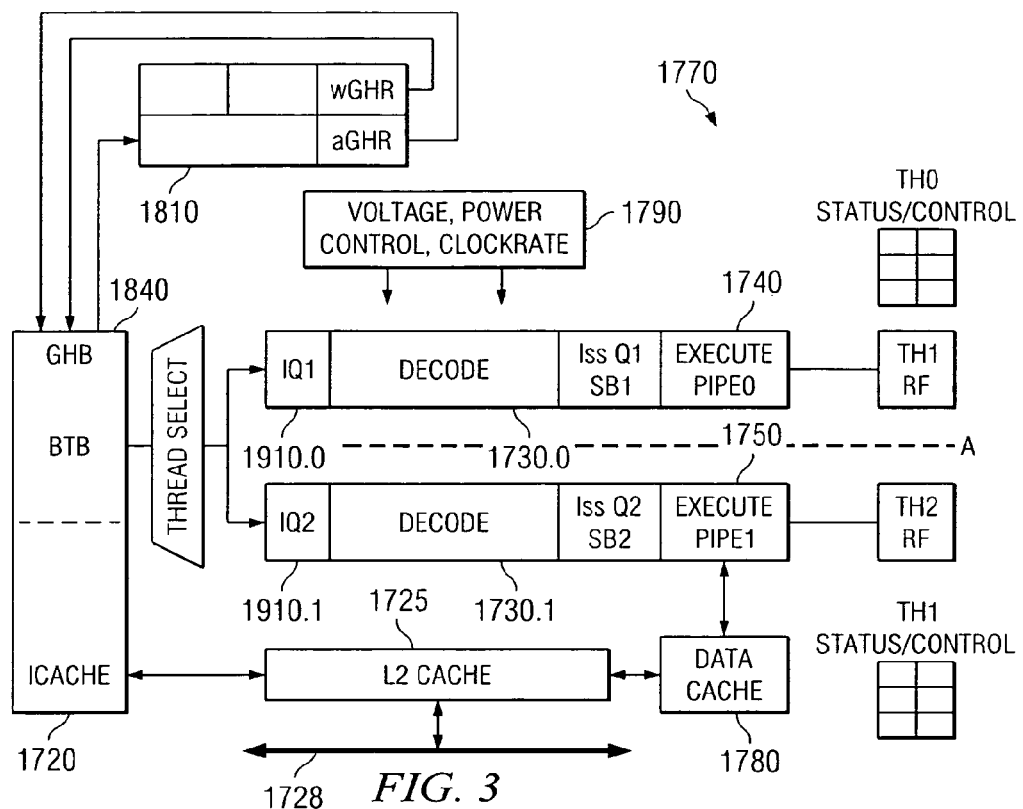
FIG. 3 is a block diagram of a first embodiment of an inventive power managed processor for use in the integrated circuits of FIG. 2, wherein each of the threads is directed to a single respective pipeline.

In FIG. 3, a first embodiment of decode pipe has two single-scalar (scalar herein) decode pipes operated so that each thread uses exactly one decode pipe. This embodiment is hardware-implemented to operate that way, or alternatively FIG. 3 represents a mode-controlled structure in a multi-threading control mode designated MTC=01 herein. This highly-parallel real-estate efficient embodiment splits the block diagram down the middle along an axis of symmetry A horizontally along the successive pipestages.

The IQ 1910 is split into issue queue IQ1 1910.0 and IQ2 1910.1 for respective thread pipes. The bandwidth of a decoder that can handle two instructions at a time for a single thread is split as decoders 1730.0 and 1730.1 to handle on average one instruction per thread for each of two threads in the multithreading mode (e.g. mode MTC=01 in the MT Control Mode Field of FIG. 8 register 3980). In this way, after fetch, each thread pipe identified by Thread Select value i of zero (0) or one (1) has an instruction queue 1910.$i$, decode pipe 1730.$i$, issue/replay queue 1950.$i$, scoreboard array SCBi, register file read, and an execute pipe such as with shift, ALU, and update/writeback. Each decode/replay thread attaches so each thread has an independent pipe.

In FIGS. 3, 4, 5, and 5A, the two (2) instruction queues IQ1 and IQ2 are operated based on a Thread Select value i. More generally, there is at least one instruction queue per pipeline capable of accommodating a distinct thread. The instruction fetches are sent directly to the respective instruction queue IQ1, IQ2 for each thread. When the queues are not full, the Thread Select value alternates, so instruction fetch alternates between the threads. Operating instruction fetch in this multi-threaded manner is expected to be often superior in performance to single thread mode because the multi-threaded operation keeps fetching for one currently-active thread even when the other thread has a pipe stall due to an L2 cache 1725 miss or a mis-predicted branch in that other thread. Also, when one instruction queue for a first thread is full, then the instruction fetch operation is directed to the second instruction queue and fetches instructions for the second thread. In single thread mode, the instruction queue suitably is operated to send instructions to both decode pipes. For multithreading, the pointers to an instruction queue block are manipulated by mapping them to act as two (2) queues (two (2) pointers) or a single queue (1 pointer).

Figure 4:
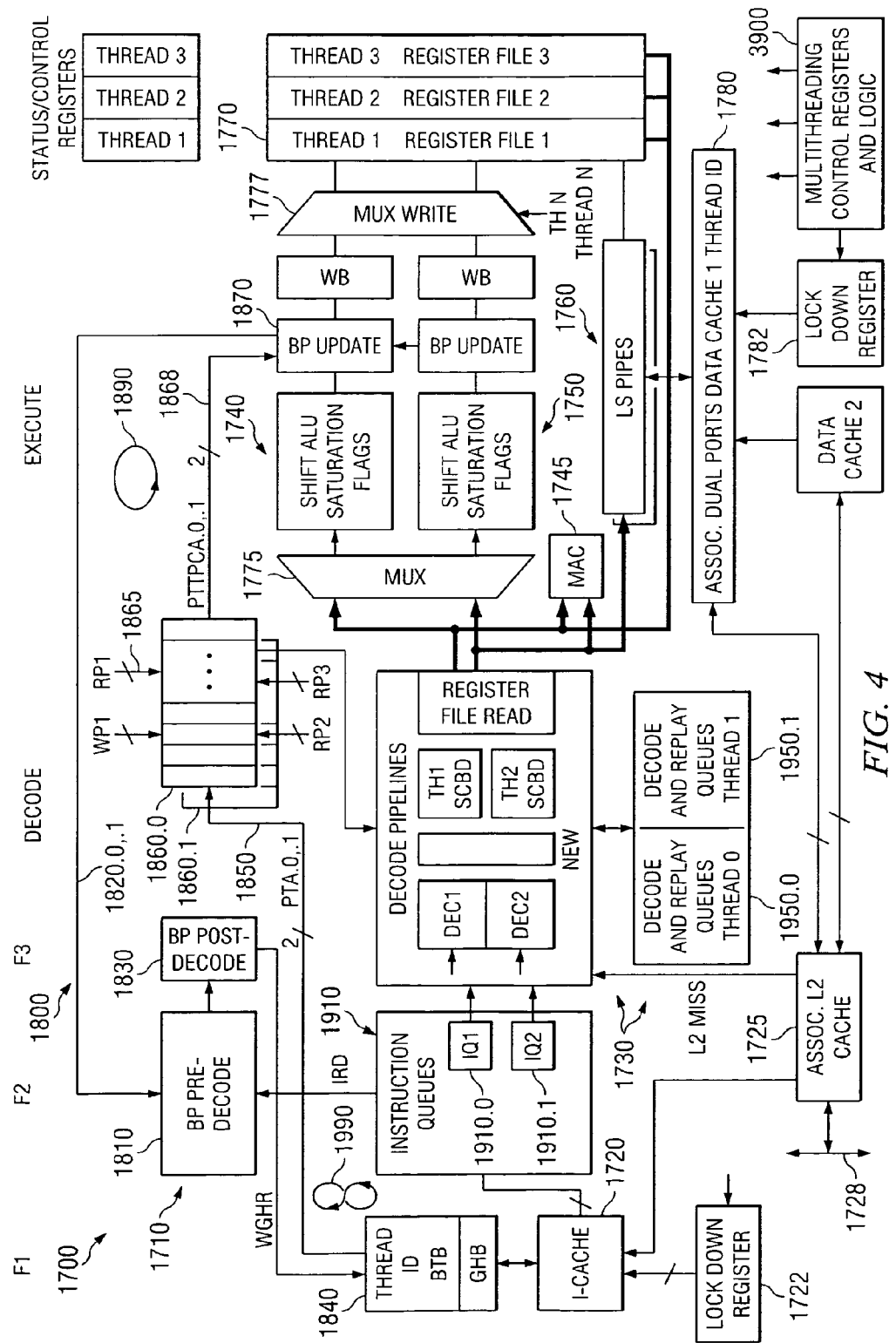
FIG. 4 is a block diagram of a second embodiment of an inventive power-managed processor for use in the integrated circuits of FIG. 2, wherein multi-mode multithreaded circuitry and register file multiplexing for the execute pipelines are provided. The register file multiplexing is suitably used in the circuitry of FIG. 3 as well.

The instruction queue IQ sends instructions through decode to Issue Queue (also called pending queue) 1950 IssQi of FIGS. 3 and 4. A single queue structure is suitably provided with thread pipe-based for pending queue pointers and replay queue pointers. Once an instruction is issued to an execute pipeline, the instruction is kept in this queue, so that if replay (such as due to L1 cache miss) is initiated, the instructions to be replayed are already in the pending queue, and the replay pointer indicates the point in the pending queue at which replay commences. The front end of the queue acts as skid buffer in Issue Queue 1950 and the back end of the queue is maintained for several cycles so that the pointer can be moved back there to commence replay.

Hardware is scaled up proportionately for additional threads. The scoreboard and register file (the read/write ports) circuitry is established to handle single issue in multi-threaded mode.

All processor status, control, configuration, context ID, program counter, and mode registers (processor registers) are duplicated. In this way, two threads run independently of each other as in FIG. 3 and in single-threaded mode of FIG. 5. In processors with a secure mode, one thread can be in secure mode even while the other thread is not in secure mode. The inclusion of thread ID (identification) in the TLB (translation look-aside buffer) and thread ID in the L1 cache tags prevent the non-secure thread from accessing data of the secure thread. The non-secure thread is not allowed to read any information of the other thread, like TLB entry, data/instruction addresses and any other important information that should be isolated.

In FIG. 4, the number of copies of register files and processor registers vary with embodiment, type of application and performance simulation results. One embodiment uses three (3) copies of the register files and processor registers. This embodiment is believed to allow fast switching if one thread is stalled by an L2 cache miss or an L3 cache miss.

Figures 1, 5B:
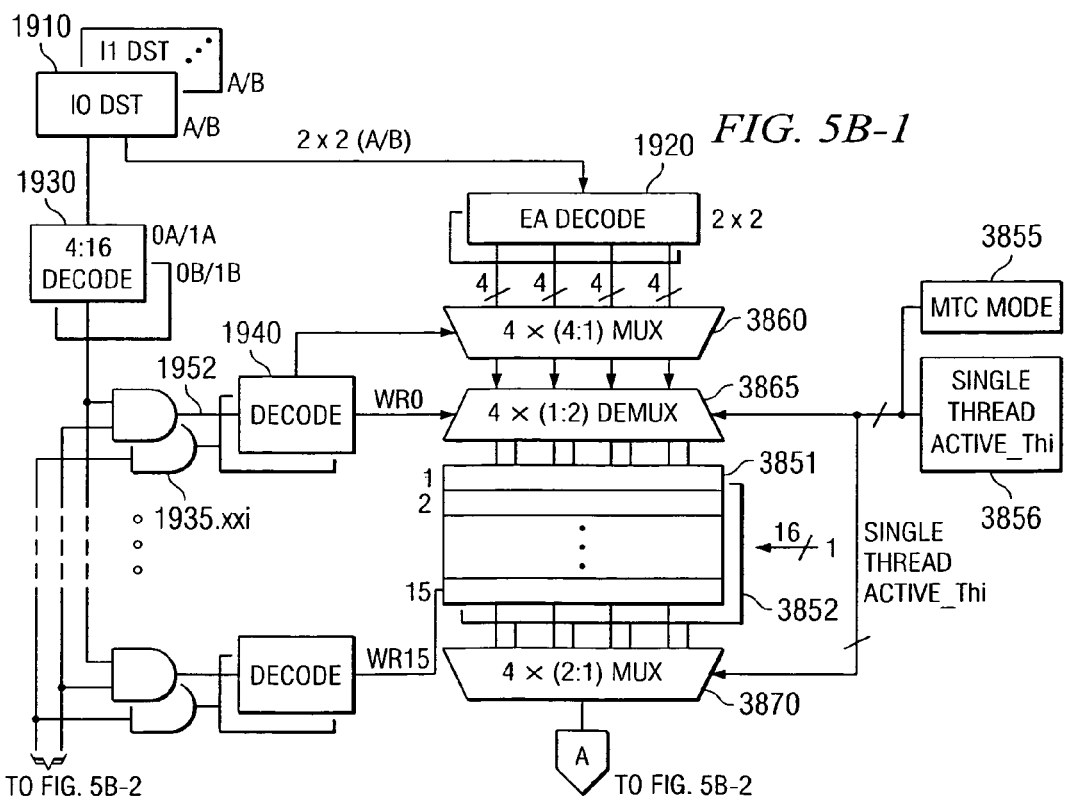
Figure 5:
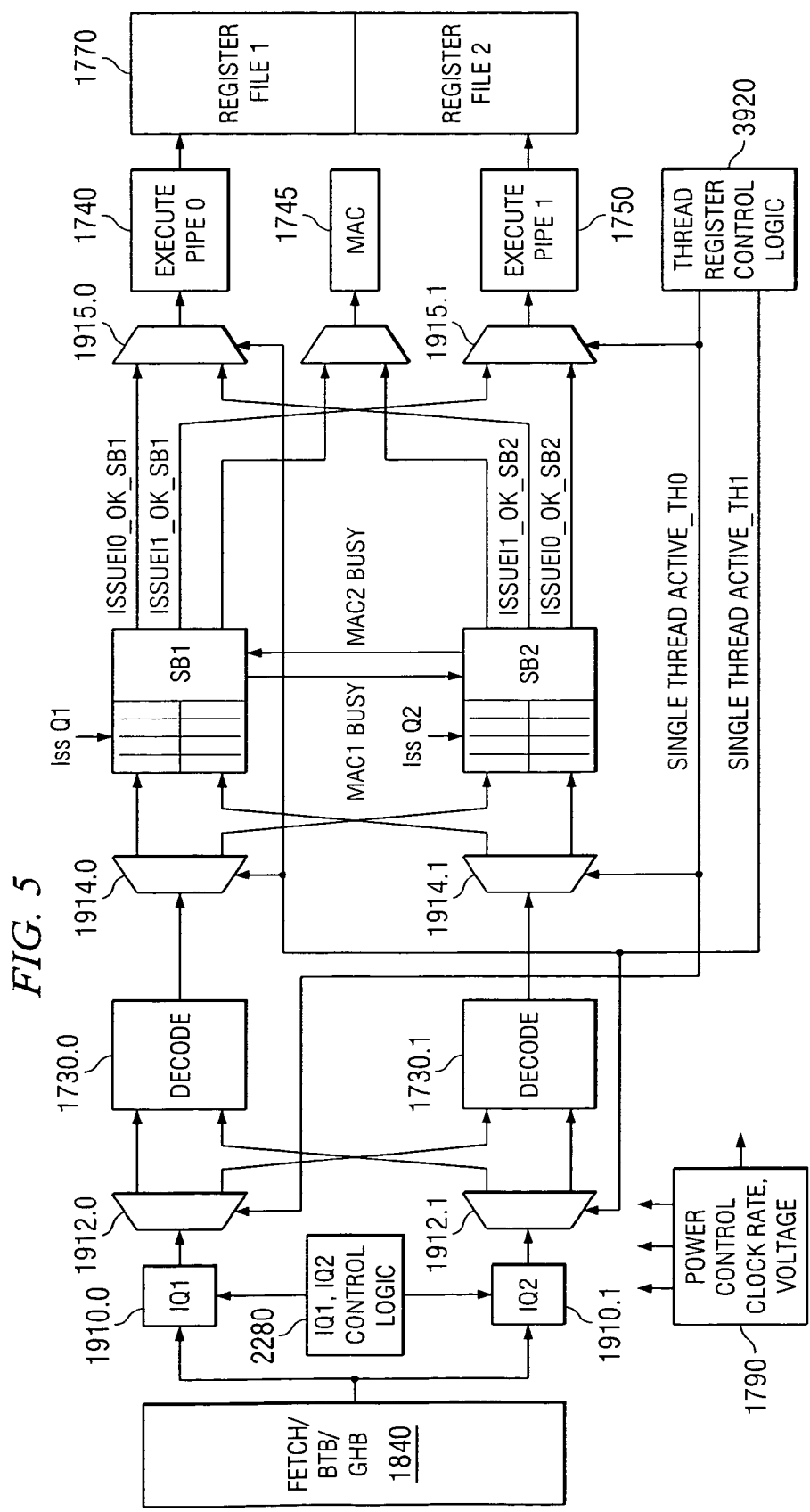
FIG. 5 is a block diagram of a third embodiment of an inventive power-managed processor for use in the integrated circuits of FIG. 2, wherein multiplexing of scoreboard circuitry is provided responsive to a SingleThreadActive control logic and control signal(s). The multiplexing of FIG. 5 is suitably used in the circuitry of FIG. 4 as well.

In FIGS. 4 and 5, on a stall due to an L2 cache miss, the other thread is allowed to take over both pipelines in a multithreading control mode (MTC=10 or 11) that permits such operation. When the L2 miss is signaled and no other thread is active, the thread returns to single pipeline mode. The instruction queue is flushed and used as single queue. The pending/replay queue retains the instructions for the L2 cache miss. When the memory system does return L2 cache data, the stall pipeline restarts without interrupting or delaying either pipeline or any thread. The number of entries in the pending queue is suitably increased to minimize the effect of fetching instructions again from instruction cache. As an alternative, the instruction queue is operated to retain its instructions during L2 miss.

On a stall due to an L2 cache miss, a third thread can take over the stall pipeline in a control mode that permits such operation (MTC=11). A new thread ID is used to fetch instructions and a third set of register file and processor registers are used for execution. The current two (2) threads suitably run until another L2 cache miss, and at this time, the previous L2-miss thread is restarted.

At any time, control circuitry in some embodiments is responsive to the higher priority thread (such as a real time program) so that the higher priority thread can stop one of the currently-running threads.

Thread-specific registers, control circuitry and muxes route outputs of thread-specific scoreboards for issue control selectively into each of plural pipelines. "Thread-specific" means that the architecture block (e.g., a scoreboard, etc.) is used for supporting a particular pipe at a given time, and not necessarily that the thread-specific block is dedicated to that thread ID all the time.

A Thread Select 2285 control for the Fetch unit (see FIG. 6B and Fetch unit of FIGS. 3, 5 and 6A/6B) is generated according to the following logic, for one example:
  If two (2) threads are active (from FIG. 8):
    If both IQ are not full, then toggle Thread Select in F0 stage;
      In F0 stage, Thread-Select is used to select which GHR, incremented address, and return stack output to use. Thread Select is pipelined down through F3 stage and used to select which IQ, branch FIFO, GHR to latch a new instruction or latch a new branch.
    If IQ1 is full and IQ0 is not, then Thread-Select=0.
    If IQ0 is full and IQ1 is not, then Thread-Select=1.
    If both IQ are full, then idle, no fetch.

If one (1) thread is active, then Thread-Select=the pipe selected by logic 3920 in FIG. 8.

In FIGS. 3, 4 and 5 and FIG. 6B, thread-specific Instruction Queues IQ1 and IQ2 have IQ control logic 2280 responsive to thread ID to enter instructions from Icache 1720 into different regions of a composite instruction queue or into thread-specific separate instruction queues. A common IQ control logic 2280 operates all the pointers responsive to the thread IDs since some pointer values are dependent on others in this multi-threading embodiment. Alternatively, IQ1 and IQ2 control circuits are interconnected to accomplish the pointers control operations contemplated herein.

Figure 6A:
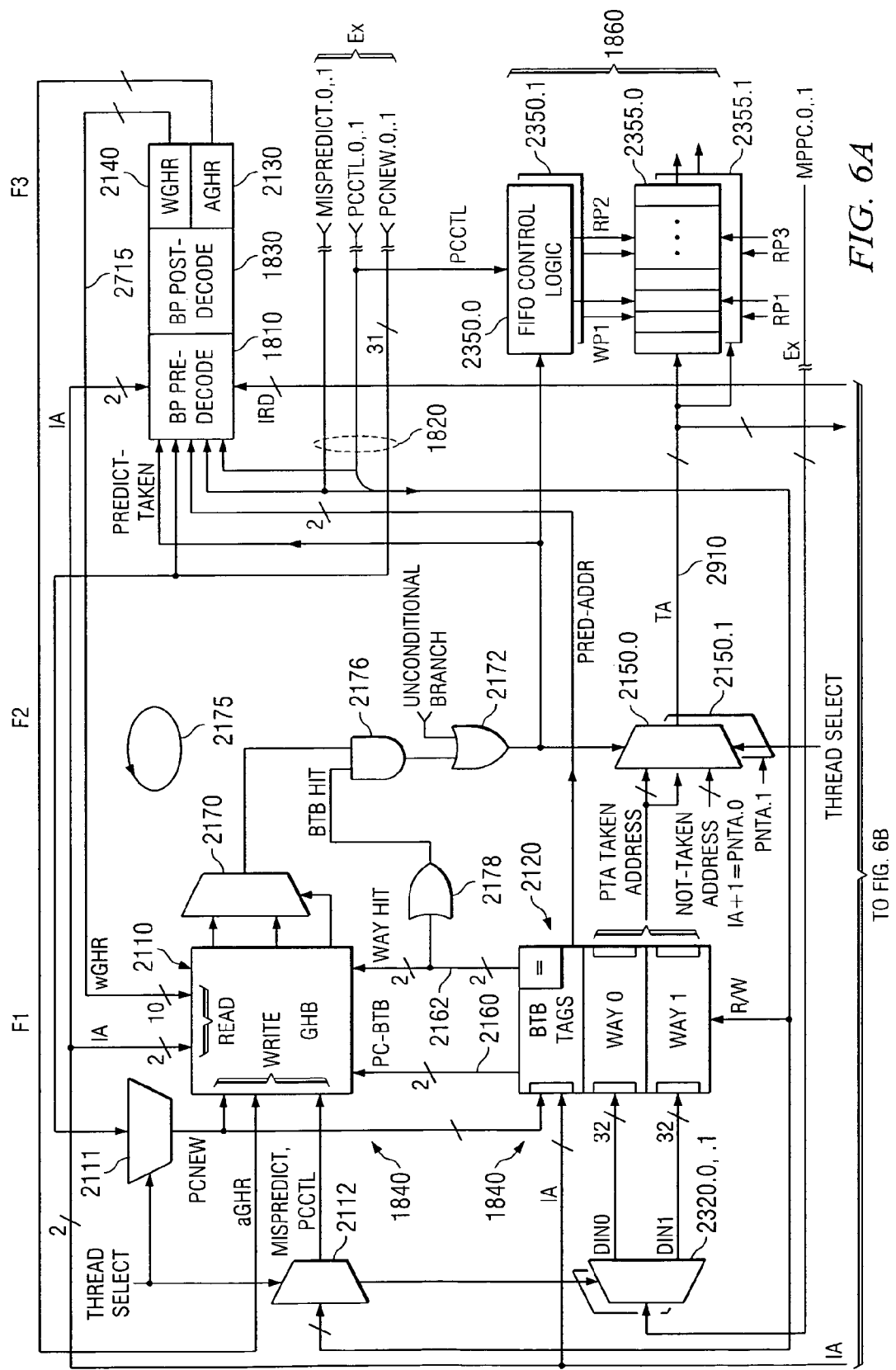
FIGS. 6A and 6B are two parts of a composite partially-block, partially-schematic diagram of an inventive multi-threaded fetch unit with a Global History Buffer (GHB) and a Branch Target Buffer (BTB) with thread-specific Predicted Taken-Branch Target Address FIFOs, an Instruction Cache, and thread-specific Instruction Queues.
Figure 6B:
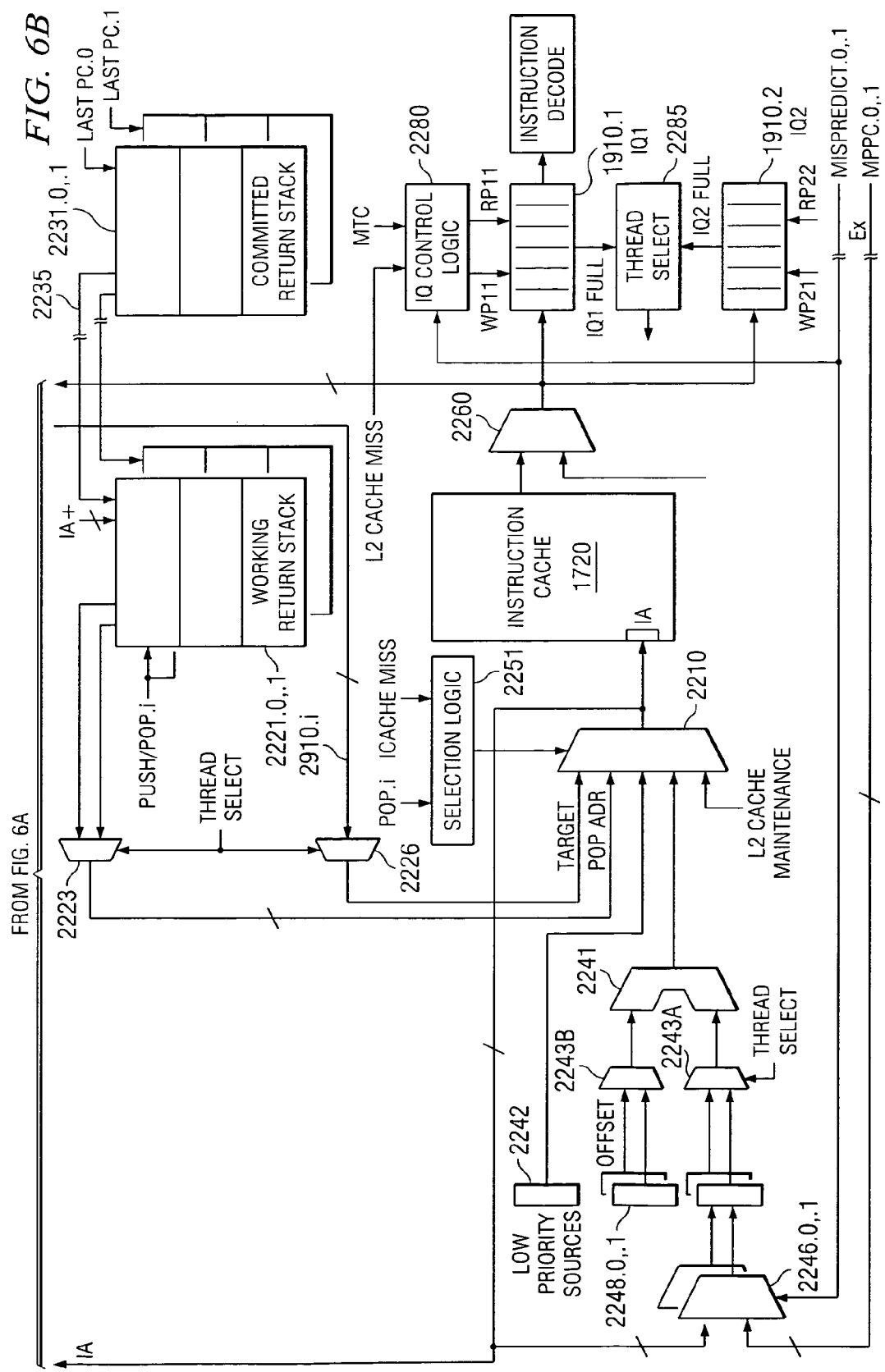

Flushing IQ on L2 cache miss for use as a single queue is an operation that is used in some embodiments according to FIG. 5 and FIG. 6B but is not needed in some embodiments according to FIG. 3. Flushing IQ is initiated and performed in the case when a single thread is to take over both pipelines, both decode pipelines and both execute pipelines. This operation is also responsive to an L2 cache miss line and/or MISPREDICT line to IQ control logic 2280 of FIG. 6B and to the contents of the Pipe Usage Register 3940 of FIG. 8.

The flushing of IQ is accomplished as follows. In FIG. 3 and FIG. 6B, IQ1 and IQ2 each have read and write pointers. These queues are suitably implemented as a register space that is provided with two sets of read and write pointers. In single-thread scalar mode, IQ2 is used for a single thread. The read and write pointer, instead of going to an IQ depth Diq (e.g. six) and wrap-around, now go to twice that depth 2 Diq and wrap around. To go to location Diq+1, the pointer then points to the other queue IQ1. The queues IQ1 and IQ2 are in the separate decode pointers.

Flushing IQ on L2 cache miss is optional, or depends on the Multithreading Control Mode MTC, as follows. Not flushing the IQ on L2 cache miss confers a power conservation advantage. Flushing, when used, saves the program counter PC for the thread and invalidates Instruction Queue IQ such as by clearing its valid bits before starting a new thread. In MTC=01 mode flushing instruction queue section IQi for a thread is not necessary because the pipeline for a thread is permitted to stall while an L2 cache miss is served. MTC=10 mode similarly leaves the IQi for the stalled thread undisturbed, but dual issues another active thread. When the L2 cache miss of the stalled thread is served, then the stalled thread resumes execution quickly due to the benefit of the undisturbed instructions in queue section IQi. In both MTC=01 and MTC=10 modes, a single thread is using that instruction queue section IQi, and that section does not need to be flushed. In MTC=11, the instruction queue is flushed to permit a new thread to be issued into the stalled pipe.

IQ is broken up when going from single thread to two threads in MTC=01 has independent IQ1 and IQ2 already. In MTC=10, one thread can dual issue into the pipeline occupied a stalled thread. This occurs by interrupt software or hardware that runs the operations to set up the new thread. It clears out the instruction queue entirely and starts fetching for both the first thread and second thread alternately. The PC for fetching for the first thread is set back to the point where instructions in IQ began.

Another type of embodiment can break up the IQ into two halves when the second thread is launched. A first thread has fetched instructions in the IQ. The embodiment keeps the instructions of the first thread that occupied the first part of IQ closest to the decode pipeline, e.g. IQ1. The second part IQ2 that was closest to fetch has instructions from the first thread cleared. Fetch then begins fetching instructions of the second thread and loading them into the cleared IQ2. IQ1 was full with instructions from the first thread, so Thread Select 2285 in FIG. 6B initially loads IQ2 with second thread instructions on every clock cycle without alternating which gives the second thread an initial benefit and boost. Then as the first thread executes during this time, IQ1 starts to empty, and Thread Select 2285 commences alternating fetches for the first and second thread in a convenient way for both instruction queue sections IQ1 and IQ2.

Emptying a pipe involves operations of preventing the pipe from writing to its register file, and clearing any storage elements in the pipestages. In this way, information from an old thread avoids being erroneously written into the register file for a new thread. The instruction queue and issue queue and appropriate scoreboard are cleared and everything else empties by itself. Instructions are fetched from the instruction cache and the filling length of fetch and decode pipe is likely in many embodiments to occupy sufficient clock cycles to clock out any contents of the execute pipeline.

In some embodiments herein, a pipeline need not empty on an old thread before a new thread can start down that pipeline. The hardware and process save the thread-specific PC.i, register file RFi, and processor state/status of the old thread, without emptying on the old thread, and a new thread starts down that pipeline.

The control circuitry is responsive to the fetched cache line data from the Icache 1720. In Icache 1720, in an example, all instructions (words) on the same cache line are from the same thread. The thread-specific lock tag for lock register 1722 applies to the entire instruction cache line. In some cases, two threads share the same physical region in memory, and then, in some instances, exactly the same cache line can take up two entries (and thus be deliberately entered twice) in the L1 instruction cache. The difference between these two entries is the distinct Thread ID values, each of which is made part of a tag address respective to each of the two entries. Often, however, two threads will not share the same physical region in the memory and the memory address MSBs (most significant bits) sufficiently identify a thread. The Thread ID is suitably used to manage the replacement algorithm (e.g., least recently used, least frequently used, etc.) of the cache. The thread-specific tag applies to each entry (cache line) of the instruction cache.

In the multi-threading embodiments of FIGS. 3, 4, 5 and 5A, the fetch operations alternate between fetching cache lines for Thread0 and Thread1 from Icache 1720. Fetch for Thread1 sends instructions to IQ1 and increments the write pointer for IQ1. Fetch for Thread2 sends instructions to IQ2 and increments the write pointer for IQ2. Each cache line is physically coupled or fed to both IQ1 and IQ2, but is actually clocked into the IQ1 or IQ2 pertaining to that thread. Then the write pointer for the particular IQ1 or IQ2 is incremented.

In FIGS. 3 and 4, thread-specific register sets are provided for Register File, Status Registers, Control Registers, Configuration Registers, Context ID Registers, PC, and Mode Registers.

In FIG. 3, a Thread-Specific Power Control block 1790 is provided. Two pipes are fully separated for respective support of each of two threads. Suppose one thread happens to be stalled due to a L1 cache miss. Because the pipes are dynamically dedicated to their threads, thread-specific power control easily and advantageously stalls a pipe by clock gating to turn the pipe operation off. If the pipe will be unused for a longer time as with L2 or higher cache miss, then a power control circuit to the pipeline can respond to power down the whole pipe by lowering the voltage or turning off the voltage while the data is coming in.

Instruction Efficiency. To consider the instruction efficiency improvement due to multi-threading, consider for reference two pipelines provided for optimum single thread execution with dual-issue. Suppose pipe0 ALU has a reference usage efficiency (fraction of clock cycles in use) of ER0 and pipe 1 ALU has a reference usage efficiency ER1 less than ER0. Total reference usage is ER0+ER1 and this level is generally less than twice the efficiency ER0. In symbols, $$ER1 < ER0 < ER0 + ER1 < 2ER0. \qquad (1)$$

Then in multi-threading with independent scalar pipes per thread, the ALU usage, for instance, in a given pipe for a single thread Em0 ordinarily goes up by putting a first thread through one pipe. Em0 usage is generally between the usage in either of the two pipes when the thread has access to both pipes. In the multi-threading case with independent pipe usage, this usage Em0 also pertains.

$$ER0 < Em0 < ER0 + ER1. \qquad (2)$$

Running two threads in both pipes independently in the present multi-threading approach potentially doubles the usage to Em0+Em1=2Em0. Doubling inequality (2) yields:

$$2ER0 < 2Em0 < 2ER0 + 2ER1. \qquad (3)$$

Comparing inequality (3) with inequality (1) yields:

$$2Em0 > 2ER0 > ER0 + ER1 \qquad (4)$$

In words, according to the independent pipe multi-threading approach described herein, multi-threading usage 2Em0 of the same architectural pipes exceeds their usage ER0+ER1 under a single-thread architecture. The percentage increase of performance of multi-threading is $$\% \text{ INCREASE} = 100\% \left\{ \frac{2Em0}{ER0 + ER1} - 1 \right\} \qquad (5)$$
$$= 100\% \left\{ \frac{(Em0 - ER0) + (Em0 - ER1)}{ER0 + ER1} \right\}$$

Depending on architecture and applications software, the % INCREASE will vary, but in many cases the % INCREASE amount will be substantial and well worth the effort to provide multi-threading.

Furthermore, when a single-threaded processor needs to execute a real-time thread under a real time operating system and another thread that is not a real-time thread is already running, then the first thread is shut down while the real-time thread comes in and runs. And subsequently, still more cycles may be consumed performing an operating system context switch between a real-time operating system to another operating system. So it is desirable to run each thread as fast as possible.

Multi-threading-based architectural structures and methods as taught herein remarkably improve any one or more of the processors and systems hereinabove and such other processor and system technologies now or in the future to which such improvements commend their use.

To solve problems as noted herein, inventive multi-threading and execution are provided. The inventive circuitry is relatively robust when the number of pipelines increases and when the number of execution pipeline stages in various one or more of the pipelines increases. The multi-threading method and circuitry operate at advantageously high frequency and low power dissipation for high overall performance of various types of microprocessors.

In FIG. 4, an inventive microprocessor 1700 has a fetch pipe 1710 obtaining instructions from one or more caches such as a level one (L1) instruction cache (Icache) 1720 and a level two (L2) instruction and data cache 1725 coupled to a system bus 1728.

Fetched instructions from the fetch pipe 1710 are passed to an instruction decode pipe 1730. Instruction decode pipe 1730 aligns, decodes, schedules and issues instructions at appropriate times defined by clock cycles. Fetch pipe 1710 and instruction decode pipe 1730 suitably each have one or more pipestages in them depending on the clock frequency and performance requirements of the application.

In FIG. 4, the pipeline has fetch pipestages F1 . . . FM followed by decode pipestages which are also suitably several in number in higher clock frequency embodiments. The last decode pipestage issues instructions into one or more pipelines such as a first arithmetic/logic pipeline Pipe0 1740, a second arithmetic/logic pipeline Pipe1 1750, and a load/store pipeline 1760. Pipe0 1740, Pipe1 1750 and LS pipeline 1760 write results to a register file 1770 and each have execute pipestages as illustrated. The pipelines 1740, 1750, 1760 suitably are provided with more, fewer, or unequal numbers of pipestages depending on the clock frequency and performance requirements of particular architectures and applications. Further pipelines are suitably added in parallel with or appended to particular pipelines or pipestages therein in various embodiments.

Zero, one or two instructions are issued in any given clock cycle in this embodiment, and more than two instructions are issued in other embodiments. Instruction decode Pipe 1730 in this embodiment issues a first thread instruction I0 to a first execute pipe Pipe0 1740, and issues a second thread instruction I1 to a second execute pipe Pipe1 1750. Instructions are suitably also issued to load/store pipeline 1760. Prior to issue, instructions I0 and I1 are called candidate instructions, herein.

When a first execute pipestage requires data that is available from a second execute pipestage, the second pipestage forwards the data to the first pipestage directly without accessing the register file. Forwarding is using the result data (before the result is written back into register file) as the source operand for subsequent instruction. Forwarding is described in further detail in connection with FIGS. 11A-11F. This embodiment is time-efficient, and makes the register file circuitry simpler by having the register file coupled to the last (the writeback WB) pipestage. There is no need for revisions to the register file data that might otherwise arise through branch misprediction, exception, and miss in data cache because writes to the register file from anywhere in the pipeline are prevented under those circumstances.

This embodiment features in order execution of threads with two execute pipelines. At least one program counter PC suitably keeps track of the instructions. The pipelines take into account the number of issued instructions, the instruction length and taken branch prediction, and calculate for and write to the program counters PC.i, such as a PC register in one of the respective register files RFi.

Decode pipe 1730 issues instructions to the LS pipe 1760 for load and/or store operations on a data cache 1780 for either unified memory or memory specifically reserved for data. Data cache 1780 is bidirectionally coupled to the L2 cache 1725.

Fetch pipeline 1710 has improved special branch prediction (BP) circuitry 1800 that includes a remarkable fine-grained branch prediction (BP) decoder including a BP Pre-Decode section 1810. Circuitry 1800 is fed by special message busses 1820.0, 1820.1 providing branch resolution feedback from the improved execute pipelines 1740 and 1750. BP Pre-Decode section 1810 supplies pre-decoded branch information to a BP Post-Decode section 1830 in at least one succeeding hidden pipestage F3.

BP Post-Decode Section 1830 supplies highly accurate, thread-selected speculative branch history wGHR.0, wGHR.1 bits to a branch prediction unit 1840 including a Global History Buffer (GHB) with thread-specific index hashing to supply highly accurate Taken/Not-Taken branch predictions. Hybrid branch prediction unit 1840 also includes a Branch Target Buffer (BTB) to supply Taken branch addresses. Unit 1840 supplies thread-specific predicted branch target addresses PTA.0, PTA.1 to special low power pointer-based FIFO sections 1860.0 and 1860.1 having pointers 1865. Low power pointer-based FIFO unit 1860 supplies thread-specific predicted taken target PC addresses PTTPCA.0, .1 on a bus 1868 as a feed-forward mechanism to respective branch resolution (BP Update) circuitry 1870.$i$ in Pipelines 1740 and 1750. Addresses PTTPC.0, .1 are analogously supplied to address calculation circuitry 1880 of FIG. 12 in each pipe respectively. BP Update circuits in each of Pipelines 1740 and 1750 are coupled to each other for single thread dual issue mode and to the feedback message-passing busses 1820.0, 1820.1 for branch resolution purposes.

In FIG. 4, Predicted-Taken Branch Target FIFOs 1860.0 and 1860.1 are provided for multithreaded operation. Control circuitry responds to thread ID (identification) to enter Predicted-Taken Target Addresses (PTAs) into different regions of one FIFO or into plural thread-specific PTA.i FIFO units. Each thread FIFO region or unit is provided with thread-specific write and read pointers and thread-specific control circuitry to control the pointers. See incorporated patent application TI-38195, Ser. No. 11/210,428, incorporated herein by reference, for description of a FIFO 1860 for single threaded operation.

In FIG. 4, in this way, remarkable branch prediction feedback loops 1890 are completed to include units and lines 1810, 1830, 1840, 1850.$i$, 1860.$i$, 1868.$i$, 1870.$i$, 1820.$i$. Fine-grained decoding 1810, 1830 excites branch prediction 1840 that feeds-forward information to BP Update circuits 1870.$i$ which then swiftly feed-back branch resolution information to even further improve the supply of wGHR.i bits from block 1830 to branch prediction 1840.

Branch prediction block 1840 is coupled to instruction cache Icache 1720 where a predicted Target Address TA is used for reading the Icache 1730 to obtain a next cache line having candidate instructions for the instruction stream. The Icache 1720 supplies candidate instructions to Instruction Queues (IQ) 1910.0, 1910.1 and also to BP Pre-Decode 1810. Instructions are coupled from Icache 1720 to BP Pre-Decode 1810, and instructions are coupled from Instruction Queues 1910.$i$ to the beginning of the respective decode pipelines 1730. Instruction Queue 1910 has IQ1 register file portion 1910.0 with write pointer WP11 and read pointer RP11; and IQ2 register file portion 1910.1 with write pointer WP21 and read pointer RP22. IQ Control Logic 2280 is responsive to thread ID to put the instructions for thread 0 into IQ1 and instructions for thread 1 into IQ2 in multi-threaded mode. In single-threaded mode, suppose Thread 1 has taken over both pipelines for dual-issue. Then IQ Control Logic 2280 is responsive to Thread 1 to put Thread 1 instructions alternately into IQ1 and IQ2 and send the instructions from IQ1 down the pipe0 decode pipe and the instructions from IQ2 down the pipe1 decode pipe.

Each of the decode pipelines 1730.0 and 1730.1 aligns instructions of each thread, which can carry over from one cache line to another, decodes the instructions, and schedules and issues these instructions to pipelines 1740, 1750, 1760. An example of instruction scheduling and issuing and execution data forwarding is further described in U.S. patent application Ser. No. 11/133,870 (TI-38176), filed May 18, 2005, titled "Processes, Circuits, Devices, And Systems For Scoreboard And Other Processor Improvements," which is hereby incorporated herein by reference. Respective decode and replay queues 1950.0, .1 are each coupled to the decode pipelines 1730.0, 1730.1 to handle cache misses, pipeline flushes, interrupt and exception handling and such other exceptional circumstances as are appropriately handled there.

Further in FIG. 4, issued instructions are executed as appropriate in the pipelines 1740, 1750 and 1760. In each of the pipelines Pipe0 1740 and Pipe1 1750, circuitry and operations are provided for shifting, ALU (arithmetic and logic), saturation and flags generation. BP Update 1870 is provided. Writeback WB is coupled via a Mux 1777 to Register File 1770, and a source operand Mux 1775 couples Register file 1770 to the execute pipes. One or more Multiply-accumulate MAC 1745 units are also suitably provided in some embodiments for providing additional digital signal processing and other functionality. Load/Store pipeline 1760 performs address generation and load/store operations.

In FIGS. 3, 4, 5, 5A, and 5B-1, 5B-2 multi-threaded instruction issue units and multi-threaded scoreboards are shown. Regulating the instruction issuance process is performed by part of the scoreboard logic (section is called a lower scoreboard herein) to compare the destination operands of each executing instruction with the source (consuming) operands of the instruction that is a candidate to issue. If a data hazard or dependency exists, the candidate instruction is stalled in a thread until the hazard or dependency is resolved and the other thread suitably continues issuing independently. If microprocessor clock frequency is increased, execution pipelines are suitably lengthened thereby increasing the number of comparisons. The number of comparisons is also directly affected by the number of execution units or pipelines that are in parallel, as in superscalar architectures. These comparisons and the logic to combine them and make decisions based on them are provided in a multi-threaded manner that is quite compatible with considerations of minimum cycle time and area of the microprocessor.

In FIG. 5, DeMuxes 1912.0 and 1912.1 couple the instruction queues IQ1 1910.0 and IQ2 1910.1 to instruction decode blocks 1730.0 and 1730.1. Each instruction decode block 1730.0 or 1730.1 decodes one thread apiece when two threads are operative in multithreaded mode MT=1. In single threaded mode, instructions in the thread are demuxed to the decoders so that decode 1730.0 decodes instructions and decode 1730.1 decodes other instructions in the thread for high bandwidth. DeMuxes 1914.0 and 1914.1 couple the decode circuitry 1730.0 and 1730.1 to the scoreboards SB1 and SB2 separately for multithreaded mode. DeMuxes 1914.0 and 1914.1 in the FIG. 5 embodiment couple the decode circuitry 1730.0 and 1730.1 to one scoreboard, such as SB1, in single-threaded dual issue mode MT=0. Also in FIG. 5, Mux 1915.0 and 1915.1 couple the scoreboard IssueIx_OK signals to the appropriate Execute pipe0 and pipe1.

The same selector control signal SingleThreadActive_Th1 (STA_Th1) controls both Muxes 1914.0 and 1915.0. Selector control signal SingleThreadActive_Th0 (STA_Th0) controls both Muxes 1914.1 and 1915.1.

In any embodiment represented by FIG. 5, each scoreboard SB1, SB2 controls dual-issue of instructions from its decode pipeline 1730.0, 1730.1 via muxes to one or both execute pipelines and the other decode pipe is inactive and issues no instructions. In SingleThreadActive_Th0 for Thread 0 taking over both pipelines, muxes 1914.1 and 1915.1 couple scoreboard SB1 for dual issue. In SingleThreadActive_Th1 for Thread 1 taking over both pipelines, the operation is just the reverse. In such case, the second thread Thread 1 takes over, and Thread 0 is shut off. Thread 1 instructions are decoded by both decode pipes and then routed via DeMux 1914.0 into scoreboard SB2 for dual-issue. The dual-issue for this scoreboard SB2, is also analogously also performed for instance by operations and structures for a scoreboard according to the incorporated TI-38176 patent application. Then dual issue of Thread 1 into Execute pipe1 occurs via Mux 1915.1 from SB2 and also into Execute pipe 0 via Mux 1915.0 from scoreboard SB2 also.

Note the general overall mirror symmetry of the architectural circuitry arrangement of FIG. 5 and some embodiments for implementing the Symmetric Multi-threading. Many embodiments obviate tagging instructions with Thread ID in the pipeline and eliminates the associated complexity of Thread ID pipeline tag control logic and pipeline register space. The symmetry and elegant pipeline parallelism of the architecture thread-by-thread in some embodiments is instead supported by circuitry and operations to generate a Thread Select bit or signal to route and mux instructions from the threads appropriately to use all the pipes for either multi-threading or single threaded operation.

If thread 0 ceases execution, or thread 1 has higher priority over thread 0, then SingleThreadActive_Th1 goes high and thread 1 can now use both pipelines. Accordingly, Mux 1915.1 selection changes to couple Issue1_OK_SB2 to Pipe1 and Mux 1915.0 continues to select Issue0_OK_SB2 and couple it to Pipe0. When thread 1 ceases, and scoreboard SB2 is off, then Mux 1915.0 couples IssueI0_OK_SB1 to Pipe0 and Issue1_OK_SB1 to Pipe1.

A thread control circuit 3920 produces the selector control signals SingleThreadActive_Th0 and _Th1. Thread control circuit 3920 is responsive to entries in control registers: 1) Thread Activity register 3930 with thread-specific bits indicating which threads (e.g., 0,1,2,3,4) are active (or not), 2) Pipe Usage register 3940 with thread-specific bits indicating whether each thread has concurrent access to one or two pipelines, and 3) Thread Priority Register 3950 having thread-specific portions indicating on a multi-level ranking scale the degree of priority of each thread (e.g. 000-111 binary) to signify that one thread needs to displace another in its pipeline. These registers 3930, 3940, 3950 are programmed by the Operating System OS prior to control of the threads.

Figure 5A:
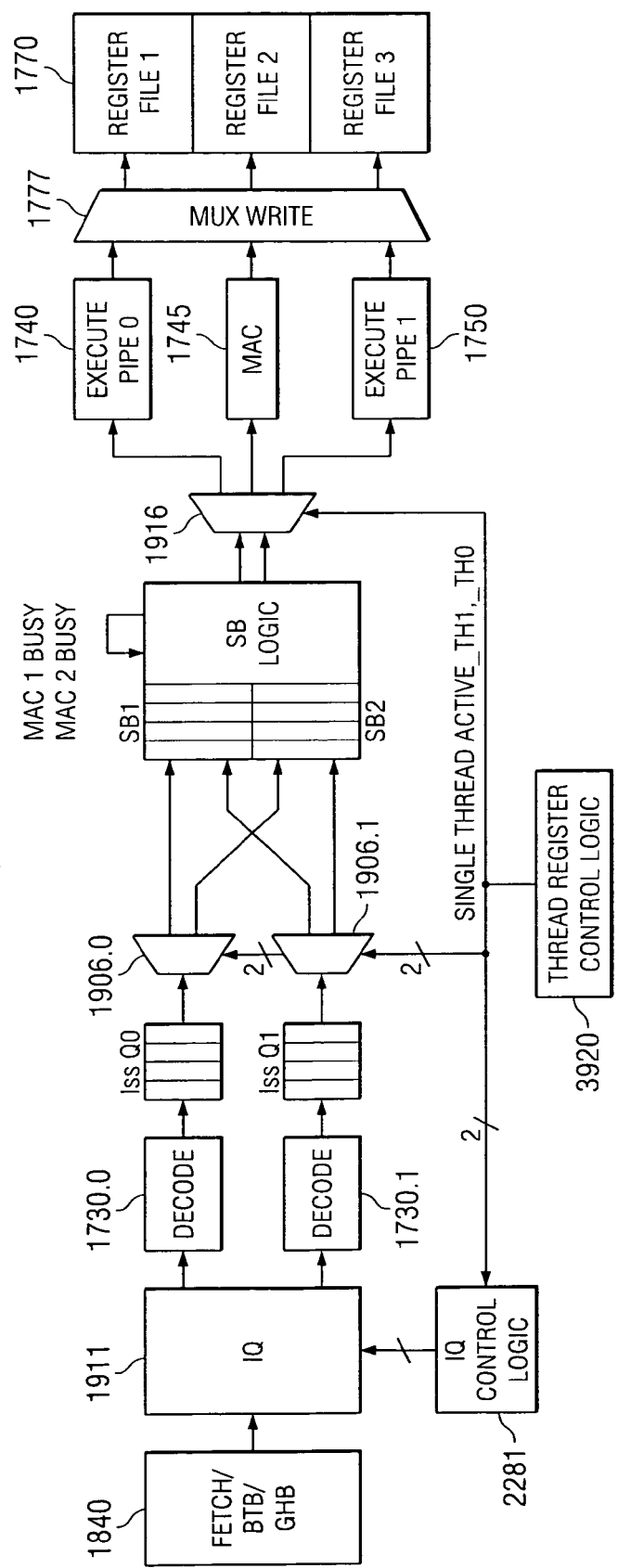
FIG. 5A is a block diagram of a fourth embodiment of an inventive power managed processor for use in the integrated circuits of FIG. 2, for multiplexing scoreboard circuitry.

In FIGS. 5, 5A and 8, Thread Register Control Logic 3920 generates different thread-specific signals and is suitably implemented as a state machine with logic in Logic 3920 as follows:

If only one thread is active (as entered in a bit of Thread Activity register 3930), then select that thread.

If it is a currently active thread, then select that pipeline (Thread-Select), and check register 3940 for 1 or 2 pipes to generate a respective signal or signals Single_Thread_Active_TH0 or/and Single_Thread_Active_TH1.

If it is not a currently active thread, then Thread_Select=0, and check register 3940 for 1 or 2 pipes to generate the signal Single_Thread_Active_TH0.

If two (2) or more threads are active, then compare the Priority register 3950 to select the two highest priority threads.

The upper scoreboard (data forwarding scoreboard portion) is fed down the pipeline into which an instruction is issued.

In a variant of FIG. 5, instructions are fetched in the fetch unit 1840 and tagged with Thread ID for BTB and instruction queue IQ 1911 by IQ control logic 2281. The instructions thus tagged with Thread ID are pipelined down the decode pipeline 1731. Thus, in this embodiment of FIG. 5A, instructions with different thread IDs are pipelined down the same decode pipeline 1731 whereupon they reach a 1:2 demux 1906. Single_Thread_Active_TH0 and Single_Thread_Active_TH1 control the selection made by the demux 1906 to supply output to the Issue Queue circuitry of FIG. 10A/10B and then to combined scoreboards SB of FIG. 5B-1, 5B-2 for the threads.

In FIG. 5A, instructions are fetched in the fetch unit 1840 and fed to instruction queue IQ 1911 by IQ control logic 2281. The instructions are routed down the decode pipelines 1730.0 and 1730.1 where they are respectively buffered in issue queues IssQ0 and IssQ1 respectively. This approach is compact and economical of real estate in respect to the issue-queue IssQ0 and IssQ1 real estate. The issue queues IssQ0 and IssQ1 are selectively coupled by demuxes 1906.0 and 1906.1 to one or both of two register arrays in scoreboard SB1 and scoreboard SB2. The scoreboard SB1 and SB2 share the issue queues IssQ0 and IssQ1. Thus, in this embodiment of FIG. 5A, instructions are issue queued directly and then demuxed into the scoreboard register arrays. Scoreboard SB logic provides the MACBusy0 and MACBusy1 bits, and delivers the IssueI0OK and IssueI1OK signals and issues instructions via demux 1916 to Execute Pipe0 1740, MAC 1745, and/or Execute Pipe1.

Single_Thread_Active_TH0 and Single_Thread_Active_TH1 control the selection made by the demuxes 1906.0, 1906.1 to supply output to the scoreboard circuitry of FIG. 10A/10B and then to combined scoreboards SB of FIG. 5B for the threads. In single-thread mode (MT=0), instructions from both issue queues IssQ0 and IssQ1 are routed by demuxes 1906.0, 1906.1 to the same register array, such as SB1 for instance in FIG. 5A. In multithreaded mode (MT=1), instructions from issue queues IssQ0 and IssQ1 are respectively routed by demuxes 1906.0, 1906.1 to different register arrays SB1, SB2 independently in FIG. 5A.

Further in FIG. 5A, the combined scoreboards SB have lower scoreboards to provide issue signals for the instructions in each active thread. Instruction issue is directed by a demux 1916 to execute Pipe0 or execute Pipe1 depending on the control to demux 1916 provided by signals Single_Thread_Active_TH0 and Single_Thread_Active_TH1 from Thread Register Control Logic 3920. The scoreboard has circuitry to supply signals MACBusy0 and MACBusy1 to control issuance when a MAC dependency is present. Execute Pipe0 and Pipe1 are coupled to register file unit 1770 having register files RF1, RF2, RD3 for different threads. The coupling of pipes to register file unit 1770 is provided by the coupling circuitry 1777.

In FIGS. 5B-1, 5B-2, the combined scoreboards SB for instruction issuance are shown in more detail. This embodiment of scoreboard recognizes that the instructions of a thread can be routed to two pipelines and the instructions of two threads can be routed to two pipelines.

Accordingly, a single pair of signals IssueI0OK and IssueI1OK suffice to handle both single thread processing as well as multithreading in this embodiment. The circuitry of FIGS. 5B-1 and 5B-2 show a scoreboard embodiment to generate the signals IssueI0OK and IssueI1OK to handle both a single thread and multithreading.

Figure 11A:
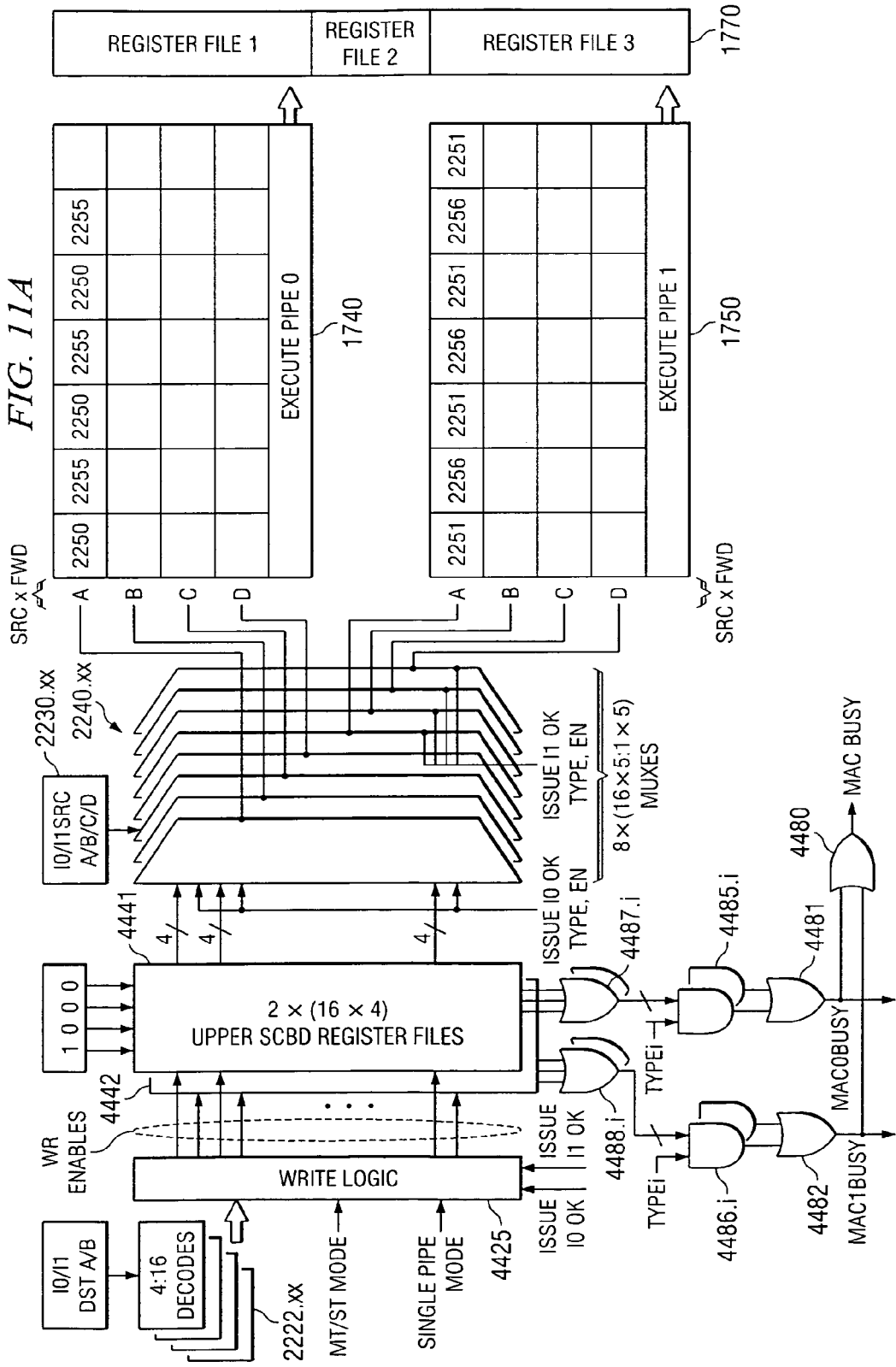
FIG. 11A is a partially-block, partially schematic diagram of an inventive multi-threaded forwarding scoreboard, for superscalar pipelines and having certain information pipelined down auxiliary registers of an execution pipeline and further having a MAC unit 1745, and having circuitry to produce thread-specific MACBusyi control signals for the scoreboards of FIGS. 3, 4, 5 and 5A, 5B-1, 5B-2, 9, 10, 10A and 10B.
Figure 11B:
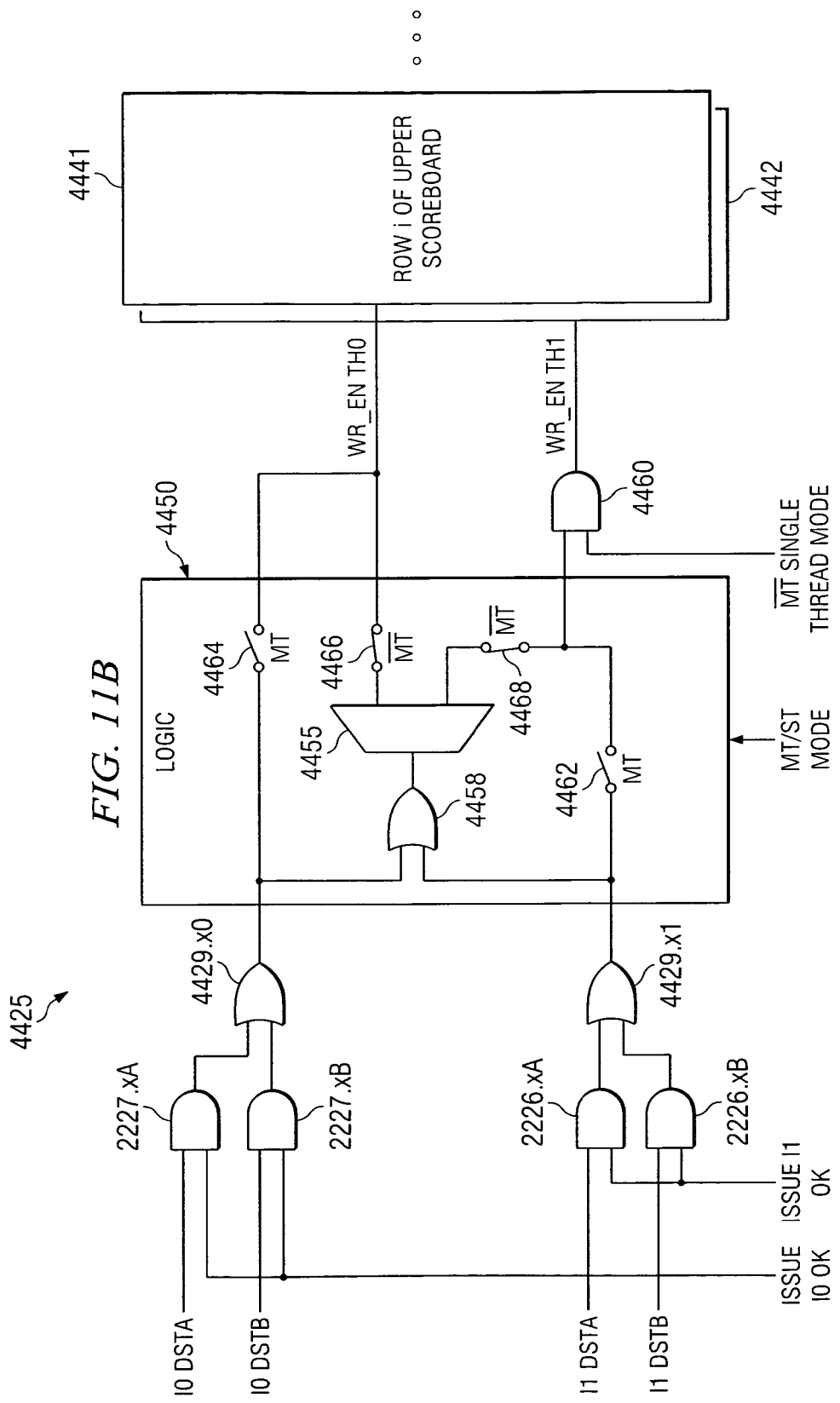
FIG. 11B is a schematic diagram detailing an inventive multi-mode, multi-threaded write circuit for use in the multi-threaded forwarding scoreboard of FIG. 11A.
Figure 11D:
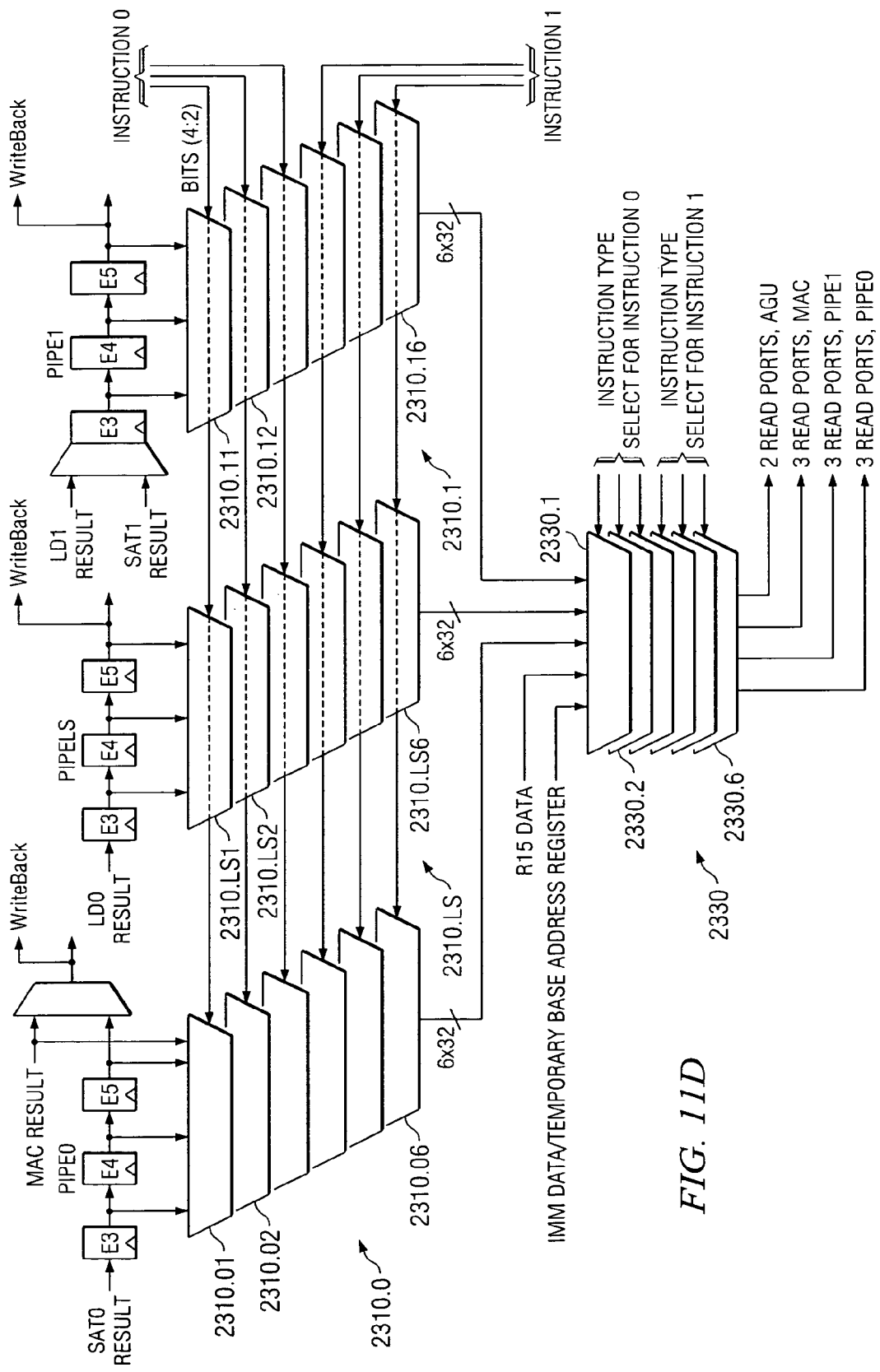
FIG. 11D is a block diagram of a multi-mode multi-threaded data forwarding circuitry for multithreaded superscalar pipelines for use in FIG. 11A.

Note that FIGS. 5B-1 and 5B-2 pertain to issue scoreboarding also called the lower scoreboard in this description. An upper scoreboard for controlling pipeline data forwarding is shown in FIGS. 11A and 11B.

In FIGS. 5B-1, 5B-2, 1900-level numerals are applied where possible to permit comparison of the embodiment herein with the single threaded circuitry of FIGS. 7A, 7B-1, 7B-2, 7C in the incorporated patent application TI-38176. 3800-level numerals are applied in FIGS. 5B-1, 5B-2 to highlight lower scoreboard structures and processes to handle multithreading and switch between handling a single thread and handling each additional thread.

In FIG. 5B-1, combinational write logic circuits 1910, 1920, 1930, 1935, 1940 are re-used without need of replication for each additional thread. In FIG. 5B-2 also, combinational read logic circuits 1958, 1960.0, 1960.1, 1965, 1975, 1985, 1988 are re-used without need of replication for each additional thread. In FIG. 5B-1, a set of scoreboard storage arrays 3851, 3852 (and additional arrays as desired) are provided to handle multithreading and thus represent a per-thread array replication. The scoreboard storage arrays 3851, 3852 are written via a mux 3860 and a 1:2 demux 3865.

In regard to FIGS. 5B-1 and 5B-2, consider two different embodiments that operate similarly in multithreaded mode (MT=1) by writing scoreboard information for each instruction in Thread 0 into a selected one of the scoreboard register arrays such as 3851 and write scoreboard information for each instruction in Thread 1 into the other array 3852. The two embodiments differ from each other in the manner of operation in single threaded mode (MT=0, or MT=1 and MTC=10 or 11 on a stall) when Pipe Usage permits a thread to use both pipelines.

A first type of embodiment operates in such single threaded mode by writing respective scoreboard information for both instructions I0 and I1 into one of the scoreboard register arrays such as 3851. The circuitry writes and reads the array in single thread mode in a manner like that described in incorporated patent application TI-38176 when Pipe Usage permits a single thread to dual issue and thus use both pipelines. If Pipe Usage permits the thread to use only one pipeline (such as in a power-saving mode that disables and powers down the other pipeline), then AND-gate 1975 is supplied with a disabling zero (0) power-saving mode input signal that prevents signal Issue1IOK from going high and ever issuing an instruction into Pipe1.

A second type of embodiment operates in such single threaded mode by writing respective scoreboard information for both instructions I0 and I1 into one of the scoreboard register arrays such as 3851 and concurrently writing the same respective scoreboard information for both instructions I0 and I1 into the other array 3852. This operation is called double-writing herein. Instruction I0 goes to array 3851 to check for dependency. Instruction I1 goes to array 3852 to check for dependency. The instructions are accessing and checking in two physically distinct scoreboard arrays for dependency instead of in one array. But the dependency EA information is double-written, by concurrently writing into both scoreboard arrays 3851, 3852 in FIG. 5B-1. When the scoreboard arrays 3851, 3852 are respectively read for dependency based on EN decode, they are read independently respective to instruction I0 in one array such as 3851 and respective to instruction I1 in the other array such as 3852.

This just-described second type of embodiment in FIGS. 5B-1, 5B-2 is believed to obviate use of mux 3870. Also, it simplifies switching from single threaded ST mode (MT=0) to multithreaded mode (MT=1) because all the dependency information remains in a scoreboard array such as 3851, and the thread continues executing seamlessly into its now-single assigned execute pipeline. Concurrently, the other scoreboard array such as 3852 is cleared, and an additional thread commences writing to and populating scoreboard array 3852 and issuing into the other execute pipeline assigned to the additional thread.

The scoreboard storage arrays 3851, 3852 are read via a coupling circuit 3870 such as a 2:1 mux for array selection in some embodiments which couples one or both of the arrays 3851, 3852 to the combinational read logic circuits 1958, 1960.0, 1960.1, 1965, 1975. In other embodiments the 2:1 mux 3870 is omitted, such as when double-writing is used in single threaded mode and respective array 3851, 3852 writes in multithreaded mode. In the double-write embodiment, scoreboard array 3851 is coupled directly to inputs of the read muxes 1958.0A, .0B, .0C, .0D. Scoreboard array 3852 is coupled directly to the inputs of the read muxes 1958.1A, .1B, .1C, .1D.

In FIG. 5B-2, in single thread operation above, the output of AND gate 1965 for signal Issue0OK to issue an instruction to Pipe0 is coupled by circuit 3880 to qualify an input of AND gate 1975 for Issue1IOK. In single thread mode, dual-issuing out of pipe 0 (SingleThreadActive_Th0 active) an instruction is thus disqualified for issue to execute Pipe1 if a preceding instruction is not issued to execute Pipe0. When dual-issue is based out of pipe1, (SingleThreadActive_Th1 active), AND-gate 1975 qualifies AND-gate 1965. Then an instruction is disqualified for issue to execute Pipe0 if a preceding instruction is not issued to execute Pipe1.

In multithreaded mode (MT=1), threads are assumed independent in this embodiment. Accordingly, a gate 3880 disconnects the output from AND gate 1965 from an input to AND gate 1975 when MT=1. Conversely, gate 3880 connects the output from AND gate 1965 to an input to AND gate 1975 in single threaded mode MT=0. Gate 3880 also connects the output from AND gate 1965 to an input to AND gate 1975 (or vice-versa) in multithreaded mode MT=1, control mode MTC=10 or 11 when a pipe is stalled and a currently-active thread in the other pipe is allowed to dual issue into the otherwise-stalled pipe.

In this way, for dual issue depend on which pipe is stalled, the scoreboard output logic 1965, 1975, 3880, etc., provides a symmetry under control of SingleThreadActive (STA_Th0 and STA_Th1) for controlling dual issue wherein instructions I0 and I1 take on the correct in-order issue roles. The running pipeline is stalled from issuing any instruction until all running thread instructions are retired (scoreboard is clear) before starting dual issue. In this way the scoreboard arrays are synchronized before dual issue starts.

Suppose two threads are active in multithreaded mode MT=1 and no stall is involved. A first thread is ready to issue a first thread instruction but the second thread is not ready to issue a second thread instruction. Then the first thread issues the first thread instruction and the second thread does not issue the second thread instruction. In another case, the second thread is ready to issue a second thread instruction but the first thread is not ready to issue a first thread instruction, and then the second thread issues the second thread instruction and the first thread does not issue the first thread instruction. In both cases, each thread issues or does not issue its thread instruction independent of the circumstances of the other thread.

In an example of operation of lower scoreboards SB, suppose a first active thread has a Thread ID=1 and that Thread ID=1 is assigned to Pipe0 and register file RF1. Further suppose that a second thread is active and its Thread ID=3, and Thread ID=3 is assigned to Pipe1 and RF2. This hypothetical information is already assigned and entered as shown in connection with the Pipe Thread Register 3915 and Thread Register File Register 3910 of FIG. 8. In this example, scoreboard storage array 3851 is associated to the thread assigned to Pipe0 (e.g., Thread ID=1 here), and scoreboard storage array 3852 is associated to the thread assigned to Pipe1 (e.g., Thread ID=3 here) through the scoreboard selector controls of TABLE 2. Using distinct scoreboard arrays 3851 and 3852 distinguishes the threads from each other in multithreaded mode, while efficiently reusing in both multithreaded and single threaded modes the same logic of EA Decode 1920, 4:16 Decode 1930, muxes 1958 and 1960, EN Decode 1985, and Source I0/I1 SRC Decodes 1988. When there is an L2 cache miss and a third thread enters (MTC=11 control mode), the scoreboard array assigned to the thread that cache-missed is cleared and used for the third thread.

Figure 7A:
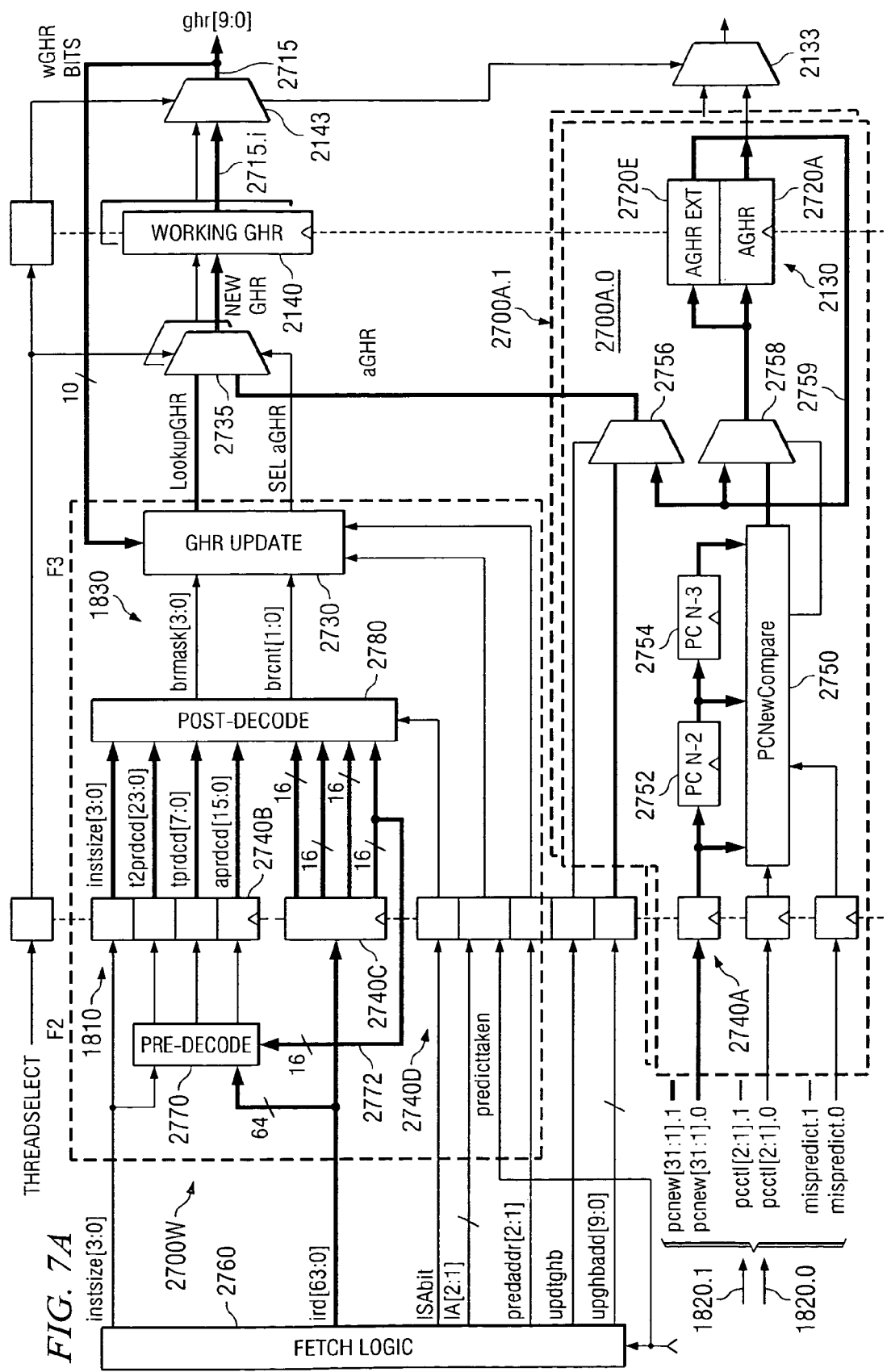
FIGS. 7A and 7B are two parts of a composite partially-block, partially-schematic diagram of an inventive multi-threaded Branch Prediction pre- and post-decode with speculative and actual Global History Registers (wGHR, aGHR) in FIG. 7A, and a diagram in FIG. 7B of Global History Buffer (GHB) circuitry fed by the circuitry of FIG. 7A, all for multi-threading use in FIG. 6A.
Figure 7B:
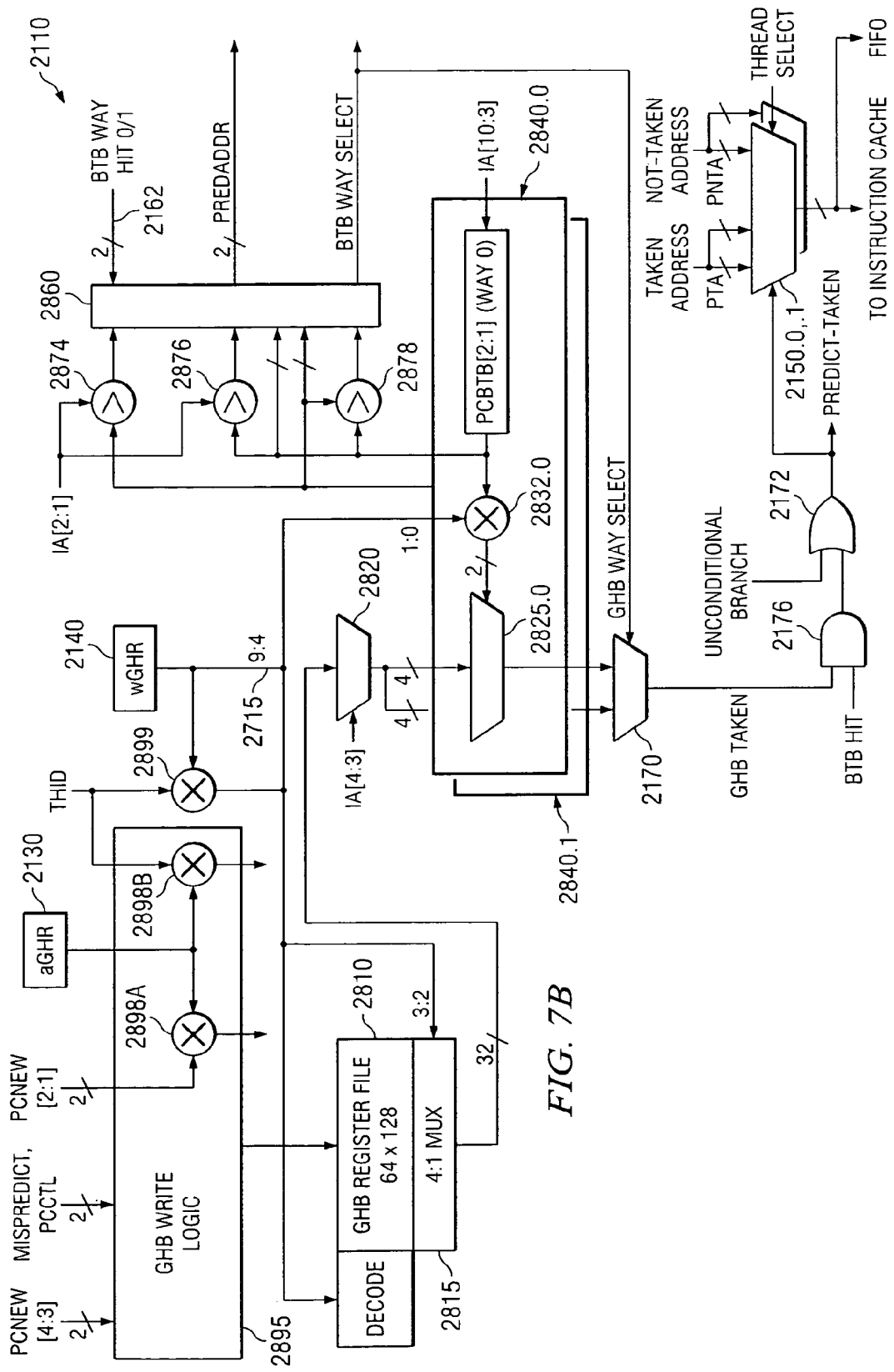

Refer to FIG. 5B-1 in this embodiment, and compare FIGS. 7A and 7B-1 in incorporated TI-38176. A 4:16 decode 1930.0A and AND-gates 1935.xxi collectively form a 1:16 demultiplexer (demux) which is responsive to a selection control signal representing a destination register DstA I0 to route bit contents 1922.0A of Execution Availability EA decode 1920.0A to a particular one of the sixteen destination lower row scoreboard shift registers 3851.i. Indeed, for single-thread operation there are four such collective 1:16 demultiplexers in this embodiment corresponding to decodes and gating for producer destination operands A and B for instructions I0 and I1 upon issuance, namely DstA I0 1910.0A, DstB I0 1910.0B, DstA I1 1910.1A, and DstB I1 1910.1B.

Further in FIG. 5B-1, for multithreaded mode (MT=1) the four collective 1:16 demultiplexers are re-arranged into two pairs by mode-responsive logic in this embodiment. This corresponds to decodes and gating for producer destination operands A and B (DstA I1 1910.1A, and DstB I1 1910.1B) for instruction I1 upon issuance to load sixteen destination lower row scoreboard shift registers 3852.i. Scoreboard shift registers 3851.i continue to be written by the other two collective 1:16 demultiplexers for instruction I0, with destinations DstA I0 1910.0A, DstB I0 1910.0B.

In this embodiment the number of shift registers (e.g., 16) exceeds the number of write multiplexers (e.g., 4) writing to them. The index i identifies a scoreboard unit shift register selected by each just-mentioned collective demux. Index i corresponds to and identifies destination register DstA I0, DstB I0, DstA I1, or DstB I1. Upon issue, a candidate instruction I0 thus changes role and becomes a producer instruction Ip on the scoreboard.

In this embodiment and using the destinations R5, R12 example, note that in FIG. 5B-1 I0 Write Decode (EA) bits 1922.0A from EA decode 1920.0A pertain to a given destination operand DstA. Bits 1922.0A are loaded (written) only into a particular one shift register 3851.i to which the bit field of DstA points. Index i is 5 or 12 output from 4:16 decoders 1930.0A and .0B respectively. The series of one-bits to load to represent EA=E3 pipestage is "0011" from EA decoder 1920.0A. The leftmost one is in column 3 because EA=E3. Compare to lower row 1720 of FIG. 4, cycle 1 in TI-38176. The 4:16 decoder 1930.0A and AND-gate 1935.0A5 thus routes I0 Write Decode bits 1922.0A "0011" (E3) to the appropriate single corresponding shift register 3851.5 among the 16 scoreboard shift registers 3851.0-3851.15. This is because the DstA I0 bits correspond to a single register address R5 in the register file.

Similarly, a 4:16 decoder 1930.0B and AND-gate 1935.0B12 (ellipsis) route I0 Write Decode bits 1922.0B. If pipestage EA for destination DstB is E2, then a decoder 1920.0B generates bits 1922.0B as "0111" (E2). These bits are concurrently written to the appropriate single corresponding shift register 3851.12 as directed by 4:16 decoder 1930.0B and AND-gate 1935.0B12, because the DstB I0 bits correspond to a single register address R12 in the register file.

For instruction I1, there are another set of destination bit fields DstA I1 and DstB I1 and another set of operations of writing (or dual-writing) the destination bit fields of I1 to particular scoreboard shift registers 3851.i (and 3852.i) in single-thread operation if instruction I1 is issued at the same time with instruction I0. A single write is directed to shift registers 3852.i in multithreaded mode (MT=1) where instruction I1 is in a different thread and thus independent of instruction I0. Additional AND-gates 1935.1A0-1935.1A15 and 1935.1B0-1935.1B15 are qualified by the signal IssueI1_OK and are responsive to 4:16 decoders 1930.1A and 1930.1B to select the particular mux-flop 3852.i on and into which the write of I1 Write Decode EA bits from decoders 1920.1A and 1920.1B are routed and performed.

Also, in the scoreboard logic of FIG. 5B-1 in single-thread operation, equality decoder blocks 1940.i compare destinations of instruction I1 against destinations of instruction I0. If there is a match and instruction I1 is issued, then in dual issue with STA-Th0 active from block 3856, the destination of instruction I1 has higher priority than instruction I0 to update the scoreboard register. To understand this, suppose the destination fields of I0 and I1 are compared and a match is found. In that case, and in this embodiment, instruction I1 is given first priority to update the scoreboard shift register to which the matching destination fields both point, instead of instruction I0. This approach is useful because the instruction I0 is earlier in the instruction flow of the software program than instruction I1. Since results of earlier instructions are used by later instructions in a software program, rather than the reverse, this priority assignment is appropriate when STA_Th0 is active. In dual issue with STA_Th1 active from block 3856, the roles of the instructions I0 and I1 are reversed and the write prioritization is reversed in FIG. 5B-1 and TABLE 2.

In multithreaded mode (MT=1) and all MT Control Modes MTC=01, 10, 11, as noted hereinabove, the instruction I1 is in a different thread and regarded as independent of instruction I0. Instruction I1 is independent of instruction I0 in multithreaded mode because the threads have register file destination registers in different areas RF1, RF2, etc. even if the destination registers do have only the four-bit identification of a register inside some register file. Accordingly, mode-dependent logic is provided in decoders 1940.i to bypass that matching and prioritization and allow instruction I0 to update the scoreboard register. See TABLE 2.

In an N-issue superscalar processor, as many as N instructions can be issued per clock cycle, and in that case N sets of Write Decode bits 1922.0x and 1922.1x (for I0 and I1) are latched into the scoreboard per cycle. In an example given here, N=2 for two-issue superscalar processor. The architecture is analogously augmented with more scoreboard arrays 3851, 3852, as well as not-shown similar array 3853, etc., with more muxing for more thread pipes in higher-issue superscalar embodiments. All the information relating to the location of each such previous (issued) instruction and which clock cycles (pipestages) have valid results are captured in the upper and lower rows of the scoreboard. The shift mechanism of the scoreboard (upper row shift right singleton one for location and lower row shift left ones for valid result) thus keeps track of all previous producer instructions in the pipelines.

Every register in a register file RFi which is being sourced by an issuing instruction at any pipestage in the pipeline, has a corresponding row of flops in shift register circuit 3851.i in single-thread mode actively providing lower row scoreboarding in FIG. 5B-1. In multithreaded mode (MT=1) each particular thread has its instructions selectively sent to shift register circuit 3852.*i*, or 3851.*i* instead, depending on which of 3852.*i* or 3851.*i* is assigned to that thread.

In the go/no-go lower scoreboard Decode I0 Write decoders 1930.0A, .0B, .1A, .1B, suppose instruction I0 has destination operands DstA and DstB, and instruction I1 has its own destination operands DstA and DstB. All these destinations Dst potentially have different pipestages of first availability EA but some same destination registers. Accordingly, multiple write ports (e.g., four write ports in this example) for the lower-row scoreboard units 3851.*i* are provided to handle both instructions and both destinations in single-thread operation. The possibility of a simultaneous write is typified by a case wherein different destination operands DstA I0 and DstA I1 point to the same register file register, say R5, in single-thread mode, and a prioritization decoders are provided as described in incorporated patent application TI-38176.

For handling the multithreaded mode (MT=1), scoreboard arrays 3852 are provided with two write ports in some embodiments. In other embodiments handling multithreaded mode, the scoreboard arrays 3852 have four write ports and speedily handle transitions when one thread completes execution and finishes using its scoreboard array (e.g., 3851) and the remaining thread takes over both pipes and goes from using two write ports to four write ports in the scoreboard array assigned to it (e.g., 3852).

Consider an embodiment wherein scoreboard arrays 3851 and 3852 are identically written in single-threaded ST mode (MT=0) and in the single-issue stall handling in the MTC modes (MTC=10 and MTC=11) of the multithreaded mode (MT=1). An example of such embodiment in MT mode establishes 4×(4:1) mux 3860 as a pair of 2×(4:1) muxes 3860.0 and 3860.1 and Demux 3865 operates in MT mode to directly couple mux 3860.0 as two write ports to scoreboard array 3851 and directly couple mux 3860.1 as two write ports to scoreboard array 3852. But in ST Mode and instances of single-thread handling of stalls in MT mode, the Demux 3865 is responsive to mode signal 3855 of FIG. 5B-1 to clear both scoreboard arrays 3851 and 3852 and then write (double write operation) to both of them in parallel based on the output of both muxes 3860.0 and 3860.1 operating together as four write ports to load both scoreboard arrays 3851 and 3852 concurrently.

Write Enable lines 1952.*xxx* are fed by the output of respective AND-gates 1935.0Ai, .0Bi, .1Ai, .1Bi. 1/0 signals on each output are tabulated as four digit numbers in the left column of TABLE 1. AND-gate 1935.0Ai has a first input coupled to output i of 4:16 decoder 1930.0A, and a second input coupled to line IssueI0_OK. AND-gate 1935.0Bi has a first input coupled to output i of 4:16 decoder 1930.0B, and a second input coupled to line Issue I0_OK. AND-gate 1935.1Ai has a first input coupled to output i of 4:16 decoder 1930.1A, and a second input coupled to line Issue I1_OK. AND-gate 1935.1Bi has a first input coupled to output i of 4:16 decoder 1930.1B, and a second input coupled to line Issue I1_OK.

The priority circuitry has four write enable lines 1952.0A5, .0B5, .1A5, .1B5 going to the decoder 1940.5 that feeds selector controls to submux 3860.0.5 and submux 3860.1.5 for mux-flop shift register row 3851.5 and 3852.5 in the scoreboard arrays. Every submux such as 3860.0.5 has two inputs for EA decode bits 1922.0A, .0B, and submux 3860.1.5 has two inputs for EA decode bits 1922.1A, .1B, plus a fifth column input for the bit series of advancing ones in cascaded flops 3851.*xx* and 3852.*xx* fed from right by one-line 1953. One of the inputs is selected by every submux 3860.0.5 and 3860.1.5 as directed by decoder 1940.5.

The sixteen identical prioritization decoders 1940.*i* have output lines for prioritized selector control of all m of the submuxes 3860.0.*i.m* in each shift register row 3851.*i*, and of all m of the submuxes 3860.1.*i.m* in each shift register row 3852.*i*. (Index m goes from 1 to M–1 pipestages.) Each decoder 1940.*i* illustratively operates in response to the 1 or 0 outputs of AND-gates 1935.*xxi* according to the following TABLE 2. Due to the parallelism in each shift register 3851.*i* and 3852.*i* and the structure of TABLE 2, the logic for this muxing 1940.*i* is readily prepared by the skilled worker to implement TABLE 2.

TABLE 2

DECODER 1940.i AND MUX 3860, 3865 OPERATIONS

| Write Enables 1962.xxx (.0Ai, .0Bi, .1Ai, .1Bi) | SINGLE-THREADED Write Decode Bits (EA) From 1920.xx or shift from next-right in 3851 or 3852 | MULTITHREADED Write Decode Bits (EA) from 1922.xx or shift from next-right in 3851 or 3852 |
|---|---|---|
| 0000 | Shift 3851.i, 3852.i | Shift 3851.i, 3852.i |
| 0001 | .1Bi to 3851/3852 | Shift 3851.k<br>.1Bi to 3852 |
| 0010 | .1Ai to 3851/3852 | Shift 3851.i<br>.1Ai to 3852 |
| 0011 | error in I1 | Shift 3851.i<br>Error in I1: 3852 |
| 0100 | .0Bi to 3851/3852 | .0Bi to 3851<br>Shift 3852.i |
| 0101 | STA_Th0 = 1: .1Bi (priority) to 3851/3852<br>STA_Th1 = 1: .0Bi (priority) to 3851/3852 | .0Bi, .1Bi (no priority) to respective 3851, 3852 |
| 0110 | STA_Th0 = 1: .1Ai (priority) to 3851/3852<br>STA_Th1 = 1: .0Bi (priority) to 3851/3852 | .0Bi, .1Ai (no priority) to respective 3851, 3852 |
| 0111 | error in I1 | .0Bi to 3851<br>Error in I1: 3852 |
| 1000 | .0Ai to 3851/3852 | .0Ai to 3851<br>Shift 3852.i |
| 1001 | STA_Th0 = 1: .1Bi (priority) to 3851/3852<br>STA_Th1 = 1: .0Ai (priority) to 3851/3852 | .0Ai, .1Bi (no priority) to respective 3851, 3852 |
| 1010 | STA_Th0 = 1: .1Ai (priority) to 3851/3852<br>STA_Th1 = 1: .0Ai (priority) to 3851/3852 | .0Ai, .1Ai (no priority) to respective 3851, 3852 |
| 1011 | error in I1 | .0Ai to 3851<br>Error in I1: 3852 |
| 1100 | error in I0 | Error in i0: 3851<br>Shift 3852.i |
| 1101 | error in I0 | Error in I0: 3851<br>.1Bi to 3852.i |
| 1110 | error in I0 | Error in I0: 3851<br>.1Ai to 3852.i |
| 1111 | error in I0 and I1 | Error in I0: 3851<br>Error in I1: 3852 |

Candidate instruction(s) are entered on the scoreboard when they are enabled to issue. The prior determination of whether to issue a candidate instruction is further described elsewhere herein such as in connection with FIGS. 5B-1, 5B-2 and 10A, 10B.

In single-threaded ST mode (MT=0), the FIG. 8 mode register 3980 together with logic 3920 and state machine 3980 establishes a prevention mechanism that prevents more than one thread from issuing. Also, monitoring circuitry takes an instruction exception such as in response to the presence of an opcode that is not a permitted opcode, represents an attempted access to a non-existent register, or attempted access to a location without a secure privilege to access.

Both thread pipes are suitably governed by the particular architecture established by design based on the teachings herein, incorrect instructions are captured, and accesses to unauthorized addresses are detected. Both thread pipes can take an instruction exception as just-described independently and concurrently, such as in connection with error(s) in TABLE 1, because there are parallel decode pipelines. Instruction exceptions handle independently on a thread-specific basis in various multithreaded embodiments.

External interrupts are suitably handled swiftly by giving an interrupt thread the use of both pipelines in Pipe Thread Register 3915. An external interrupt thread is allowed to occupy both pipelines unless Pipe Usage is thread-specifically set more restrictively to permit only one pipeline for a given interrupt thread.

Figure 11E:
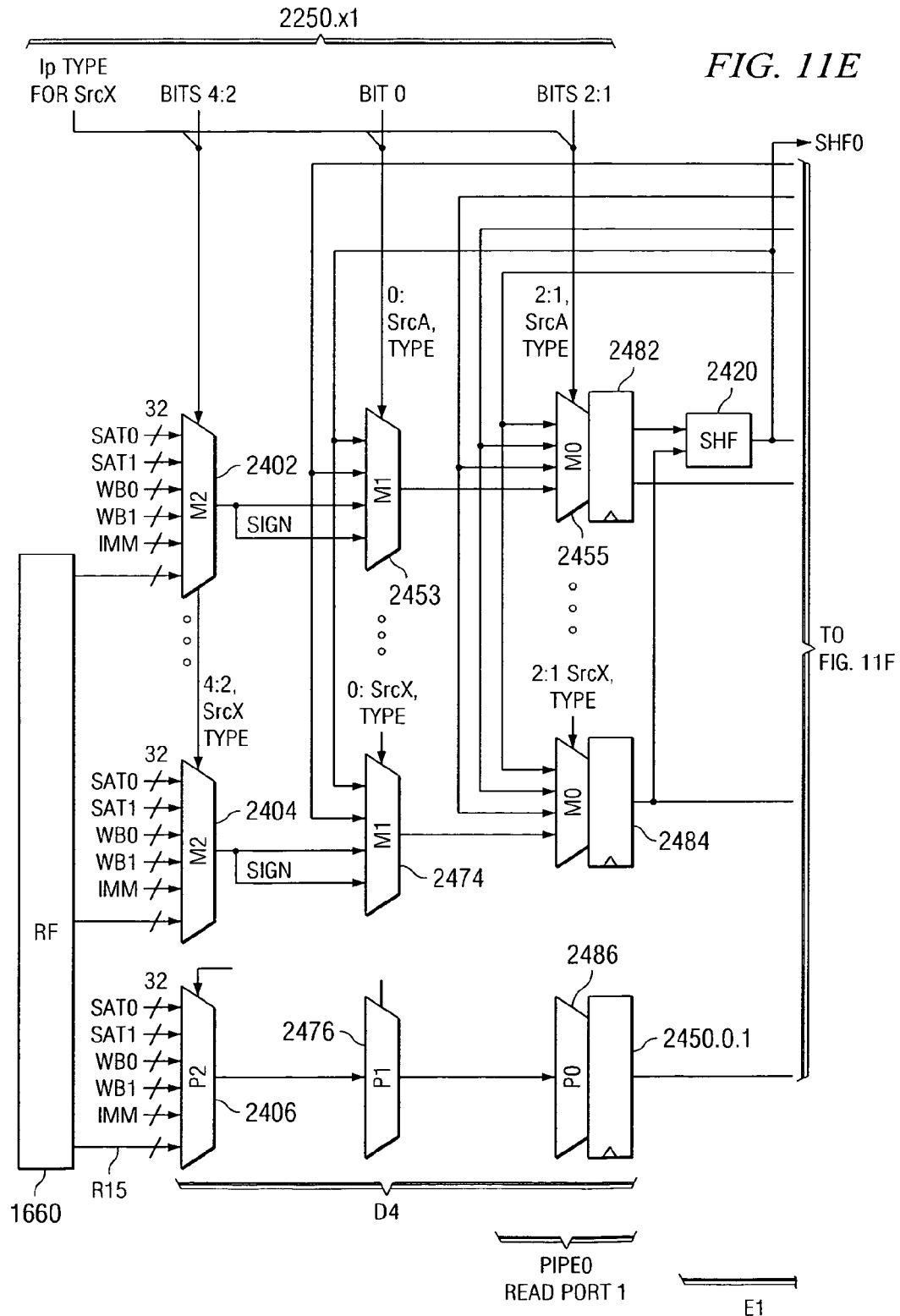
FIGS. 11E and 11F are two parts of a composite partially-block, partially schematic diagram of inventive multi-mode multi-threaded data forwarding circuitry for superscalar pipelines for use in FIG. 11A.
Figure 11F:
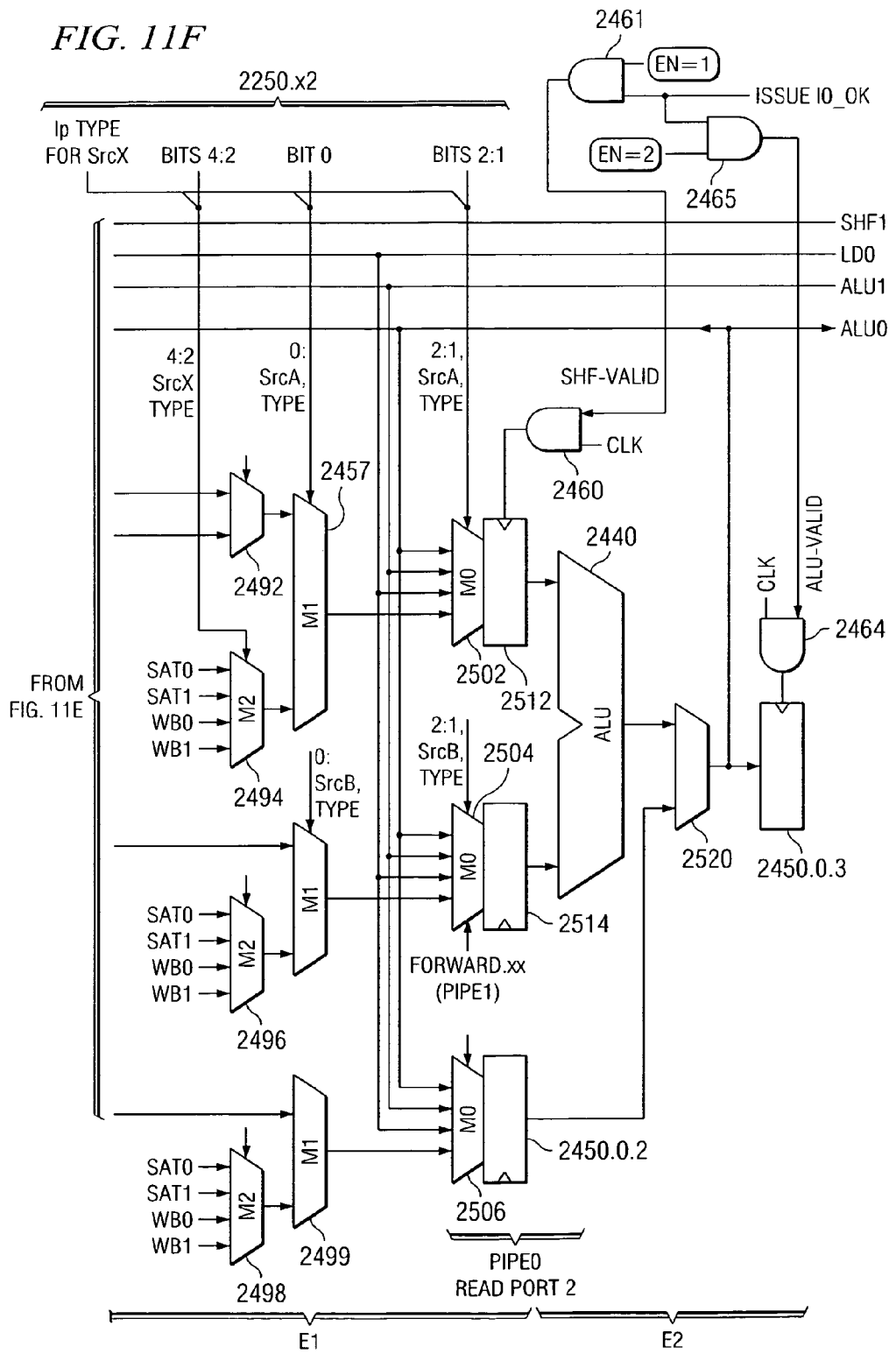

In FIGS. 5, 5A and FIG. 11E, the MAC is muxed to operate with 2 threads and with 1 thread so that source operands are muxed from two or more execute pipelines whether a given source operand is from one or two threads (or more). Whichever pipe has a valid MAC instruction is coupled by the mux to the MAC unit 1745. The result data from the MAC is muxed back to whichever execute pipeline provided the source operands, and that execute pipeline writes to the thread-specific register file pertaining to the thread executing in that execute pipeline.

In FIGS. 5 and 5A, consider the issuance of a MAC instruction, meaning an instruction with instruction Type code as in incorporated application TI-38176 for MAC type. Further MAC-related control is depicted in FIG. 11A and FIGS. 5B-1, 5B-2. A MAC busy bit is external to the scoreboard and handles MAC dependencies. The MAC busy bit generates and provides an additional stall signal external to the decode stage to stall the pipeline in the decode stage by preventing issuance of another MAC instruction from a different thread until the MAC unit 1745 is no longer busy.

A MACBusy0 bit pertaining to a first MAC instruction from decode unit 1730.0 is set to one (1) when that first MAC instruction is issued to the MAC unit 1745. The MACBusy0 bit prevents a second MAC instruction, if any, from issuing to the MAC unit 1745 from either decode unit 1730.0 or 1730.1 until the MAC unit 1745 has sufficiently processed the first MAC instruction so as to be available to receive the second MAC instruction. Similarly, a MACBusy1 bit pertaining to a first MAC instruction from decode unit 1730.1 is set to one (1) when that first MAC instruction is issued to the MAC unit 1745. The MACBusy0 bit prevents a second MAC instruction, if any, from issuing to the MAC unit 1745 from either decode unit 1730.0 or 1730.1 until the MAC unit 1745 has sufficiently processed the first MAC instruction so as to be available to receive the second MAC instruction.

FIG. 5B-2 shows further logic circuitry for controlling instruction issuance where MAC dependency is involved and is described in further detail in connection with FIG. 11A hereinbelow.

In the FIGS. 6A/6B, 7A/7B embodiment, the fine-grained decode for branch prediction respectively works analogously for multi-threading as described for a single thread pertaining to Pre-Decode 2770, Post-Decode 2780, GHR Update 2730 (except input 2715 is thread selected), wGHR 2140 is replicated, aGHR 2130 is replicated. The operations pertaining to branching IA and PREDADDR are analogous. Rules for adding insertion zeroes for Non-Taken branches on the cache line are analogous.

Thread-based BTB 2120 outputs and connections for BTB Way0Hit, BTB Way1Hit, PC-BTBWay0, PC-BTBWay1, and PTA are analogous to the single-thread case in this embodiment. The thread that is active selects which branch FIFO 1860.$i$, IQ.i, and wGHR.i to latch the instruction, and predicted information. The thread.i that is active also selects which source is used to access the GHB 2110 and BTB 2120.

In FIGS. 6A and 7A, per-thread replication is provided for wGHR 2140 (.0, .1), mux 2735 (.0, .1), and circuitry 2700A.0 and 2700A.1. The second wGHR 2140.1 is shown behind wGHR 2140.0 and their outputs are thread-selected by a Mux 2143 to generate signals for bus 2715. aGHR 2130 (.0, .1) is muxed out by a Mux 2133. Buses 1820.0 and 1820.1 are provided for their corresponding threads. Branch FIFO 1860 has replicated portions 1860.0 and 1860.1 (the number of entries in each FIFO is fewer). In FIGS. 6A and 7B, an extra input thread ID (THID) is hashed (XOR circle-x) with wGHR bus 2715 and fed to the GHB 2110.

In FIG. 6B, per-thread replication is provided for LASTPC.0 and LASTPC.1 inputs to a pair of committed return stacks 2231.0, 2231.1. The stacks 2231.$i$ are in turn respectively coupled to a pair of Working Return Stacks 2221.$i$. The return stack bus for POP ADR is thread selected by a Mux 2223 from return stacks 2221.$i$ The lines 2910.$i$ are Thread Selected by a Mux 2226 to supply TARGET to mux 2210. The feedback signals MISPREDICT.0, .1 and MPPC.0, .1 are fed to a pair of muxes 2246.$i$, which feed a pair of registers respectively that in turn are coupled to respective inputs of a thread-select Mux 2243A that in turn supplies a first input of an incrementor or arithmetic unit 2241. Offsets 2248.$i$ are analogously coupled to a second input of the incrementor or arithmetic unit 2241 via a thread select Mux 2243B controlled by the Thread Select signal from circuit 2285. The output of the incrementor or arithmetic unit 2241 is coupled to an input of the mux 2210 that in turn supplies address IA to access I-Cache 1720.

Further in FIG. 6B, a multithreaded control mode (MTC) signal and an L2 cache miss signal are fed to IQ Control Logic 2280. Per-thread replication is provided as shown for IQ 1910.1, 1910.2 and the scoreboards and other logic as shown in FIGS. 4 and 5. The size of each issue queue FIFO is reduced or halved in multithreaded mode compared to single threaded operation.

In FIG. 6A, global history buffer GHB 2110 has indexed entries that represent a branch prediction to take a branch or not-take the branch. A series of bits representing a history or series of actual taken branches and not-taken branches in the past is used as an index to the GHB 2110 entries. An entry is read-accessed by asserting as the index a particular currently predicted pattern of branches. With each cache line that currently-predicted pattern of branches may change and index to a different entry in the GHB 2110. Multiple threads are accommodated while maintaining high branch prediction accuracy.

Branch history patterns are all maintained up front in the pipeline. The branch history pattern is maintained in two versions—first, an actual branch history of Taken or Not-Taken branches in aGHR.i determined from actual execution of each branch instruction in an execution pipestage far down the pipeline. This actual branch history is maintained in each architectural global history register aGHR.i 2130.$i$ and updated by fast message-passing on lines 1820.$i$ from the execution pipestages.

Second, a predicted, or speculative, branch history pattern has some actual branch history concatenated with bits of predicted branch history. This predicted branch history pattern is maintained thread-specifically in each working global history register wGHR 2140.$i$.

The predicted and actual branch history patterns are kept coherent for each thread i in case of a mis-prediction. Advantageously, message-passing lines 1820.$i$ act as busses that link or feed back the actual branch history information, determined far down the pipeline in an execution pipestage such as 1870 of FIG. 4 in each pipe, to the circuitry 1810, 1830 that is operating up front in the fetch pipeline. This improvement saves power and facilitates the fine-grained full cache-line branch prediction advantages next described.

Power is saved in fetch by making the instruction cache line from Icache 1720 wider than any instruction. This approach also improves real-estate and instruction processing efficiency in retrieving the instructions. Here, the advantages of a wide cache line are combined with circuitry that provides improved high branch prediction accuracy without need of lengthening the pipeline in a high speed processor such as shown in FIGS. 2, 3, 4, 5, and 5A. Moreover, the improvements are applicable to a wide variety of different architecture types in processors having single and multiple pipelines of varying lengths.

The branch prediction decode logic 1810, 1830 not only detects a branch somewhere on the cache line, but also advantageously provides additional decode logic to identify precisely where every branch instruction on a cache line is found and how many branch instructions there are. Thus, when multiple branch instructions occur on the same cache line, the information to access the GHB 2110 is very precise. A tight figure-eight shaped BP feedback loop 1990 in FIG. 4 couples units 1810, 1830, 1840, 1720, 1810. In this way speed paths are avoided and branch prediction accuracy is further increased.

The process of loading the GHB 2110 with branch predictions learned for each thread i from actual branch history speedily message-passed from the execution pipe also progressively improves the branch predictions then subsequently accessed from the GHB 2110. The additional decode logic (e.g., Post-Decode 1830) takes time to operate, but that is not a problem because at least some embodiments herein additionally run the additional decode logic as an addition to an existing pipestage and when needed, across at least one clock boundary in parallel with one or more subsequent pipestage(s) such as a first decode pipestage. This hides the additional decode logic in the sense that the number of pipeline stages is not increased, i.e. the pipeline of the processor as a whole is not increased in length. For example Post-Decode 1830 amounts to an additional fetch pipestage(s) parallelized with the initial pipestage(s) of the decode pipeline.

Notice that a record of actual branch histories in each aGHR 2130.i is constructed by message-passing on busses 1820.i to a fetch stage from the architecturally unfolding branch events detected down in the execute pipes such as at stage 1870.i. The aGHRs 2130.i are maintained close to or in the same fetch pipestage as the speculative GHRs (or working GHRs) wGHR 2140.i. The actual branch histories are thus conveyed to a fetch stage up front in the pipe quickly from each execute pipestage 1870.i farther down in the pipelines.

This special logic 1810, 1830 situated in fetch and/or decode logic areas confers important processing efficiency, real-estate efficiency and power-reduction advantages for multithreading and single threaded operation. Consequently, what happens in instruction execution in the execute pipe is tracked up front in the pipeline thanks to the message-passing structures 1820i. Up front, one or more pipestages 1810, 1830 of fine-grained wide-cache-line instruction decoding are advantageously implemented in parallel with conventional pipestages and thus hidden in fetch or decode cycles or both.

In summary, at least some of embodiments implement one or more of the following solution aspects among others. 1) Introduce fine-grained branch instruction decode for plural threads in a fetch stage, parallel to an instruction queue, for instance. 2) Precise decode in a fetch stage is pipelined and shared by both threads. 3) Implement parallel low overhead message passing protocols between the execute stage and the fetch branch decode stage thus introduced, to allow the branch prediction logic itself to reconstruct the execute behavior of predicted branches in both threads. 4) Synchronize updates of the actual global history registers aGHR 2130.i and the working global history registers wGHR 2140.i, both in a fetch stage, regardless of the length of the pipelines between the fetch stage and the execute stage.

In FIG. 6A, a two-cycle branch prediction loop has a branch target buffer (BTB 2120) and a global branch history buffer (GHB 2110). The BTB 2120 is implemented as cache array with address tag compare and fetching of a predicted taken target address PTA. The GHB 2110 is an array for both threads that is read by an index comprising speculative branch history bits supplied by a given wGHR 2140.i for each thread.

In FIG. 6B, the target address TA.i from branch prediction in FIG. 6A on lines 2910.i is muxed by mux 2223 coupled to the instruction cache 1720. Branch predictions from GHB 2110 and BTB 2120 are accessed every clock cycle along with access of instruction cache 1720. The branch prediction is pipelined across two clock cycles. If an instruction cache line is predicted by wGHR 2140 accessing GHB 2110 to have a taken branch, then each sequentially subsequent instruction on the current instruction cache line is ignored or cancelled. In this embodiment, power consumed in fetching is consumed on every taken branch prediction. For further power minimization, the instruction cache 1720 suitably has logic to disable read of a tag array in Icache 1720 when the sequential address is within the cache line size corresponding to the granularity of a tag.

In FIG. 6A, the BTB 2120 and GHB 2110 are supplied with MSB and LSB Instruction Address IA lines respectively. BTB 2120 associatively retrieves and supplies a Predicted Taken Address PTA and supplies it to a Mux 2150 that has Predict Taken and Thread Select controls. Concurrently with retrieval of the PTA, BTB 2120 outputs branch prediction relevant information on a set of lines 2160 coupled to the GHB 2110 to facilitate operations of the GHB 2110. Lines 2160 include two way-hit lines 2162, and lines for PC-BTB [2:1] from each of Way0 and Way1.

Mux 2170 supplies a global branch prediction direction bit of Taken or Not-Taken at the output of Mux 2170. An OR-gate 2172 couples the global prediction Taken/Not-Taken as the selector control PREDICTTAKEN to the Mux 2150. Mux 2150 selects a corresponding Target Address as a Predicted Taken Address PTA if the prediction is Taken, or a thread-specific Predicted Not-Taken Address (sequential, incremented IA+1) PNTA.i at output of Mux 2150 if the prediction output PREDICTTAKEN from OR-gate 2172 is Not-Taken.

OR-gate 2172 also supplies a PREDICTTAKEN output to BP Pre-Decode block 1810 to complete a loop 2175 of blocks 1810, 1830, wGHR 2140.i, GHB 2110 and logic via OR-gate 2172 back to block 1810. If the branch instruction is an unconditional branch, a BTB 2120 output line for an Unconditional Branch bit in a retrieved entry from BTB 2120 is fed to OR-gate 2172 to force a predicted Taken output from the OR-gate 2172.

OR-gate 2172 has a second input fed by an AND-gate 2176. AND-gate 2176 has a first input fed by the output of Mux 2170 with the global prediction of GHB 2110. AND-gate 2176 has a second input fed by an OR-gate 2178. OR-gate 2178 has two inputs respectively coupled to the two Way Hit lines 2162. If there is a way hit in either Way 0 or Way 1 of BTB 2120, then the output of OR-gate 2178 is active and qualifies AND gate 2176. The Taken or Not-Taken prediction from GHB output Mux 2170 passes via AND-gate 2176 and OR-gate 2172 as the signal PREDICTTAKEN to block 1810.

In FIG. 6A, the just-described AND-OR logic generates PREDICTTAKEN. The logic has an input fed by the Taken/Not-Taken output from Global History Buffer Mux 2170. Another input from BTB 2120 to this logic circuit can override the prediction from GHB 2110 in this embodiment in the following circumstances. First, if there is a BTB miss (signal BTBHIT low), meaning no valid predicted branch instruction in BTB 2120, then PREDICTTAKEN output from AND-gate 2176 is kept inactive even though the Taken/Not-Taken output from Mux 2170 is active. Second, the BTB 2120 keeps track of the branch type, so that with an unconditional branch, the prediction is taken (PREDICTTAKEN is active from OR-gate 2172) regardless of the GHB 2110 Taken/Not-Taken prediction.

As noted above, if instruction address IA does not match a tag for any branch target in the BTB 2120, then the signal PREDICTTAKEN is Not Taken or inactive. Thus, a taken prediction (PREDICTTAKEN active) in this embodiment involves the BTB 2120 having a target address PTA for some branch instruction in the cache line. Since the target address is suitably calculated at execution time in this embodiment, BTB 2120 does not contain the target of a branch until a branch instruction goes through the pipeline at least once. In the first nine branches of a software program in this embodiment, the circuitry defaults to the Not-Taken prediction, since a part of the branch history does not exist for purposes of accessing GHB 2110 and the BTB entries are just beginning to build up. Note that other approaches currently existing or yet to be devised for branch prediction in those first branches (e.g. the nine first branches) are also suitably used in conjunction with the improvements described herein.

In FIG. 6A, the BTB 2120 is two-way set associative. BTB 2120 address path includes row decoding and row drive, bit drive and output circuitry, and tag compare to generate respective way hit signals for each of the two ways on lines 2162. A way hit signal from a given way supplies Target and Branch Type. Branch Type information is used as a PUSH/POP selector control for Mux 2210 in FIG. 6B to select between BTB target and return stack (POP ADR in FIG. 6B) to determine an address to access the instruction cache 1720 via Mux 2210.

In FIG. 6A, the Branch Target Buffer BTB 2120 provides fast access to taken-branch addresses. The BTB 2120 has the following contents as tabulated in TABLE 3:

TABLE 3

BRANCH TARGET BUFFER ENTRY CONTENTS

| Contents | Description |
| --- | --- |
| Target | Predicted Target Address PTA to use in fetching Target Instruction from Instr. Cache |
| Tag | Tag to compare against, includes PC-BTB |
| Target Mode | Instruction set ISA of the target instruction |
| Page Cross | Whether branch and target instruction are not in same memory page |
| Unconditional Branch Type | Ignore prediction from GHB 2110 Direct, Call, Return |
| Valid | BTB entry is valid |

In FIG. 6A, the BTB 2120 is a content addressable array accessed by instruction fetch virtual addresses IA. These addresses designated "IA" are the current instruction address value that points to the current instruction for fetch purposes. BTB 2120 has two Ways having one tag per Way. Each tag has the same MSBs as the other tag if both Ways hold an entry. The MSBs of an address IA match the MSBs of the one or two tags when a BTB hit is said to occur. The LSBs of the tags may not match the address IA, and those LSBs provide important instruction position information on the cache line called PC-BTB herein. Thus, the two ways associatively store entries of TABLE 1 for as many as two respective Taken-branch instructions situated on the same cache line.

A glossary of branch related terms is tabulated in TABLE 4.

TABLE 4

GLOSSARY OF BRANCH-RELATED TERMS

| LEGEND | NAME | REMARKS |
| --- | --- | --- |
| IA | Instruction Address | Address used for I-Cache read |
| IA + 1 | Predicted Not-Taken | Next cache line address to fetch in program order in a thread. |
| IA[2:1] | Initial Position | Initial position of entering onto a cache line. Lower addresses than IA[2:1] on the cache line are ignored, if any. |
| PC.i | Program Counter of Executed Instruction in thread pipe i. | PC.i holds the address of the instruction in thread i that is executed and committed to the machine state. |
| PCNEW.i | | Contents of PCi passed back to fetch stage via Thread Selected mux 2111. |
| PC CTL.i | | Thread-based PC control muxed to GHB by Thread Select mux 2112. |
| IRD | Instructions Read | Cache line of Instructions that are concurrently read out of I-Cache. (IRD is not an address. IRD is instructions.) |
| BT | Branch Target | An instruction to execute next after a branch instruction when the branch operation represented by the branch instruction is Taken. |
| PC-BTB | | Tag address in BTB has LSBs pointing to a position of a Taken branch instruction on a cache line. Instruction Address IA MSBs |

TABLE 4-continued

GLOSSARY OF BRANCH-RELATED TERMS

| LEGEND | NAME | REMARKS |
| --- | --- | --- |
| | | identify address of the cache line itself. |
| Branch | | Branch for the present purposes is any data move to PC.i as contrasted with simply sequencing PC.i to the next instruction in program order. |
| BTB | Branch Target Buffer | Cache of Predicted-Taken Addresses (PTAs) accessed associatively by Instruction Address IA MSBs. BTB accesses PC-BTB, PTA, and Unconditional and Type information. |
| MPPC.i | Mis-Predicted PC Address per thread pipe | Actual target address sent from execution stage back to instruction fetch stage for updating BTB entry via Muxes 2320.i. |
| ATA.i | Actual Target Address per thread pipe. | Address determined by actual execution of a branch instruction when actually taken in a given pipe i. |
| MISPREDICT.i | Mis-prediction Signal | Muxed to GHB by mux 2112. Mis-prediction for a pipe i has four categories: 1) target mismatch of predicted taken address from FIFO with actual target address ATA from actual branch execution in execute unit. 2) Branch is taken but predicted not-taken or not predicted at all. 3) Branch is not taken (no target to compare), but was predicted taken. 4) Thread switching is suitably handled as if it were a mis-prediction. |
| PREDADDR | Predicted Position | Predicted position of a Taken Branch instruction on a cache line. If no branch exists nor is predicted taken on the cache line, then PREDADDR defaults to the end position ("11"). PREDADDR is related to PC-BTB. |
| PTTPC.i | Predicted Taken Target PC | The predicted taken target PC address from FIFO for PC1 calculation in FIG. 12 for a thread pipe i. |
| PTTPCA.i | Predicted Taken Target PC Address | The predicted taken target PC.i address from FIFO for target mismatch comparison purposes in execute unit. Time-delayed version of PTTPC.i. |
| TA.i | Target Address | Either PTA or PNTA. Output of Mux 2150.i. |
| PTA.i | Predicted-Taken Address for a thread pipe i. | Content of BTB Muxed out by Mux 2150.i when the GHB supplies a Predicted Taken prediction. PTA.i can be used for I-Cache read to fetch Branch Target. PTA.i has MSBs identifying a cache line and LSBs identifying position of the Branch Target on the cache line. |
| PNTA.i | Predicted-Not-Taken Address | Thread-specific IA + 1 Muxed out by Mux 2150 when the GHB supplies a Predicted Not-Taken prediction. PNTA.i increments IA for I-Cache read to fetch next cache line in program order. PNTA.i has position LSBs set to "00." |
| | Predicted Taken | Value of bit from GHB representing a prediction that a branch instruction just fetched will, when executed several clock cycles later in an execute pipestage, load the PC.i with an address that is NOT the next address in program order in that thread. Used to operate Mux 2150.i. |

TABLE 4-continued

GLOSSARY OF BRANCH-RELATED TERMS

| LEGEND | NAME | REMARKS |
| --- | --- | --- |
|  | Predicted Not-Taken | Value of bit from GHB representing a prediction that a branch instruction just fetched will, when executed several clock cycles later in an execute pipestage, load the PC.i with an address that IS the next address in program order in that thread. The Predicted Not-Taken value is the logical complement of Predicted Taken value. |
| GHB | Global History Buffer | Array of prediction direction/strength bit values Predicted Taken and Predicted Not-Taken arranged by GHB addresses (indexes) each representing a different branch history series of bits. |

In FIG. 6A and FIG. 6B, if a BTB 2120 hit occurs, FIFO 1860.i for the applicable thread is updated with a Predicted Taken Address PTA value retrieved on BTB hit . This Predicted Taken Address is sent by Mux 2150.i to update the Instruction Address IA via Mux 2210 of FIG. 6B. IA is coupled to an address input of Instruction Cache 1720 to retrieve the cache line holding the Branch Target instruction to which the PTA points. This Branch Target instruction is fed from Instruction Cache 1720 as the next instruction into the thread-based Instruction Queue 1910.i of FIG. 4 and FIG. 6B.

In FIG. 6A and FIG. 6B if no BTB hit occurs, there is no Predicted Taken Address and the GHB 2110 PREDT/NT output is zero at the selector input of Mux 2150. The Instruction Address IA value is incremented by one ("IA+1"). This value is thread-based and is called a Predicted Not-Taken Address PNTA.i and is muxed out of Mux 2150 and Thread Selected by mux 2226 to update the Instruction Address IA via Mux 2210 coupled to address input of Instruction Cache to retrieve the next cache line in program order to which the Predicted Not-Taken Address PTNA.i points. Each next instruction(s) from such cache line is fed from Instruction Cache into the Instruction Queue 1910.i.

Depending on whether the branch is predicted Not-Taken or Taken respectively, the cache line for the incrementally-next instruction in program order or for the branch target instruction is retrieved from Instruction Cache and also fed as IRD to BP Predecode 1810. If the predictions are correct, the pipeline(s) execute smoothly and no mis-prediction is detected nor generated as a thread-specific MISPREDICT.i signal in either execute pipestage of FIG. 12 where the actual Not-Taken or Taken status of a branch is determined by actual execution.

In FIGS. 6A and 7B, GHB 2110 has a two-bit saturation counter that increments a pertinent GHB two-bit entry on an actual executed taken branch and decrements the GHB entry on an actual executed non-taken branch. For a correctly predicted branch, only the LSB (least significant bit or strength bit) of the counter is incremented. This effectively saturates the count value. On a mis-prediction, the MSB (most significant bit or direction bit) is flipped only if the strength bit is zero (0) at that time. Thus, the counter effectively increments or decrements the count based on taken or non-taken mis-prediction. The counter ranges over +1, +0, −0, −1 as it were. For example, suppose the direction bit one represents Taken and zero represents Not-Taken and the entry is initialized at "00" for Not-Taken low-strength. Then if the branch as executed is actually Not-Taken, then the entry is incremented to "01" for high-strength. Then suppose the branch is executed again and is actually Taken (mis-predicted). Strength is decremented and the entry is "00" (Not-Taken low-strength) Then if the branch is executed again and is actually Taken, the direction bit is now flipped due to the mis-prediction at low strength to make the entry "10" (Taken, low-strength). And if executed yet again and actually Taken, the strength bit is incremented to make the entry "11" (Taken, high-strength.) (All the foregoing instances assume instances of same branch history in the same thread i to access the same entry in GHB 2110.) If no mis-prediction is detected in actual execution, and the strength bit in GHB is not already one at the location indexed, the strength is incremented (High).

If a MISPREDICT.i signal is generated by actual execution of thread i, and there is an actual taken branch when Not-Taken was predicted, then an entry based on the saturating counter operation described hereinabove is written into GHB 2110 of FIG. 6A by GHB write circuitry 2895 of FIG. 7B and FIG. 6A at the location identified by the latest ten bits of aGHR.i actual branch history. Also, the branch target address MPPC.i from execution stage is written via muxes 2320.i to BTB 2120 and associated therein with the corresponding thread-specific PC value (fed back as PCNEW.i) of the branch instruction actually executed in thread i.

Figure 12:
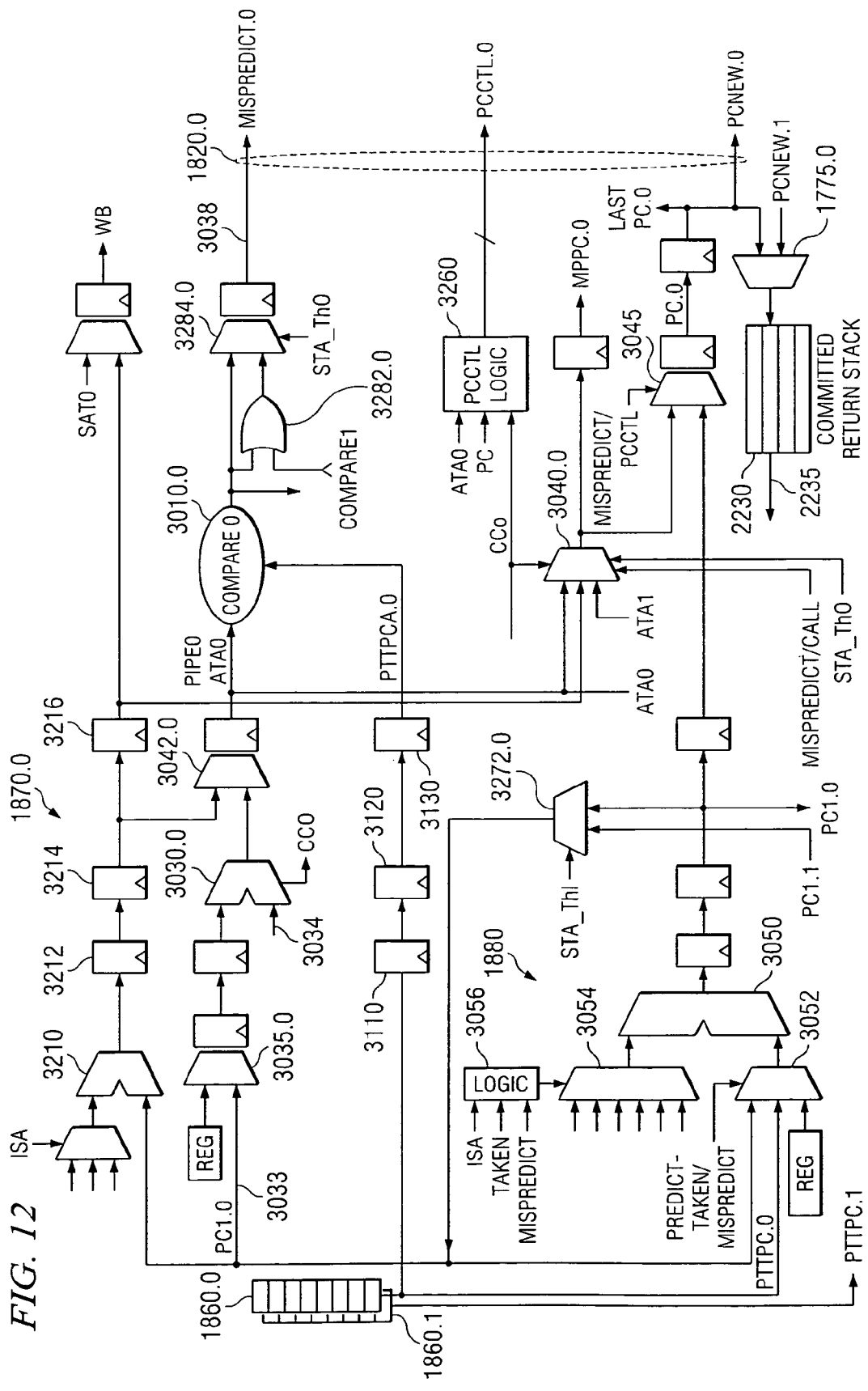
FIG. 12 is a schematic diagram of inventive branch execution circuitry of an execute pipeline for FIGS. 3, 4, 5, 5A, 6A, 6B for use in starting a new thread by use of a MISPREDICT.i control line, and wherein the inventive branch execution circuitry of FIG. 12 is replicated twice or more for superscalar execute pipelines respectively.

If a MISPREDICT.i signal is generated by actual execution of thread i, and there is an actual Not-Taken branch when Taken was predicted, then the GHB 2110 entry is updated based on the saturating counter operation described hereinabove at the location identified by the last ten bits of actual branch history. The BTB entry of tag and branch instruction at hand is allowed to remain because 1) the GHB two-bit saturating counter may still indicate a weakly taken branch, or 2) this branch may belong to another aGHR.i global prediction path (index) that has a Taken direction bit in GHB, or 3) in case of an unconditional branch, the BTB entry itself determines the branch is taken. Ordinarily, the GHB will decide by PREDICT TAKEN selector control of Mux 2150.i whether the entry in the BTB is used or not. (The PTA entry in the BTB can be subsequently updated by a new branch target address on a valid taken branch having the same tag.) In either type of mis-prediction, the actual Taken/Not-Taken based on PCNEW.i, PCCTL.i, and MISPREDICT.i from the execute pipestage in FIG. 12 is also fed in this process to aGHR 2130.i of FIGS. 6A and 7A to keep a record of actual branch behavior in each thread i.

In the TABLE 3 for BTB, the Target Mode allows use of instructions from different instruction sets such as the first instruction set and the second instruction set referred to by way of example herein. The number of instructions sets is suitably established by the skilled worker, and up to 2-to-number of bits of Target Mode is the number of instruction sets permitted by the number of bits provided for tabulations in the BTB Table. With two Target mode bits in this example, 2-to-two power (equals four) Instruction Sets are accommodated.

If the BTB access of the bit Unconditional retrieves a one ("1"), then the branch Target from BTB 2120 is the Target Address for fetching the next instruction regardless of GHB 2110 output. If Unconditional=0, then the Taken/Not-Taken branch prediction output from GHB 2110 of FIGS. 6A and 7B operates Mux 2150 if there is a BTB Way Hit. The UNCONDITIONAL signal is fed to an input of OR-gate 2172 in FIG. 6A.

In FIGS. 3, 4, 5, 5A, 6B and 12, an execution pipestage in each pipeline i has a Branch Resolution logic circuitry 1870.i which supplies branch-taken information to Committed Return Stack 2231.i for each thread. Stacks 2231.i are coupled via message-passing busses 2235.i back to respective Speculative Working Return Stacks 2221.i. Stacks 2221.i are Thread Selected by mux 2223 to supply a Pop Address to the POP ADR input of Mux 2210. Thus, a return stack is advantageously implemented for CALL and RETURN instructions. CALL instructions store their incremented instruction addresses related to IA on the stack beforehand for use by a RETURN instruction thereafter, so the global branch prediction mechanism is bypassed in the case of CALL and RETURN instructions.

In FIG. 6B, the Working Return Stacks 2221.0 and 2221.1 are thread-specific speculative push/pop stacks in fetch. When a CALL instruction is detected, the next sequential instruction address IA is demuxed by Thread Select and pushed on the stack 2221.0 or 2221.1. When a RETURN instruction is detected, the top of particular stack 2221.i is popped and muxed by Thread Select by mux 2223, as the predicted target address POP ADR for the applicable thread i. The Committed Return Stacks 2231.0, 2231.1 for each thread are operative on retiring of a CALL or RETURN instruction in the applicable thread. On a branch mis-prediction in a thread i, the Committed Return Stack 2231.i is copied to the Working Return Stack 2221.i. Some example operations of these stacks relative to Pipe Thread 0 and Pipe Thread 1 are Call Thread 1 push stack 2221.1, Call Thread 0 push 2221.0, Return Thread 1 pop 2221.0, Return Thread 1 pop stack 2221.1.

In FIG. 6B, Instruction Cache Icache 1720 has an input for the latest Instruction Address IA asserted to Icache 1720 to obtain a new cache line. Instruction Address IA is supplied by a Mux 2210. Mux 2210 has inputs from 1) Target output of Mux 2226, which Thread Select multiplexes the outputs of Mux 2150.0 and 2150.1 of FIG. 6A to handle predicted branches; 2) Pop Address POP ADR from Working Return Stacks 2221.i to handle Return instructions; 3) output from Offset Adder 2241 that has thread-selected adder inputs; 4) addresses supplied by L2 Cache 1725 of FIG. 4 for cache maintenance, and 5) addresses from low priority sources 2242.i.

Offset Adder 2241 has a first input fed by a respective Mux-flop 2246.0, 2246.1 via thread-select Mux 2243A. Mux-flops 2246.0, .1 each have a first input coupled to the output of Mux 2210. That output of Mux 2210 can thereby have any appropriate thread specific offset applied to it from Offsets 2248.0 and 2248.1 via a Thread select Mux 2243B to Offset Adder 2241. (An alternative circuit omits muxes 2243A and 2243B and uses two adders 2241.0, .1 feeding a a single thread select Mux 2243 to mux 2210.)

Mux-flops 2246.i have a second input fed by thread specific lines MPPC.0, .1 supplying a branch target address generated by actual execution of a branch instruction in the execute pipeline respective to a thread. Occasionally, such actual branch target address was mis-predicted by the branch prediction circuitry. In such case of a mis-prediction detected in BP Update unit 1870 of FIG. 4, the branch target address generated by actual execution is fed back on the lines MPPC.i from pipe stages 1870.i of FIG. 4.

Mux-flops 2246.i have a selector control fed by a thread-specific MISPREDICT.0, MISPREDICT.1 line from BP update 1870.i of FIG. 4. If the MISPREDICT.i line is active, then Mux-flop 2246.i thread-specifically couples the actual branch target address on the lines MPPC.i via thread select Mux 2243A to Offset Adder 2241. Otherwise, if the MISPREDICT.i line is inactive, then the corresponding Mux-flop 2246.i couples the Mux 2210 output via thread select Mux 2243A to Offset Adder 2241 for offsetting of thread i.

Offset Adder 2241 has a thread-specific second input provided via Mux 2243B with a selected one of several ISA instruction-set-dependent offset values 2248.i of zero or plus or minus predetermined numbers. Offset Adder 2241 supplies the appropriately-offset address to an input of Mux 2210.

Mux 2210 has its selector controls provided by a selection logic 2251. Selection logic 2251 is responsive to inputs such as POP.i indicating that the Working Return Stack 2221.i should be popped to the Icache 1720, and to another input ICacheMiss indicating that there has been a miss in the Icache 1720. Selection logic 2251 is provided with all input needed for it to appropriately operate Mux 2210 supply Icache 1720 with addresses in response to the various relevant conditions of the processor architecture.

Icache 1720 feeds an instruction width manipulation Mux 2260 which supplies output clocked into the Instruction Queue 1910.0 or 1910.1 and the decode pipelines thereafter.

In FIGS. 6B and 6A, Mux 2210 supplies as output the Instruction Address IA that accesses I-cache 1720 and is also used to read the BTB 2120 to supply a Predicted Taken Address PTA.0, .1 (if any) of the instruction having the instruction Address IA. The BTB has a R/W write input coupled by a Thread Select Mux 2112 to the MISPREDICT.i line from execute stage 1870.i. If the MISPREDICT.i line is active, then for write purposes the BTB 2120 has a BTB entry written with the mis-predicted branch target address fed on lines MPPC.i via a data input Muxes 2320.0, .1 and Thread Selected to the BTB 2120 in a Way and at a tag established by the Instruction Address PCNEW.i muxed by a Thread Select mux 2111 and associatively stored with entry MPPC.i.

In FIG. 6A, FIFO 1860 (1860 includes 1860.0 and 1860.1 of FIG. 4) has thread-specific FIFO control logics 2350.0 and 2350.1 and thread-specific register files 2355.0 and 2355.1 of storage elements, and is fed with target addresses TA from Mux 2150.0, 2150.1 that are thread-specifically clocking into the respective thread-specific register file to which each target address is destined. The FIFO control logic 2350.i is fed with monitor inputs including the Taken/Not-Taken prediction from OR-gate 2172. In this way FIFO control logic 2350.i only updates a storage element in register file 2355.i of low-power pointer-based FIFO 1860 when there is a predicted Taken output active from OR-gate 2172. Thus register file 2355.i of pointer-based FIFO 1860 operates on a thread-specific basis and only holds Predicted Taken Addresses PTA.i from Mux 2150.i, and a write pointer WP1.i of FIFO 1860 is only incremented upon receipt of a PTA.i (or before receipt of another PTA.i), rather than responding to a PNTA.i from Mux 2150.i.

In FIG. 7B, the GHB 2110 of FIG. 4 and FIG. 6A is write-updated by Hashing at least one bit from aGHR[9:4] with Thread ID (THID), in XOR 2898B. Next concatenated in the index is PCNEW[4:3], then Hash aGHR with PCNEW [2:1] in an XOR 2898A. Access GHB by the concatenation pattern just created and update the two-bit bimodal GHB entry as described herein.

In FIG. 7B, suppose thread ID is 3 bits, which correspondingly is hashed with three bits of GHR[6:4]. On GHB read, the Thread ID (THID) is hashed with wGHR [6:4] by XOR 2899. GHB register file 2810 is accessed by the bits from wGHR 2140.i and the thread-specific Hash from XOR 2899. Hashing of Thread ID with GHR to access GHB is more real-estate efficient since GHB for one thread may already have substantial capacity. GHB is thereby size-optimized to somewhat diminish the per-thread occupancy of the capacity with relatively little lessening of branch prediction accuracy. In return, substantial system feature enhancement is conferred by concurrent execution of threads and higher execution efficiency due to higher usage of the execution unit resources.

A Mux operation by IA[4:3] and Mux by a hash of wGHR.i LSBs with PC-BTB[2:1] then occurs. Mux by GHB Way Select is used at Mux 2170 to predict Taken/Not-Taken. Then PTA and PNTA are muxed by Taken/Not-Taken in muxes 2150.0, 2150.1. Other structures of FIG. 7B are described in the incorporated patent application TI-38252, Ser. No. 11/210,354.

In FIG. 8, the thread register control logic 3920 is responsive to control registers including 1) Thread Activity register 3930 with thread-specific bits indicating which threads are active (or not), 2) Pipe Usage register 3940 with thread-specific bits indicating whether each thread has concurrent access to one or two pipelines, and 3) Thread Priority Register 3950 having thread-specific portions indicating on a multi-level ranking scale the degree of priority of each thread (e.g. 0-7).

For example, the Pipe Usage Register 3940 may be used to establish whether power saving has priority over instruction throughput (bandwidth) for processing a given thread. The Thread Priority Register may give highest or very high priority to a real-time thread to guarantee access by the real-time thread to processing resources in real-time. The priorities are established depending on system requirements for use of various application programs to which the thread IDs correspond.

In FIG. 8, each decode pipeline and each execute pipeline has a Pipeline Thread Register PIPE THREAD 3915 having pipeline-specific bit-fields holding the Thread ID of the thread which is active in that pipeline Pipe0 or Pipe1 currently. The ThreadIDs are fed to a Mux 3917 and the control signal Thread Selet controls mux 3917 to supply a ThreadID (THID) such as to FIG. 7B. A Thread Register File Register 3910 in FIG. 8 has register file specific bit-fields holding the Thread ID of the thread which is assigned the respective register file RF1, RF2, or RF3 in register files 1770.

Match detector and coupling logic 3918 is responsive to both the Pipe Thread Register 3915 and the Thread Register File Register 3910 to supply selector control to the thread-dependent Demux 1777. Demux 1777 thereupon couples the writeback stage of each particular execute pipeline to the correct thread-specific register file RF1, RF2, RF3. For a given thread, the particular pipeline is the pipeline processing the thread with thread ID entered in the Pipeline Thread Register PIPE THREAD 3915 for that pipeline. The correct register file RF1, RF2, or RF3 is the one that is assigned by the Thread Register File Register 3910 to the thread with thread ID also entered in the Pipe Thread Register 3915 for the particular pipeline.

Note that Demux 1777 routes writeback from one or both of the execute pipelines 1740, 1750 to any one of the two or more register files RF1, RF2, RF3 to which each thread is destined. If the same thread (e.g., a thread numbered 5) be active in both pipelines, then both bit-fields in the Pipeline Thread Register 3915 have entries "5." And both pipelines are muxed back to the same register file (RF2, say), so the Thread Register File Register 3910 would have a single entry "5" in the bit-field corresponding to register file RF2. Thread register control logic 3920 is made to include logic to find each entry in the Pipe Thread Register 3915 that matches an entry in the Thread Register File Register 3910 and then operate the selector controls of Demux 1777 to couple each execute pipeline to the register file to which the execute pipeline is matched by logic 3918.

When one thread occupies two execute pipes, operands for instructions in the thread are muxed to/from two ports of one thread RF (thread-specific register file) for that thread. For example, additional read/write ports are provided for a multi-threaded register file in this example, compared to a register file for single thread processing.

For instance, when user presses the Place-a-Call button on a cell phone, the processor commences a real-time application program so that the phone call happens. Earlier, the Boot routine previously established the priority of the real-time phone-call application program in the event of its activation as a real-time thread. The Boot routine establishes the priority by entering a priority level for the thread ID of the real-time application program in the Thread Priority Register 3950. If a low priority thread is running, and a high priority thread is activated by user or by software, then the OS stops the low priority thread, and saves the current value of the thread-specific PC of FIG. 12 pertaining to that low priority thread. The PC-save is executed from the Writeback stage of the pipeline in which that low priority thread was just executing. The operating system OS sets the Thread Activity 3930 register bit active in the thread ID entry pertaining to the high priority phone-call thread. The OS loads the just-used thread-specific PC for the terminated low priority thread with the entry point address for the high priority thread, and then asserts MISPREDICT.i to Fetch and Decode pipelines to start the high priority thread.

In FIG. 8, the OS suitably sets up requests in the Thread Enable portion in register 3950. Priorities take care of themselves under control of the Thread Control State Machine 3990. OS is suitably also programmed to bypass the prioritization and set bits directly in the Activity Register 3930 either unconditionally or upon the occurrence of a condition.

Various embodiments use different priority models to avoid a situation where a particular thread keeps getting put aside in favor of other threads and might not execute timely. Different priority models include: (1) round-robin, (2) dynamic-priority assignment, (3) not-switch-until-L2-cache miss. If the programmer is concerned with the performance of one priority scheme, then another just-listed or other particular priority scheme is used. Also, the priority of an under-performing thread is suitably established higher by configuration to increase its performance priority.

Figure 17:
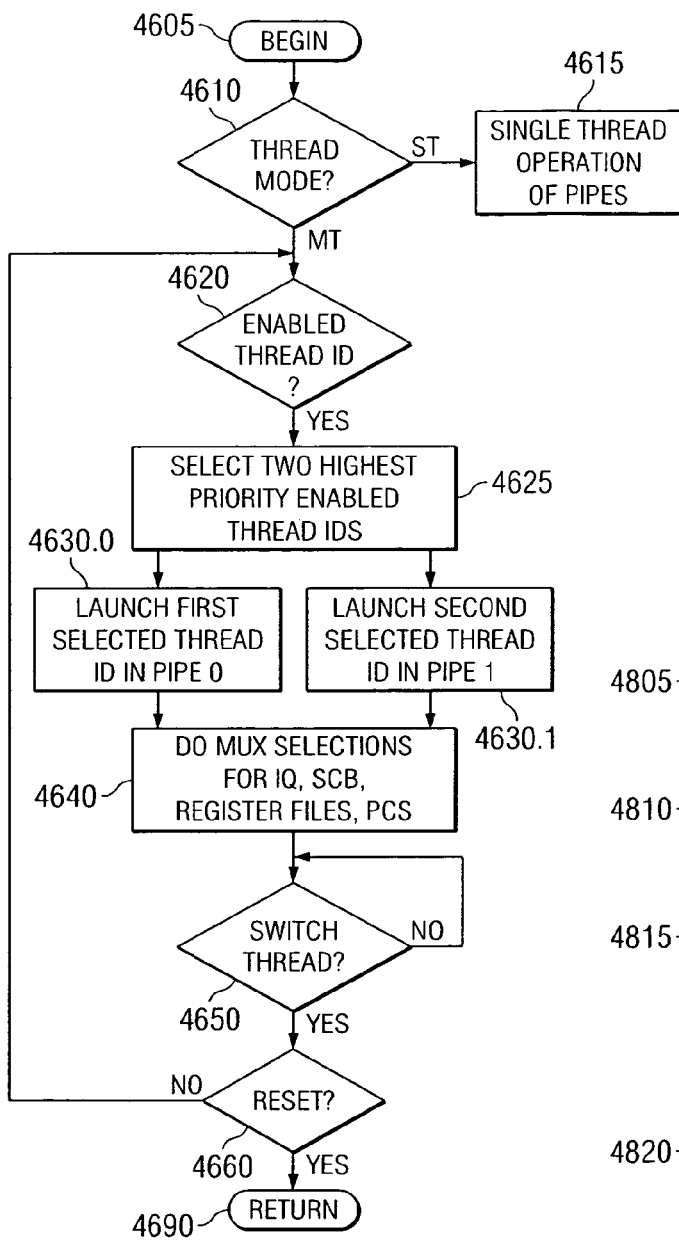
FIG. 17 is a flow diagram of an inventive Operating System and Thread Control State Machine process for multi-threaded processors and systems of the Figures elsewhere herein.

Various embodiments avoid conflict or thrash of 1 or 2 pipes with Thread Priority 3950 selection and thread already in a pipeline as in FIG. 17. Such situations are avoided, for instance by establishing one application thread (such as a real-time thread) with absolute high priority relative to the other application threads. The other application threads then are processed according to the hereinabove priority models. The OS thread has highest priority compared to any application thread, including higher OS priority than the real-time thread.

In FIG. 8, the Thread Activity Register 3930 entries and Pipe Usage Register 3915 entries are coordinated by the OS such as in the circumstance wherein specifying two threads active in the Activity Register 3930 would be inconsistent with specifying one of them to require both of two pipelines in the Pipe Usage Register 3940. The runtime OS checks for such potential inconsistency if it exists and does not activate two such threads, and instead activates one of the threads and runs that thread to completion.

The architecture handles operand dependencies between threads by software. If there is a possible memory dependency as between different threads, then semaphores may suitably be used and the dependency is resolved as a software issue. MAC contention between threads is avoided, such as by NMACInterDep 4495 hardware in FIG. 5B-2.

An additional thread does a context switch according to any of different embodiments. In a total hardware embodiment, the processor has a hardware copy of the PC, register file and processor state/status to support the old thread. The processor starts fetching instructions from a new thread. In a hardware context-switch embodiment, the processor initiates copying PC, register file and processor state/status including global history register status of aGHR and wGHR to internal scratch RAM and new thread from scratch RAM. In a context-switching software embodiment, an L2 cache miss generates an interrupt. Software does a context switch if a new thread should be started.

In FIG. 8, Threading Configuration Register 3980 has fields described next.

MT/ST Mode Field. If the MT field is set to one (1), multithreading is permitted and the MT Control Mode Field MTC is recognized. If the MT field is cleared (0), single threaded (ST) operation is specifically established, and the MT Control Mode Field MTC is ignored.

MTC Control Mode Field. The MTC Control Modes select any of various embodiments of multithreaded processing herein. Some embodiments simply hardwire this field and operate in one MTC mode. Other embodiments set the MT Mode Field and the MTC Control Mode Field in response to the Configuration Certificate in Flash and continue with the settings throughout runtime. Still other embodiments have the OS or hardware change the settings in the MTC Control Mode Field and/or MT Mode Field depending on operational conditions during runtime.

(MTC=00) Single Thread Mode for decode. Single thread can issue to one or two execute pipes.

(MTC=01) MT Mode. Two threads issue into one execute pipe for each thread respectively. The pipes are replicated and operate independently for each thread. If a thread stalls, its pipe stalls until the thread is able to resume in the pipe. No other thread has access to the stalled pipe of the stalled thread. This is also called scalar mode herein.

(MTC=10) MT Mode. Two threads issue into one execute pipe for each thread respectively. If one thread stalls, the other thread may issue into both pipes for high efficiency. No third thread is involved.

(MTC=11) MT Mode, Third Thread. Two threads issue into one execute pipe for each thread respectively. If one thread stalls, the other thread may issue into both pipes for high efficiency. If a third thread is an enabled thread, however, the third thread is issued in place of the stalled thread for high efficiency and the other thread continues to issue into its assigned pipe.

Number of Ready Pipes Field. In FIGS. 8 and 17A in MT Mode, the hardware 3920, 3990 is responsive to the thread conditions to selectively clear and then count entries with value zero (0) in the Pipe Thread Register 3915. The zero-count is entered in the Number of Ready Pipes Field of register 3980. Depending on the entry in the MTC Control Mode Field, operations respond to the Number of Ready Pipes value to selectively launch no thread, or one thread or two (or more) threads.

Some embodiments shuffle control bits of FIG. 8 around and give them different labels. For example, using two or more Pipe Usage Register 3940 bits in some embodiments is suitably accompanied by using fewer or no MTC bits in Threading Configuration Register 3980. Also, some embodiments are customized to only one value or mode of the Pipe Usages desirable for Register 3940 and customized to only one of the MT modes and MT Control modes MTC, and the hardware is customized accordingly.

In FIG. 8, a form of execute pipe assignment control is provided by a Pipe Usage register 3940 with 0 or 1 representing whether one pipe or two pipes are assigned to a given Thread ID.

Figure 17B:
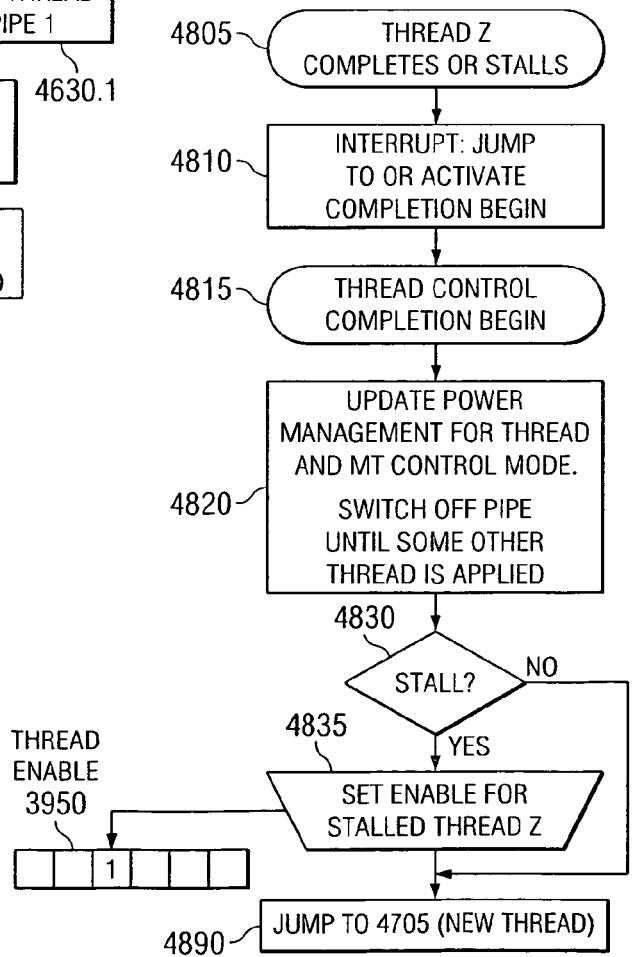
FIGS. 17A and 17B are two parts of a composite flow diagram of an inventive Operating System and Thread Control State Machine process for multi-threaded processors and systems of the Figures elsewhere herein and providing further detail of FIG. 17.
Figure 17A:
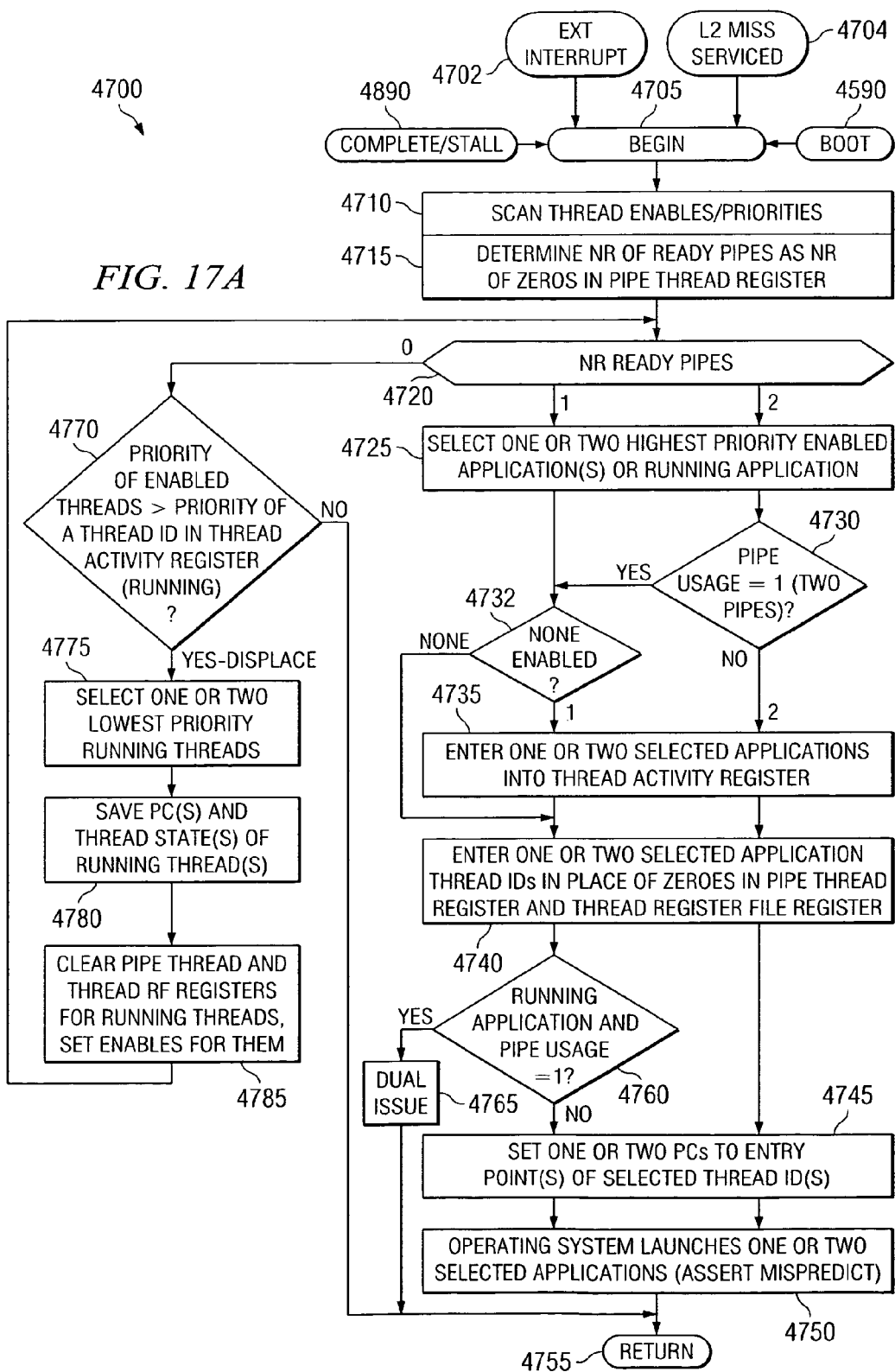

An alternative form of execute pipe assignment control provides more detailed bit-fields for each Thread ID as follows:

(00) 1 pipe only (00)
(01) 1 or 2 pipes (01) so if using one pipe, can go to 2 pipes
(10) 2 pipes required, do not yield a pipe when using two pipes
(11) 2 pipes required for three threads Runtime OS and/or hardware of Thread Control State Machine 3990 of FIG. 8 and Thread Register Control Logic 3920 execute operations of FIGS. 17, 17A, 17B to respond to the entries in registers such as register 3910, 3915, 3930, 3940, 3950, 3960, 3970 and to update entries in registers such as registers 3910, 3915, 3930 and Nr. Ready Pipes Field in register 3980. The hardware also sets and clears the Lock I-Cache Register 1722 and the Lock D-Cache Register 1782 in FIGS. 4 and 8. Thread Control State Machine 3990 is physically placed in any convenient place on-chip, such as near an interrupt handling block and/or near muxes controlled by Thread Control State Machine 3990.

In a cell phone of FIG. 2, for instance, the application programs include voice-talk, camera, e-mail, music, television, internet video, games and so forth. These applications either represent tasks or are subdivided into tasks that are run as threads in a multithreaded processor, such as RISC processor 1105 or 1420 of FIG. 2 herein. The threads are either executed directly on the RISC processor or as threads controlling a hardware accelerator or an associated DSP 1110 or DSP in block 1420 responding to controlling interrupt(s) from the thread on the RISC processor. In some embodiments, the OS conveniently operates and launches applications on the real-estate efficient, power-efficient hardware of FIGS. 2, 3 4, 5 and 5A for example.

The OS efficiently occupies time on the hardware briefly at boot time to initially launch the system. The OS can set up the Thread Enable bits of register 3950 to indicate several threads that are initially enabled and are to be executed eventually. Thread Control State Machine 3990 responds to the Thread Enable bits and the Thread Priority values in the register 3950 to select and run threads on the multithreading hardware. At run-time the OS either briefly runs on an occasional software and hardware interrupt basis to switch threads, or thread switching is simply handled by the hardware of Thread Control State Machine 3990. A Thread Enable for a completed thread is reset in register 3950 to disable that thread, and then a next-priority thread is selected and run.

Figure 8A:
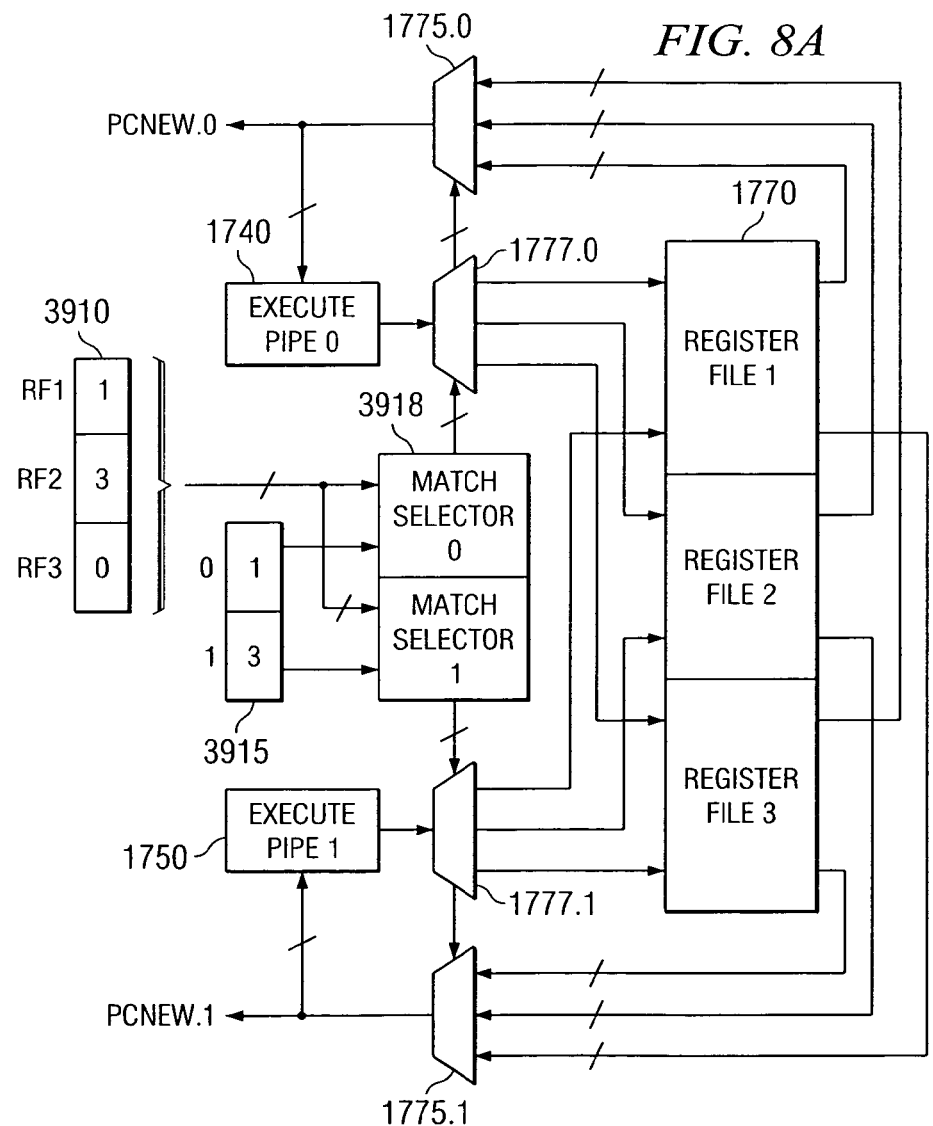
FIG. 8A is a block diagram of an inventive multi-threaded coupling circuit for execute pipelines and register files for threads and under control of registers in FIG. 8.

In FIG. 8A, execute pipelines Pipe0 and Pipe1 are respectively coupled by demuxes 1777.0 and 1777.1 to register files 1770 identified RF1, RF2, and/or RF3 for different threads. Pipe0 and Pipe1 have writeback outputs respectively coupled to corresponding input of demuxes 1777.0 and 1777.1. Demuxes 1777.0 and 1777.1 have three outputs, and the three outputs for each demux are coupled to corresponding ports pertaining to register files RF1, RF2, RF3.

In FIG. 8A, Demuxes 1777.0 and 1777.1 each have select lines respectively driven by circuitry 3918 that has corresponding circuits called Match Selector0 and Match Selector1. Each match selector circuit has an input fed by all fields of Thread Register File Register 3910 of FIG. 8. Match Selector0 has another input fed by the Pipe0 field of Pipe Thread Register 3915, and Match Selector1 has another input fed by the Pipe1 field of Pipe Thread Register 3915.

Match Selector0 detects which field (corresponding to a register file RFi) in register 3910 has a ThreadID entry that matches the thread ID in the Pipe0 field of register 3915. Match Selector0 then controls Demux 1777.0 to couple execute Pipe0 1740 to that particular register file RFi. Match Selector1 detects which field (corresponding to a register file RFx) in register 3910 has a ThreadID entry that matches the thread ID in the Pipe1 field of register 3915, and then controls Demux 1777.1 to couple execute Pipe1 1750 to that particular register file RFx. If a thread ID is using both Pipe0 and Pipe1, then the entries in both fields of Pipe Thread register field 3915 are the same, and the register 3910 has a single entry for that thread ID corresponding to one register file, say RF2. In that case, the execute Pipe0 and Pipe1 writeback outputs are coupled to ports of the same register file RF2.

Operands from the thread-specific register files are analogously sourced and fed back to the pipelines via muxes 1775.0 and 1775.1 to which the same match-based select controls are applied from the respective Match Selectors in circuitry 3918. Also, the thread specific PCs (program counters) are associated with the thread specific register files. The thread-specific program counters are similarly accessible by the match-based selector controls and fed back as PCNEW.0 and PCNEW.1 to the Fetch Unit of FIG. 6A. In this way, when each new thread is issued by changing the thread assignments in FIG. 8 Thread Register File Register 3910 and Pipe Thread Register 3915, the control circuitry of FIG. 8A responds so that the appropriate program counter is coupled to the Fetch unit of FIG. 6A and the execute pipelines 1740 and 1750 are coupled to the appropriate register file RFi in register files 1770 to support each new thread.

In FIGS. 8A and 12, the PCNEW.0 and PCNEW.1 selections are made by the control circuitry such as shown in FIG. 8A. Fetch simply fetches instructions to which the program counter (PC) points. This automatically makes the threads fetched by the Fetch Unit responsive to the Thread ID entries in the Pipe Thread Register 3915 and Thread Register File Register 3910. The Register File assigned to a Thread ID is loaded by Load Multiple instruction from memory pertaining to that Thread ID if the assigned register file has not already been so loaded. In this way the program counter PC in the assigned register value starts with a value that pertains to the thread of software identified by the Thread ID.

Thread Select logic 2285 in FIG. 6B produces Thread Select signals dependent on the IQ1, IQ2 full statuses that make connections in the hardware that are consistent with this already-achieved automatic coordination by the control circuitry of FIG. 8A. Accordingly, the threads are muxed from decode pipeline to the execute pipeline assigned to them.

The fetch unit in the illustrations of FIGS. 6B, 7A, and 6A has a cache line on instruction bus IRD that can hold as many as four instructions and that cache line on average delivers two instructions of a given thread per cycle. Accordingly, even though Thread Select ordinarily alternates between IQ1, IQ2, the path of each thread down the pipes is not scrambled by Thread Select. The fetch operation delivers two instructions on average for any one thread in one out of the two clock cycles in which the alternating occurs. Due to the alternation, the threads finally deliver one instruction per cycle per thread to each pipeline. The PCs (program counters) selected by FIG. 8A together with the lines back from execute area in FIG. 12 to the fetch unit in FIGS. 6A and 6B establish and link the fetch, decode, execute, and register file circuitry so that each thread is applied to the hardware in the correct manner.

In FIG. 8, the register organization in an alternative embodiment enters assigned pipe number(s) and register file identifications into a table extension of register 3930 that is indexed to Thread ID. In that type of embodiment, the information Thread Register File Register 3910 and Pipe Thread Register 3915 is instead equivalently entered in the table extension of register 3930. In FIG. 8A, the mux select controls are then delivered from those assigned pipe number(s) and register file identifications from the table extension of register 3930 instead of using the match selector circuitry 3918 to derive the mux select controls.

Figure 8B:
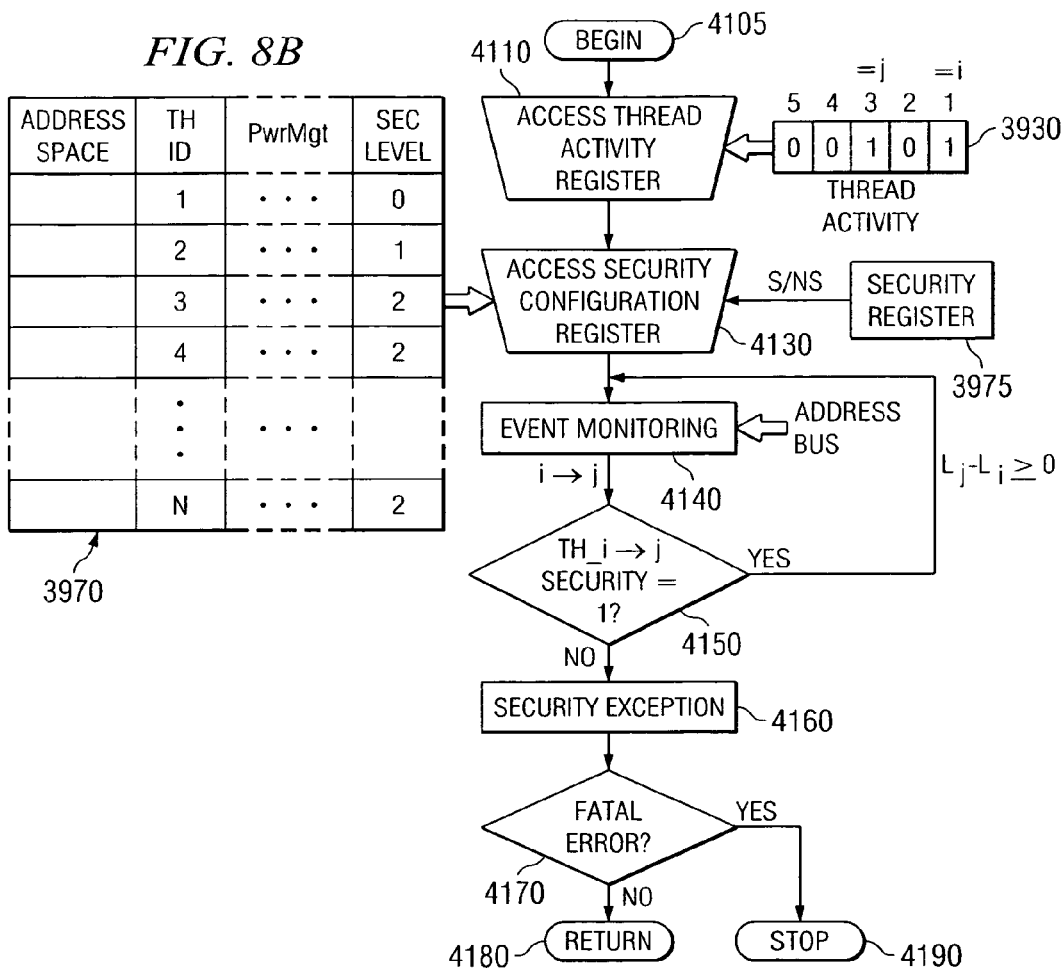
FIG. 8B is a partially-block, partially-flow diagram of an inventive security block for protecting threads from unauthorized accesses, and under control of registers in FIG. 8.

In FIG. 8B, security operations of an improved hardware security state machine are depicted. Security operations commence with a BEGIN 4105 and proceed to a step 4110 that accesses the Thread Activity Register 3930. Next a step 4120 uses a counter to find the thread IDs having active (1) entries in the Thread Activity Register 3930. A further step 4130 accesses the Thread Security Register 3970 of FIGS. 8 and 8B for the security configuration values pertaining to the security levels of each thread which is running in the pipelines. Step 4130 also accesses a processor-level security register 3975 in some embodiments for further security information.

An event monitoring step 4140 monitors one or more address and data buses for an access by an active thread of register 3930 to an address or space dedicated to a thread having a different thread ID j than the Thread ID i of the active thread attempting the access. In case of such an access event, operations proceed to a decision step 4150.

In an embodiment using Thread Security Register 3970, the decision step 4150 determines whether a difference of security level Lj for thread ID=j minus security level Li for thread ID=i is greater than or equal to zero (Lj−Li>=0). For example, if a level 1 thread i attempts access to a space for a level 2 thread j, then Lj−Li=2−1=1 which is greater than zero and the access is permitted. But if a level 1 thread i attempts access to a space for level 0 thread j, then Lj−Li=0−1=31 1 which is less than zero and the access is not permitted.

Thus, in FIG. 8B, if Yes at step 4150, then access is permitted and operations loop back to event monitoring step 4140 to await another cross-thread access attempt. If No at step 4150, then operations proceed to a Security Error step 4160 to do any one or more of the following—prevent the access, deliver a security error message, implement countermeasures, send a security e-mail to a central point, and do other security error responses. Then at a decision step 4170, operations determine whether the error is a fatal error according to some criterion such as attempted access to Operating System or Boot routine space. If not fatal, then operations may go to a RETURN 4180, and otherwise if fatal, operations suitably a STOP 4190 for reset or power off.

Figure 8C:
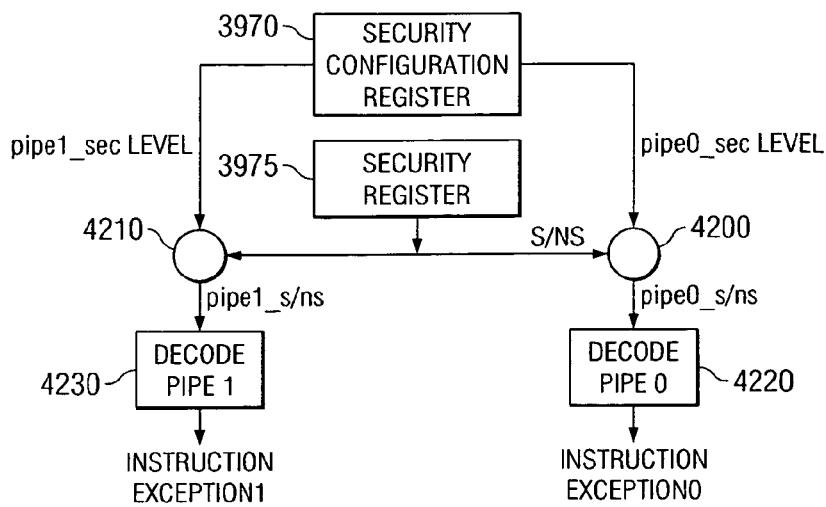
FIG. 8C is a block diagram of an inventive security control circuitry for use in the security block of FIG. 8B and the control logic of FIG. 8.

In FIG. 8C, an embodiment uses thread security levels of Thread Security Register 3970 of FIG. 8B together with a processor Security Register 3975 that determines a security level or non-secure state for the processor as a whole. Thread Security Register 3970, for one example, delivers thread pipe-specific security levels pipe0_seclevel and pipe1_seclevel for each pipeline to similar blocks 4200 and 4210 respectively. Security Register 3975 delivers, for example, a secure/non-secure S/NS level datum to qualify both the blocks 4200 and 4210.

The blocks 4200 and 4210 in one example make both pipes non-secured if the process S/NS level datum for the processor is non-secured level NS, and otherwise deliver the thread-specific security level pertinent to each pipe by the security level of the thread to which that pipe is assigned. More complex relationships are readily implemented in blocks 4200 and 4210, such as securing the OS but not the applications at a medium security (MS) processor level MS in a S/MS/NS set of levels in Security Register 3975. These operations in FIG. 8C provide further detail for step 4130 of FIG. 8B.

In FIG. 8C, output pipe0_s/ns and output pipe1_s/ns are respectively supplied by blocks 4200 and 4210 as described to govern the monitoring and security of each pipeline Pipe0 and Pipe1 according to the further steps 4140-4190 of FIG. 8B operating independently and in a pipeline-specific manner 4220 and 4230. Each decode pipeline independently decodes instructions for different threads. An instruction exception0 for Pipe0 or instruction exception1 for Pipe1 is generated when a security violation event occurs in the applicable pipeline for the thread as monitored by step 4140.

Such a security violation event occurs, for example, by specifying an illegal or security-violating operation detected at decode time or attempting an impermissible access that is first detected at execution time on a bus by a hardware secure state machine in security block 1450 of FIG. 2. A memory access is mediated by a TLB (Translation Look-aside Buffer) set up with different levels of security. Then type S/NS determines whether the TLB security level is used and whether access to the memory is permitted in a particular instance. An event for purposes of step 4140 means the occurrence of particular instructions or instruction conditions or field values in instructions that are detected on decode, or attempting an access to private address space of another thread in the memory. If an event of a monitored type in step 4140 occurs, then the event is decoded, compared or analyzed to check whether it is permitted based on the security levels in the security registers 3970 and 3975, and if not permitted then a security exception is generated for that pipe and Thread ID.

Figures 1, 8D:
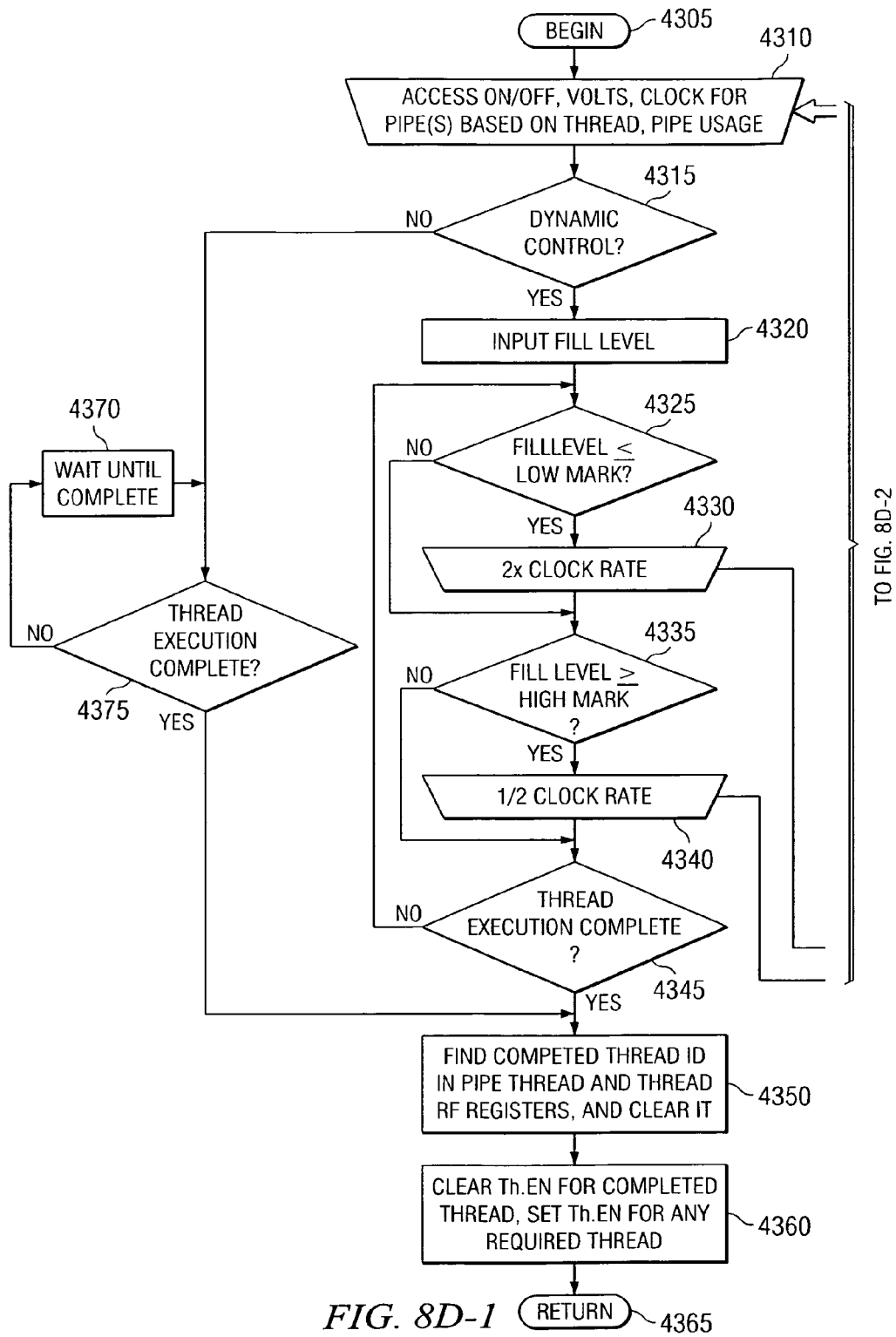
Figures 2, 8D:
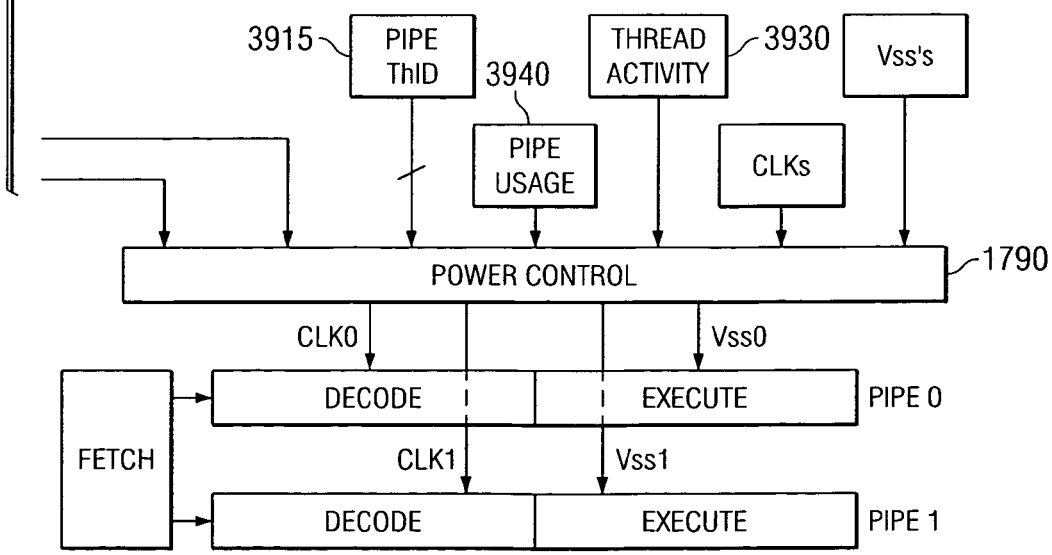

In FIGS. 8D-1, 8D-2, power management operations of the Thread Register Control Logic 3920 commence with BEGIN 4305 and an access step 4310 responds to Thread Power Management Register 3960. Access step 4310 accesses pertinent thread ID specific power management entries in register 3960 for Pipe On/Off, Pipe Clock Rate, Pipe Volts, and Dynamic Power Management.

Next, a decision step 4315 determines whether the Dynamic Power Management bit is set (Dyn=1) for a given thread ID. If Yes, operations proceed to a step 4320 to input or establish the watermark Fill Level value(s), and a predetermined Low Mark and High Mark for each buffer monitored. In cases of asynchronous threads, the pipes are suitably run at clock frequencies appropriate to each of the threads, further conserving power. Using a skid buffer (e.g., pending queue, replay queue, and instruction queue) with a watermark on (fill level signal from) each buffer which depends on the rate at which instructions are drawn out of each buffer, the control circuitry is made responsive as in FIG. 8D to the fill level signal to run different pipes, pipe portions, and other structures at any selected one of different clock frequencies and voltages.

Suppose Dyn=0 (Static Power Management) in register 3960 for a running Thread ID of register 3915. In that case, a pre-established Pipe Clock Rate and Pipe Volts as directed by register 3960 are applied to the pipes, portions and structures of FIG. 8D-2 in which the thread with that Thread ID is running. For each additional running Thread ID of register 3915, register 3960 controls the power management circuitry to apply a pre-established possibly different Pipe Clock Rate and Pipe Volts to other pipes, portions and structures on which the additional thread is running Some embodiments statically apply more complex combinations of different Clock Rates and Voltages to physically different pipes, portions and structures supporting even one running thread in those embodiments.

Description now turns to the case where Dyn=1 (Dynamic Power Management) is entered in register 3960 for a running Thread ID of register 3915. In that case, a pre-established initial Pipe Clock Rate and Pipe Volts as directed by register 3960 are applied to the pipes, portions and structures in which the thread with that Thread ID is running. Then operations of FIG. 8D-1 adjust the clock rate based on the fill level on each buffer.

The Dynamic Power Management operations proceed with a decision step 4325 that determines whether or not the Fill Level is less than or equal to the Low Mark. If Yes, then a step 4330 doubles (2×) the clock rate and sends a suitable signal to Power Control circuit 1790 to apply a twice the previous clock rate to the pipe(s) running the thread. If No in step 4325, then operations bypass step 4330. Next after step 4330, a decision step 4335 determines whether the Fill Level greater than or equal to the High Mark. If Yes, then a step 4340 halves (0.5×) the clock rate and sends a suitable signal to Power Control circuit 1790 to apply the one-half clock rate to the pipe(s) running the thread. If No in step 4335 then operations bypass step 4340.

Next, a decision step 4345 determines whether thread execution is complete. If not, then operations loop back to decision step 4325, and the clock rate is continually monitored and doubled or halved to keep the Fill Level between the Low Mark and the High Mark.

Note that use of double or half clocking provides an uncomplicated embodiment that accommodates transfer of data across clock domains synchronized on the clock edge for which clock rates are related by powers of two, while providing levels of power management. Powers of two means multiplying or dividing by two, four, eight, etc. (2, 4, 8, etc.). Asynchronous operation of different pipes relative to each other is also possible, and appropriate clock domain crossing circuitry is provided in the fetch stage in an asynchronous embodiment wherein the clock rates are varied and not related by powers of two.

When a thread is run at half rate, suppose it takes two clock cycles at full rate to get data from a data cache. The half-rate thread sees that full-rate cache as delivering data in one clock cycle. If either thread is running at full rate, the fetch unit can feed the instruction queue IQ1 at full rate. Feeding IQ2 at full rate and idling and buffering by IQ2 delivers the data to the half rate thread satisfactorily. Decode, scoreboard and execute pipe would run at half clock frequency for a half rate thread. In addition, in the multithreading mode, a pipeline can be powered down or shut down when not needed to run a thread as described elsewhere herein. Also, a pipeline appended to an execute pipeline is suitably run at a different clock frequency. In these various embodiments, power management is facilitated and this is increasingly important especially for low power and battery powered applications.

Leakage power becomes a higher proportion of total power as transistor dimensions are reduced as technology goes to successively smaller process nodes. One power management approach goes to as low a clock rate and as low a supply voltage as application performance will permit and thereby reduces dynamic power dissipation (frequency×capacitance times voltage-squared) while running the application. Another power management approach runs an application to completion at as high a clock rate as possible and then shuts the pipeline off or shuts the processor off to reduce leakage.

Different applications and hardware embodiments call for different power levels and power management approaches. Fetch is suitably run at the more demanding clock rate and voltage needed for either of two threads that are launched at any given time, and the decode and execute pipelines are powered and clocked appropriately to their specific threads. The embodiments herein accommodate either power management approach or judicious mixtures of the two, and simulation and testing are used to optimize the power management efficiency. The dynamic rate control such as in FIG. 8D-1 further contributes to power management efficiency while applications are running.

When thread execution is complete at step 4345 (Yes), then steps 4350 and 4360 support the completion of the thread execution. Step 4350 finds all occurrences of the completed Thread ID and clears it to zero in both the Pipe Thread Register 3915 and the Thread Register File Register 3910. Then step 4360 clears the Thread Enable EN in the Thread Priority Register 3950 corresponding to the Thread ID of the just-completed thread. Step 4360 also sets the Thread Enable EN in the Thread Priority Register 3950 corresponding to the Thread ID of any thread the execution of which has been requested by the just-completed thread (or this is suitably done already during execution of that just-completed thread). In some embodiments, one of either the hardware 3990 or the OS is exclusively responsible for handling step 4360.

If decision step 4315 detects Dyn=0 for Static Power Management of the thread, then operations branch from step 4315 to a step 4375 instead of performing dynamic power management steps 4320 through 4345. In static power management, step 4375 is a decision step that determines whether execution of a thread with the Thread ID is complete. If not complete (No), then operations branch to a step 4370 to wait until the thread execution is complete. When complete at step 4375, then operations proceed to completion steps 4350 and 4360, whence a RETURN 4365 is reached.

In some embodiments the steps 4310-4375 are instantiated in hardware combined with the Power Control circuit 1790. The operations of those steps are suitably performed in separate flows of FIG. 8D-1 for each thread independently. Power Control circuit 1790 in FIG. 8D-2 is responsive to the static/dynamic power management hardware and to the information in the Pipe Usage register 3940 that determines the thread IDs used to access Power Management Register 3960. Power Control circuit 1790 is responsive to Pipe Thread register 3915 to determine whether to apply the power management for a given thread ID to one or both pipelines Pipe0 and Pipe1 in FIG. 8D-2. When two thread IDs govern the processor, then Pipe Thread register 3915 determines which pipe is power-managed by which thread ID so that the correct thread-specific clock rate CLK and voltage Vss are delivered to the respective pipe in which a given thread is running.

Figure 9:
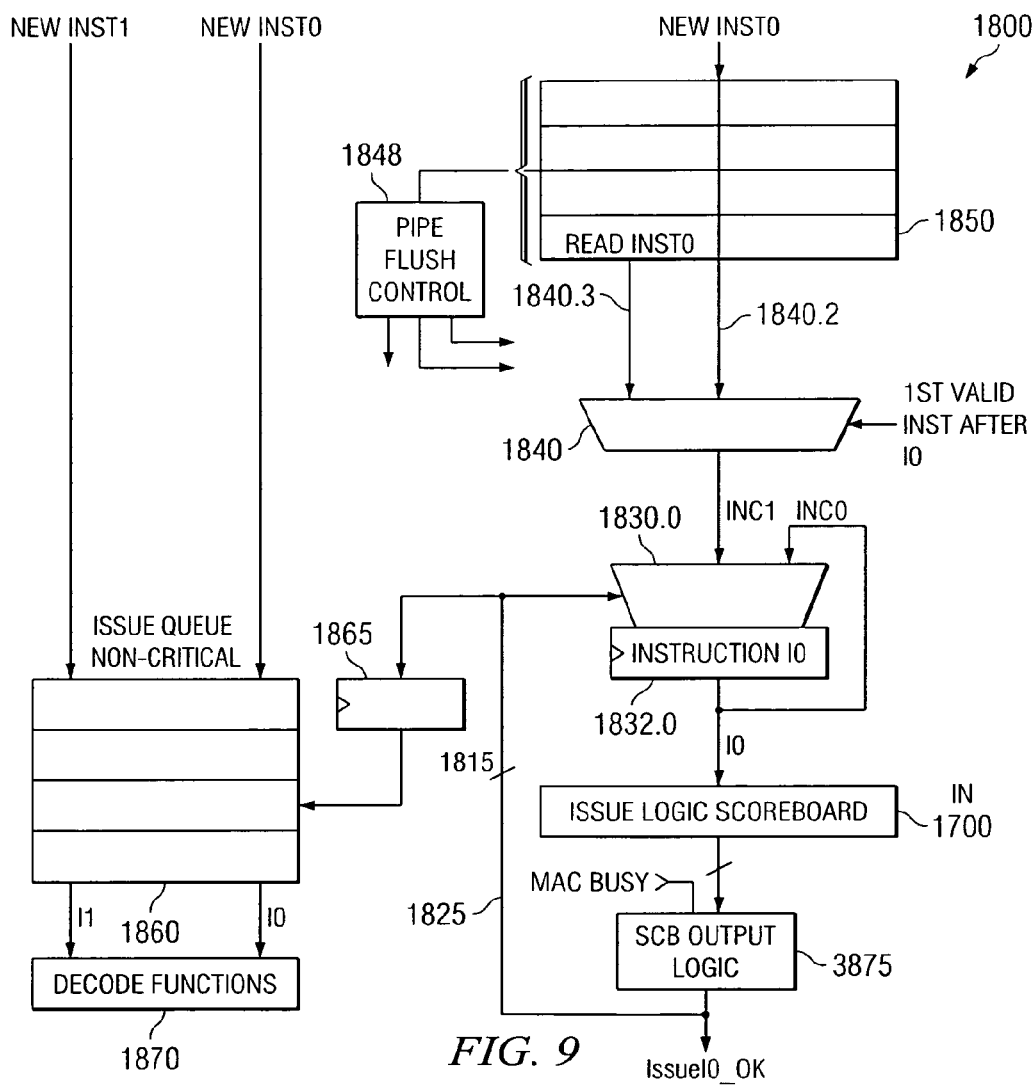
FIG. 9 is a block diagram of an inventive issue queue and scoreboard circuit for single-issue instruction scheduling control to one execute pipeline, such as for use twice for superscalar multi-threaded processing in FIG. 3.
Figure 10:
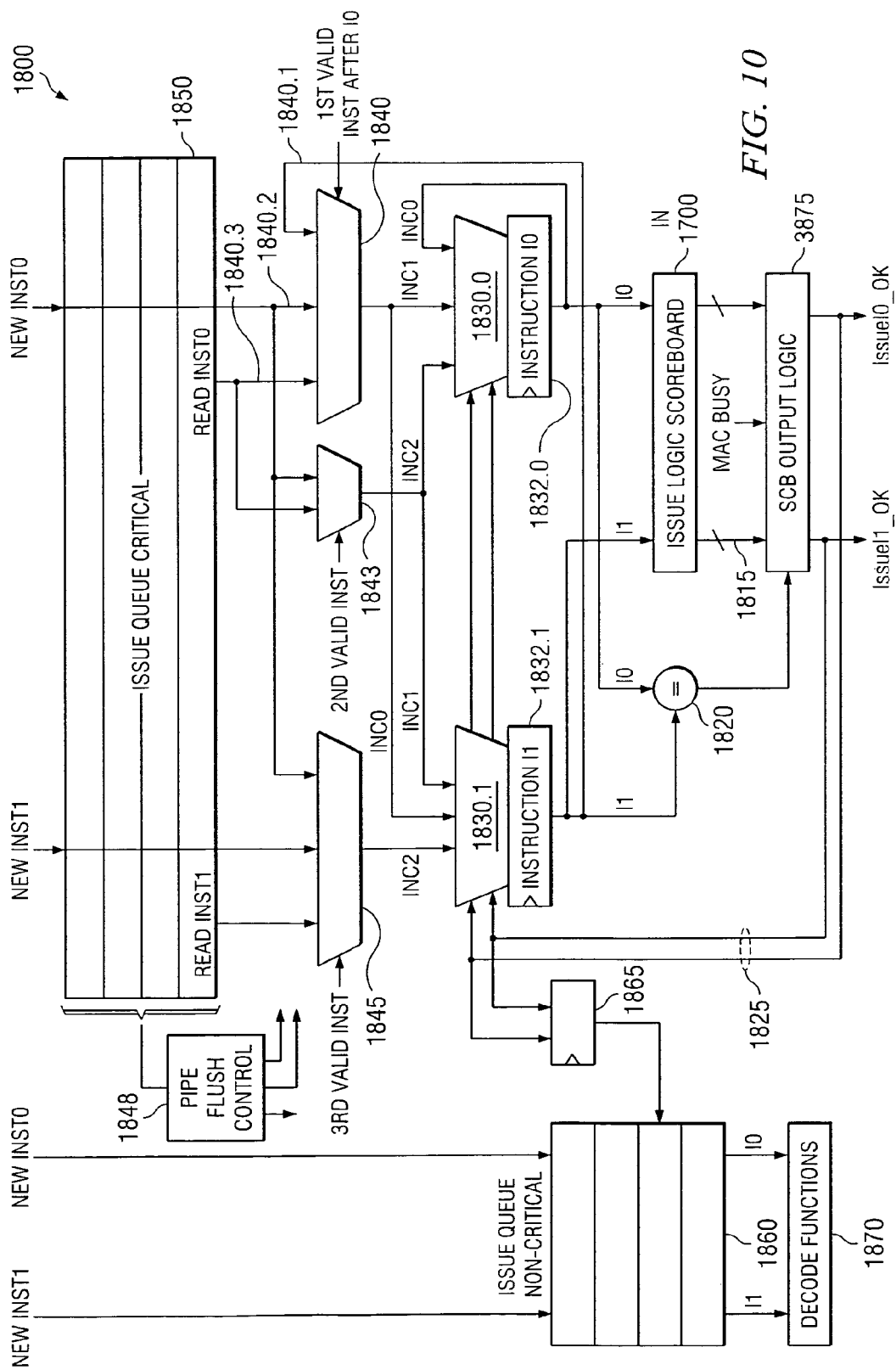
FIG. 10 is a block diagram of an inventive issue queue and scoreboard circuit for dual-issue instruction scheduling control to two execute pipelines, such as for use for a superscalar multi-threaded processor in FIGS. 4, 5 and 5A.
Figure 10B:
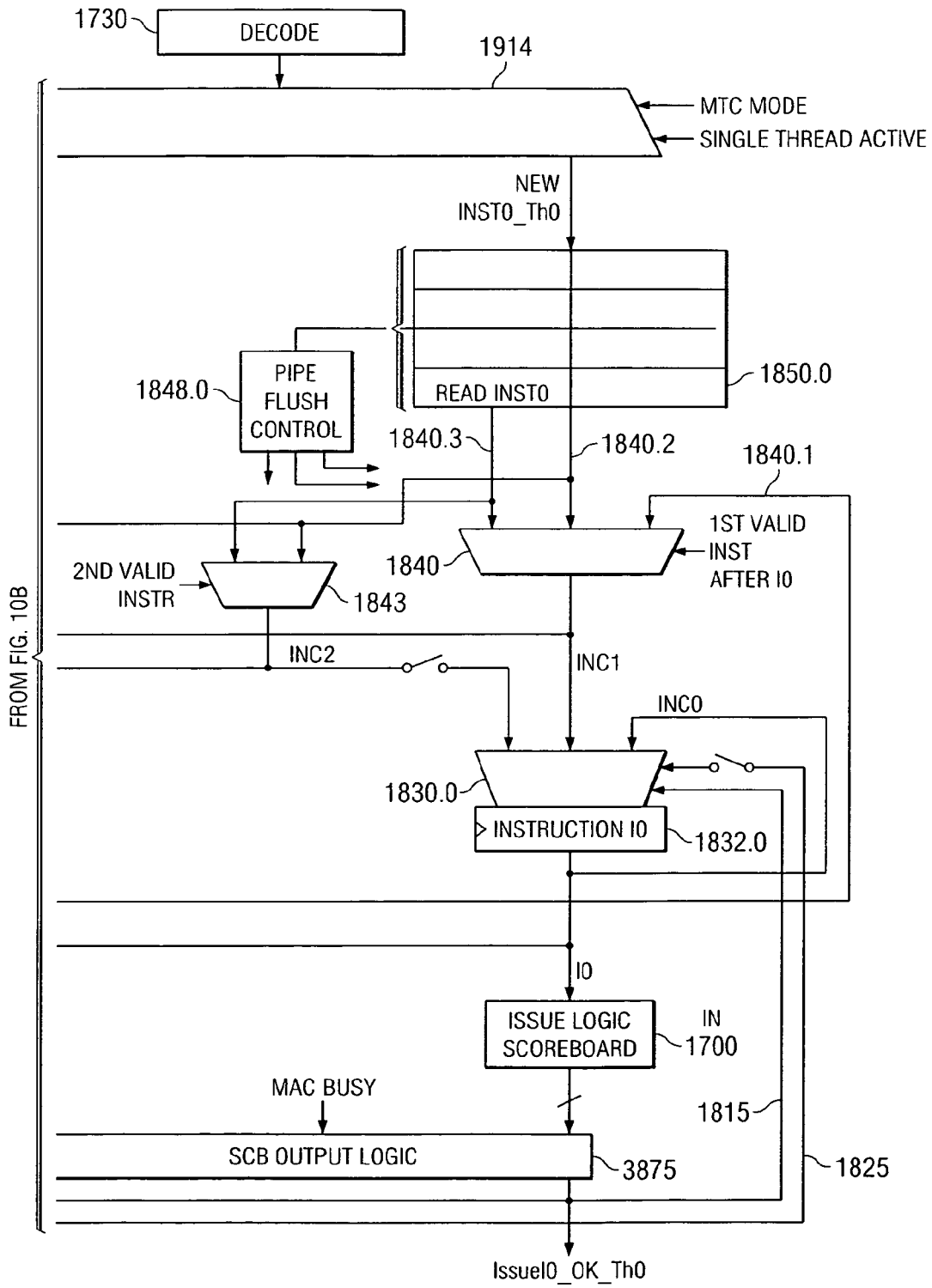

As detailed in FIGS. 9, 10, and 10A/10B the processors of FIGS. 3, 4, 5, 5A have various forms of improved issue-loop circuit 1800 in decode pipe 1630. The circuitry of FIG. 9 is replicated for multiple threads as shown in FIG. 3. The circuitry of FIG. 10 is replicated for each pipeline of FIG. 5. The circuitry of FIGS. 10A/10B is sufficient to support two pipelines such as in FIG. 5A. See also TI-38176 application for background details internal to the Issue Logic Scoreboard (lower scoreboard go/no-go) block of FIGS. 9, 10, 10A/10B and with herein improvements of FIGS. 5B-1, 5B-2, and upper scoreboard data forwarding of FIG. 11A. Further improvements are additionally described herein.

The circuitry of FIG. 9 supports one thread in a single pipe without dual issue. For multithreaded MTC=01 mode, the circuitry of FIG. 9 is repeated for each pipe. The circuitry of FIG. 10 supports one thread and dual-issue for MTC=00 mode. When the FIG. 10 circuitry is repeated for each pipe and used with FIG. 5 scoreboarding, it supports MTC=01, 10, and 11 modes as well. The circuitry of FIGS. 10A and 10B used with FIG. 5A scoreboarding operates in any of the MTC modes and effectively becomes either of the circuits of FIGS. 9 and 10 as special cases of operation of the circuitry of FIGS. 10A/10B. The following description applies to each of the circuits of FIGS. 9, 10, and 10A/10B where they have corresponding numerals. Differences between these circuits are also pointed out.

For a given thread, new instructions NEW INST0 and NEW INST1 are both entered into an instruction issue queue having two sections 1850, 1860 for different parts of each instruction. The first section, issue queue critical 1850, is provided for time-critical signals pertaining to an instruction. The second section, issue queue non-critical 1860, is provided for delay shifting of less-critical signals pertaining to the same instruction.

In queue stages within issue queue critical 1850.0 and 1850.1 respective to different instructions, the issue queue critical 1850 operates to queue source (consuming) and destination (producing) operands, condition code source, and bits for instruction type. The second section, issue queue non-critical 1860, operates to queue program counter addresses, instruction opcodes, immediates, and instruction type information respective to different instructions.

Issue queue critical 1850 suitably includes a register file structure with plural write ports and plural read ports. Issue queue critical 1850 has a write pointer that is increased with a number of valid instructions in a decode stage, a read pointer that is increased with a number of instructions issued concurrently to the execute pipeline, and a replay pointer that is increased with a number of instructions past a predetermined decode stage. The read pointer is set to a position of the replay pointer if a condition such as data cache miss or data unalignment is detected.

The issue loop circuit 1800 has an issue logic scoreboard SCB 1700 (lower row) and SCB Output Logic 3875 described further in FIGS. 5B-1/5B-2. Together the SCB 1700 and logic 3875 selectively produce an IssueI0OK signal at particular times that directs issuance of an Instruction I0 into execute pipeline Pipe0 1740 of FIG. 4. SCB Output Logic 3875 produces an IssueI1OK signal at particular times that directs issuance of an Instruction I1 into execute pipeline Pipe1 1750 of FIG. 4.

SCB Output Logic 3875 has inputs fed by muxes 1960 of FIG. 5B-2 and MAC0Busy, MAC1Busy, and MACBUSY of FIG. 11A, and an input from an intradependency compare circuit 1820. Intradependency compare circuit 1820 prevents premature issuance of instruction I1 in single threaded dual issue operation. This circuit 1820 is described further in connection with FIG. 8 of incorporated patent application TI-38176. Intradependency compare circuit 1820 is also herein called an operand identity checker circuit and is represented by a circled-equals-sign (=). Operand identity checker circuit 1820 performs a simultaneous instruction dependency check where instruction I0 produces an output to a register file register RN and instruction I1 as the Dependent Instruction requires an operand value input from the same register file register RN.

Note in FIGS. 10A/10B that transmission gates in the circuitry are represented by normally-open or normally closed switch symbols. The gates are responsive to the MTC modes. STA_Th0 and STA_Th1 are also suitably used to represent forms of single thread dual issue for controlling these gates. The Normal condition corresponds to multithreaded single issue per thread. Changing all the switch states corresponds to single thread dual issue based out of Pipe0. When multithreaded mode involves a thread in Pipe0 encountering L2 cache miss, operations in FIG. 17A suitably pause a remaining currently active thread in Pipe1, reassign the thread ID of that remaining thread to Pipe0 in the Thread Pipe Register 3915, set STA_Th0 active and restart that remaining thread in dual issue mode based out of Pipe0. When multithreaded mode involves a thread in Pipe1 encountering L2 cache miss, operations in FIG. 17A suitably pause a remaining currently active thread in Pipe0, set STA_Th0 and restart that remaining thread in dual issue mode based out of same Pipe0.

Some other embodiments use different variations on the circuitry of FIGS. 10A/10B to reverse the roles of the threads in dual issue depending on the states of STA_Th0 and STA_Th1 and provide additional symmetry. The circuitry explicitly shown in FIGS. 10A/10B for purposes of one such additionally-symmetrical embodiment, is seen as depicting for clarity certain switches for multithreading and for that part of single thread dual issue switching controlled by STA_Th0 active so that dual issue is based out of Pipe0. The mirror image of FIGS. 10A/10B is then overlaid on FIGS. 10A/10B themselves and used to add further switching and lines between the muxes to support single thread dual issue switching controlled by STA_Th1 active so that dual issue is responsively based out of Pipe1 when STA_Th1 is active. To avoid unnecessary tedious illustrative complication that is believed would obscure the drawing if entered explicitly, the illustration is left as shown in FIGS. 10A/10B with the understanding that the mirror image is included when constituting an additionally-symmetrical circuitry example. Then in the additionally-symmetrical circuitry, when multithreaded mode involves a thread in Pipe0 encountering L2 cache miss, operations in FIG. 17A suitably pause a remaining currently active thread in Pipe1, set STA_Th1 active and restart that remaining thread in dual issue mode based out of Pipe1. Conversely and symmetrically, when multithreaded mode involves a thread in Pipe1 encountering L2 cache miss, operations in FIG. 17A suitably pause a remaining currently active thread in Pipe0, set STA_Th0 active and restart that remaining thread in dual issue mode based out of Pipe0.

Note that in multithreaded MT Control Mode (MTC=01) for separate threads and no dual-issue or third thread issue, the intradependency compare circuit 1820 in FIG. 10A is disconnected. The intradependency input to SCB Output Logic 3875 is made inactive high since intradependency checking does not pertain as between the independent threads and should not prevent an otherwise-permitted issuance of instruction I1.

In multithreaded MT Control Modes MTC=10 and MTC=11 for separate threads and dual-issue of second thread permitted during pipe stall and third thread issue permitted in MTC=11 but not MTC=10, the intradependency compare circuit 1820 in FIG. 10A is disconnected when separate threads are present. The intradependency input to SCB Output Logic 3875 is made inactive high since intradependency checking does not pertain as between the independent threads and should not prevent an otherwise-permitted issuance of instruction I1 in either non-stall multithreaded operation in MTC=10 or MTC=11 mode, or during an instance of third thread issue in MTC=11 mode upon a stall. However, during a pipe stall in an instance when the second thread in the other pipe is set for dual issue into the stalled pipe in either MTC=10 or MTC=11 mode, the intradependency circuit 1820 is reconnected, since intradependency pertains to dual issue.

The lines IssueI0_OK and IssueI1_OK loop back to the selection control inputs of both of two muxes 1830.0 and 1830.1 to complete an issue loop path 1825. The two muxes 1830.0 and 1830.1 supply respective selected candidate instructions I0 and I1 to flops (local holding circuits) 1832.0 and 1832.1. The instructions I0 and I1 are each coupled to source and destination decoding circuitry in issue logic scoreboard 1700 and intradependency compare circuit 1820.

The flops 1832.0 and 1832.1 are updated by the muxes 1830.0 and 1830.1 respectively. Instructions are incremented by amounts suffixed to each input INC in FIGS. 9 and 10. The selector signals are established in FIGS. 10A/10B according to TABLE 5. Where INC has two suffixes, the first suffix is number of instructions incremented in multithreaded mode and second suffix is number incremented in dual issue. "X" means inapplicable.

TABLE 5

MUX SIGNALS IN FIGS. 10A/10B

| Selector Signals (IssueI1OK, IssueI0OK) | Selected Mux Input 1830.1, 1830.0 Dual Issue | Multithreaded |
|---|---|---|
| 00 | INCx0, INC0 | INC0x, INC0 |
| 01 | INCx1, INC1 | INC0x, INC1 |
| 10 | Not Permitted | INC12, INC0 |
| 11 | INC12, INC2 | INC12, INC1 |

In multithreaded MTC=01 mode, the right column of TABLE 5 shows each thread handled independently. In dual issue MTC=00 mode, when the selector signals are 00, no instruction has just been issued out of either flop 1832.0 or 1832.1. The current contents of flop 1832.0 are fed back through the input INC0 of mux 1830.0 into flop 1832.0 again. At this time, the current contents of flop 1832.1 are fed back to a mux 1840 input 1840.1. In one case of selection at mux 1840, the input 1840.1 is then coupled to an input INCx0 of mux 1830.1 and instruction I1 from flop 1832.1 returns back into flop 1832.1.

Further, dual issue MTC=00 mode increments one or two instructions when one or two candidate instructions I0 and I1 have just been issued. Mux 1830.0 has its INC1 and INC2 inputs and Mux 1830.1 has its INCx1 and INC12 inputs fed variously by muxes 1840, 1843 and 1845 as next described. Muxes 1840, 1843, and 1845 also have inputs fed from the Issue Queue Critical 1850.0 and 1850.1.

In one case of operation when selector signals are 01, Instruction I1 from flop 1832.1 is fed via mux 1840 over to flop 1832.0 because only the candidate instruction I0 has just been issued out of flop 1832.0 and the contents of flop 1832.1 are the appropriate next instruction via INC1 to be made a candidate for issue out of flop 1832.0. READ INST0 is coupled through mux 1843 to input INCx1 of mux 1830.1 to update flop 1832.1 to provide new candidate instruction I1. This is because READ INST0 supplies the next instruction in software program sequence.

In other cases when the selector signals are 01, the current contents of flop 1832.0 for candidate instruction I0 are updated via input INC1 from the output of mux 1840 either with the instruction at output READ INST0 of the queue 1850 or with NEW INST0 which is an input into the queue 1850.0. A selector input $1^{st}$ Valid Inst After I0 controls mux 1840. In this way, the next instruction for updating candidate instruction I0 is provided when the candidate instruction I0 has just been issued out of flop 1832.0.

Also, when the selector signals are 01, the current contents of flop 1832.1 for candidate instruction I1 are updated via input INCx1 of mux 1830.1 coupled from the output of a mux 1843. Mux 1843 has inputs for the instruction at output READ INST0 of the queue 1850 or with NEW INST0 which is an input into the queue 1850.0 A selector input 2nd Valid Inst After I0 controls mux 1843. In this way, the next instruction for updating candidate instruction I1 is provided when the candidate instruction I0 has just been issued out of flop 1832.0.

When the selector signals are 11, the current contents of flop 1832.0 for candidate instruction I0 are updated via input INC2 of mux 1830.0 from the output of mux 1843 either with the instruction at output READ INST0 of the queue 1850 or with NEW INST0 which is an input into the queue 1850.0. Selector input $2nd^{st}$ Valid Inst After I0 controls mux 1843. In this way, the next instruction for updating candidate instruction I0 is provided when both candidate instructions I0 and I1 have just been issued out of flops 1832.0 and 1832.1.

Also, when the selector signals are 11, the current contents of flop 1832.1 for candidate instruction I1 are updated via input INC12 of mux 1830.1 coupled from a mux 1845. Mux 1845 has inputs for the instruction at output READ INST1 of the queue 1850.1, NEW INST1 which is an input into the queue 1850.1, and NEW INST0 which is an input from the queue 1850.0 into Mux 1845. A selector input 3rd Valid Inst After I0 controls mux 1845. In this way, the next instruction for updating candidate instruction I1 is provided when both candidate instructions I0 and I1 have just been issued out of flops 1832.0 and 1832.1.

In one case of operation when selector signals are 11, READ INST0 is coupled through mux 1843 to input INC2 of mux 1830.0 to update flop 1832.0 to provide new candidate instruction I0. Similarly READ INST1 is coupled through mux 1845 to input INC12 of mux 1830.1 to update flop 1832.1 to provide new candidate instruction I1. In this way, a parallel pair of queued instructions is moved into the flops 1830.0 and 1830.1 in one clock cycle.

For handling a pipe flush, different cases occur and these are appropriately handled by feeding NEW INST0 and NEW INST1 respectively to flops 1832.0 and 1832.1, or otherwise as appropriately handled by pipe flush control circuitry 1848.0 and 1848.1 for the threads. That circuitry 1848 provides the selector control signals $1^{st}$ Valid Inst After I0, $2^{nd}$ Valid Inst After I0, and $3^{rd}$ Valid Inst After I0.

Also, in FIG. 10, the outputs from Issue Queue Non-Critical 1860 are controlled by control circuitry 1865 which is fed by the issue control signals IssueI0_OK and IssueI1_OK. The less time-critical portions of instructions I0 and I1 are fed to decode circuitry 1870 for Decode Functions.

In FIG. 11A, an upper row scoreboard is improved over incorporated patent application TI-38176, which provides detailed description of an upper row scoreboard. Further improvements are additionally described herein.

For dual issue mode or operation, write ports accommodate two instructions I0 and I1 for issue into at least first and second pipelines Pipe0 and Pipe1. The write ports have decoders 2222.1A, .1B, .0A, .0B and write logic 4425 to load "1000" into shift registers in respective rows of the shift register group 4441 and 4442 for all destinations of instructions I1 and I0. Depending on embodiment, both of the shift register groups 4441 and 4442 together are dual-written at rows for all destinations of both instructions I1 and I0. Alternatively, one of them (e.g. 4441) is reserved for all destinations of both I1 and I0. In multithreaded mode, the shift register group 4441 handles destinations of instruction I0 only. Shift register group 4442 independently handles destinations for instruction I1.

Furthermore, the diagram of FIG. 11A has decoders 2230.1A, .1B, .1C, .1D, .0A, .0B, .0C, .0D and muxes 2240.1A, .1B, .1C, .1D, .0A, .0B, .0C, .0D for additional read ports for all sources Src of candidate instruction I1. Then the read ports for instruction I0 feed source registers 2250 for pipeline Pipe0 1740 as shown (or selectively to a Type defined pipe). The read ports for instruction I1 feed source registers 2251 and shift circuits 2256 for pipeline Pipe1 1750 or any further additional pipeline identified by the Type bits of instruction I1.

In FIG. 11A, the MACBusy0 or MACBusy1 bit prevents issuance of another MAC instruction until the MAC unit is ready for it. Accordingly in this example, one thread at a time has its MAC instruction(s) on an upper scoreboard and the MAC busy logic responds to it, even when other types of instructions are also on the upper scoreboard. The MAC busy logic is coupled to every row of upper scoreboard shift register groups 4441 and 4442 in this embodiment of FIG. 11A.

In FIG. 11A, once an instruction from thread 0 is issued to MAC, then a MAC-busy0 bit is set until all the MAC instructions in thread 0 are retired. In SCB Output Logic 3875 of FIG. 5B-2, the MAC-busy0 bit prevents thread 1 from issuing any instruction to the MAC1745. Similarly the MAC-busy1 bit from thread 1 prevents thread 0 from issuing any instruction to the MAC. In cases wherein the instruction frequency for the MAC unit 1745 is relatively low, contention for the MAC unit 1745 does not arise or is very infrequent.

In FIGS. 11A and 11B, an upper scoreboard for controlling pipeline data forwarding is shown. Note that FIG. 5B-1 pertains to a distinct subject of issue scoreboarding by the lower scoreboard elsewhere in this description. In FIG. 5B-2, SCB Output Control 3875 is fed by MACBUSY from FIG. 11A.

In FIGS. 11A and 11B, 2200-level numerals are applied where possible to permit comparison of the embodiment FIG. 11A/11B herein with the single threaded circuitry of FIGS. 9A and 9B in the incorporated patent application TI-38176. Also, details in the incorporated patent application TI-38176 augment the description of FIGS. 11A/11B herein by the incorporation by reference. In FIGS. 11A/11B, 4400-level numerals are applied to highlight upper scoreboard structures and processes to handle multithreading and switch between handling a single thread and handling each additional thread, and generate MACBUSY.

In FIG. 11A, combinational write logic circuits 2222.xx and 4425, and combinational read logic circuits 2230.xx and 2240.xx and pipeline registers are real estate efficient for both single thread dual-issue and multithreading modes. A set of scoreboard storage arrays 4441, 4442 (and additional arrays as desired) are provided to handle multithreading and thus represent a per-thread array replication. The scoreboard storage arrays 4441, 4442 are written via 1:2 demuxed write logic

4425. The scoreboard storage arrays 4441, 4442 are read via a muxes 2240.*xx* which couple the arrays 4441, 4442 to the pipeline registers 2250 for Pipe0 and 2251 for Pipe1.

In an example of operation of upper scoreboards, suppose a first active thread has a Thread ID=1 and that Thread ID=1 is assigned to Pipe0 and register file RF1. Further suppose that a second thread is active and its Thread ID=3, and Thread ID=3 is assigned to Pipe1 and RF2. This hypothetical information is already assigned and entered as shown in connection with the Pipe Thread Register 3915 and Thread Register File Register 3910 of FIG. 8. In this example, upper scoreboard storage array 4441 is associated to the thread assigned to Pipe0 (e.g., Thread ID=1 here) via muxes 2240.0A, .0B, .0C, .0D. Upper scoreboard storage array 4442 is associated to the thread assigned to Pipe1 (e.g., Thread ID=3 here) via muxes 2240.1A, .1B, .1C, .1D.

In FIG. 11A, the upper scoreboard 4441 or 4442 for a given pipe keeps track of any MAC instruction and has bits from each row i=0, 1, . . . 15 fed to an OR-gate 4487.*i* or 4488.*i* respectively. OR-gate 4487.*i* or 4488.*i* is responsive to a singleton one indicating an issued instruction of any type, MAC or otherwise. Each of the sixteen row OR-gates 4487.*i* is qualified by occurrence of the MAC instruction type TYPE.0*i* for that row at a respective AND gate 4485.*i*. Thus, the relevant MAC instruction if any is detected. An OR-gate 4481 has 16 inputs respectively coupled to the outputs of the AND gates 4485.*i* to supply the MAC0Busy bit as output. In multithreaded (MT=1) mode, each of sixteen additional row OR-gates 4488.*i* is qualified by occurrence of the MAC instruction type TYPE.1*i* for a row in upper scoreboard 4442 at a respective AND gate 4486.*i* An OR-gate 4482 has 16 inputs respectively coupled to the outputs of the AND gates 4486.*i* to supply the MAC1Busy bit as output. The output MAC0Busy from OR-gate 4481 and the output MAC1Busy from OR-gate 4482 are supplied to inputs of an OR-gate 4480 to produce an ORed output MACBUSY.

The particular logic for detecting the singleton one in an upper scoreboard for MAC busy purposes is OR logic at gates 4487 and 4488 in this example. Such logic is suitably implemented OR-gate(s) in circuitry for upper scoreboards with high-active logic (singleton one on upper scoreboard). NAND gate(s) are alternatively used to implement low-active "OR" logic (singleton zero on upper scoreboard). An appropriate number of inputs depend on the hardware particulars of how many pipestages the MAC unit 1745 utilizes, and how many clocks must occur from an instance of issuance of one MAC instruction to the MAC unit before issuance of another MAC instruction is permitted from another thread.

For instance, if execute pipestages 1-4 are occupied by a first-thread MAC instruction in the MAC unit 1745 before a second-thread MAC instruction can be issued to the MAC unit 1745, then four (4) is the number of inputs to OR-gates 4487.*i* and 4488.*i* respectively coupled to the upper scoreboard bits of upper scoreboards 4441 and 4442 corresponding to those pipestages. While the singleton one is traveling across the first four bits of an upper scoreboard for the first MAC instruction, the OR-gate output is high because one of the four inputs to the OR-gates 4487.*i* or 4488.*i* from the upper scoreboard is high.

The upper scoreboard of FIG. 11A has rows that operate so that when an instruction is issued that has a write into a register file register corresponding to a given row of bits in an upper scoreboard, a singleton bit moves across at least one row of the upper scoreboard in correspondence with and to identify the pipestage position of the instruction progressively down the execute pipeline stages. The MACBusy0 bit in this embodiment is arranged to be active as long as a MAC instruction from a given scoreboard SB1 (and analogously for MAC1Busy and scoreboard SB2) is being processed by the MAC unit 1745 or until the MAC unit 1745 is ready to receive another MAC instruction, whichever is less. The MAC unit also participates in data forwarding to the execute pipelines 1740 and 1750 by the arrangement of FIGS. 11A-11E wherein the TYPE information and upper scoreboard are pipelined.

In another type of embodiment, each row 4441.*i* or 4442.*i* has logic to clear the TYPE.0*i* or TYPE.1*i* information in that row as soon as the singleton bit has traversed the row. The TYPE.0*i* or .1*i* information is ORed by the two OR gates 4481 and 4482 respectively, and the embodiment omits gates 4485.*i*, 4486.*i*, 4487.*i* and 4488.*i* from the MACBUSY logic path.

Alternatively, MAC busy-control between threads is economically provided as one or two additional registers in a lower scoreboard register file row of FIG. 5B-1. Two more embodiments, among others, are described further hereinbelow. For purposes of these embodiments, the MAC unit 1745 is pipelined, and a given thread can issue instructions every clock cycle to the MAC unit. Further, the MAC unit is only used by one of the threads at any given time, so the MAC is busy and unavailable to the other thread as long as one or more MAC instructions from a given thread are using the MAC unit by traversing its pipeline. The MAC instruction in a thread can write to a register file register destination that is a source operand for either a subsequent MAC or non-MAC instruction in that thread. Accordingly, each dependency scoreboard (lower scoreboard) row (e.g. in rows 0-15 of FIG. 5B-1) handles dependencies between a MAC instruction and another non-MAC or MAC instruction in the same thread. However, the non-MAC instructions in another thread in the other pipe have no dependencies on the MAC instruction in the given first thread. A MAC instruction in the other thread is made to wait in this example as long as the MAC unit 1745 is busy with a MAC instruction from the first thread, and vice-versa.

In a first single additional scoreboard row MAC busy-control embodiment, an additional MAC row shift register (beyond lower scoreboard rows 0-15) has zeroes except that a one (1) bit is set at row-right on issuing of a MAC instruction (as determined by MAC type decode from the MAC instruction) and shifted left every clock cycle (like the scoreboard bit of a lower scoreboard register). A first auxiliary thread pipe bit is set to one (1) for MAC unit processing instruction(s) from a thread active in Pipe0. A second auxiliary thread pipe bit is set to one (1) for MAC unit processing instruction(s) from a thread active in Pipe1. Instead of decoding of the register address to access a specific register in the scoreboard for dependency, the instruction opcode is decoded for MAC instruction to access the scoreboard for dependency, the dependency is qualified with instruction thread pipe. This special single MAC scoreboard row is shared between two threads from two pipelines. Signal MAC0Busy is derived from a single AND gate 4485 fed by the leftmost bit in the single MAC scoreboard row and qualified by the first auxiliary bit for Pipe0 thread active in MAC unit. Signal MAC is derived from a single AND gate 4486 fed by the leftmost bit in the single MAC scoreboard row and qualified by the second auxiliary bit for Pipe1 thread active in MAC unit. In this way, much of the MAC-related OR-AND logic of FIG. 11A is eliminated in this embodiment. The additional MAC scoreboard row is shared between at least two threads from at least two pipelines.

In a second single-register MAC busy-control embodiment, a two additional lower scoreboard rows, one for each thread, are implemented as described hereinabove, no type bit, no location bit, no auxiliary bits. Thread 0 (pipe 0) shifts a one (1) in its additional scoreboard for issuing a MAC instruction but accesses the other MAC scoreboard row for MAC1Busy dependency, and vice versa for Thread 1 (pipe 1) for MAC0Busy dependency. In this second single-row MAC busy-control embodiment, a one (1) bit is set on issuing of a MAC instruction and shifted left every clock cycle (like the lower scoreboard bit operation of any lower scoreboard 3851 or 3852 row 0-15 that corresponds to a register file register for that thread). This single-row embodiment simplifies the circuitry of FIG. 11A, so that an additional single MAC row (e.g. a row 16) is added to each scoreboard array 3851 and 3852. MAC0Busy is the state (or complement) of the leftmost bit itself in the MAC row 16 associated with lower scoreboard 3851. MAC1Busy is the state (or complement) of the leftmost bit itself in the MAC row 16 associated with lower scoreboard 3852. In this way, much of the MAC-related OR-AND logic of FIG. 11A is eliminated in this second embodiment. The instruction opcode in a thread i is type-decoded for MAC instruction to obtain TYPEi in FIG. 11A to qualify a write to the MAC additional row 16 of this second embodiment. When the leftmost one (1) advancing left in MAC row 16 for a thread i reaches a far left bit position for MAC unit writeback, then that far left bit position changes state from zero (MACiBusy) to one (clear MACiBusy).

In some embodiments, a similar Busy signal is used by lower or upper scoreboarding busy logic in any of the following types of additional circuitry, 1) MAC unit(s), 2) hardware accelerator(s) and 3) other additional circuitry. The Busy logic is suitably provided and arranged in any variant needed to accommodate the operating principles and shorter or longer length of time the additional circuitry operates and uses until it is available for a further instruction and based on the teachings herein.

In FIG. 5B-2, AND-gate 1965 for IssueI0OK is fed with a qualifying input supplied by a NAND-gate 4491. NAND-gate 4491 has a first input fed by the MAC1BUSY output of OR-gate 4482 of FIG. 11A. NAND-gate 4491 has a second input I0TypeMAC fed from the instruction candidate I0 decode that tells whether the candidate instruction I0 is a MAC type instruction or not. If the MAC1BUSY signal is active so that the MAC unit is busy with an instruction from another thread, and if the I0TypeMAC is also active, the output of NAND-gate 4491 goes low and disqualifies AND gate 1965. In this way, candidate instruction I0 of MAC type is prevented by NAND-gate 4491 from issuing to the MAC unit 1745 when the MAC unit is busy with an instruction from another thread. However, if either the MAC unit is not thus busy or the candidate instruction I0 is not of MAC type, then NAND-gate 4491 produces an output high that permits issuance of I0 by AND-gate 1965 if no other condition preventing issuance is present.

Similarly in FIG. 5B-2, AND-gate 1975 for Issue I1OK is fed with a qualifying input supplied by a NAND-gate 4492. NAND-gate 4492 has a first input fed by the MAC0BUSY output of OR-gate 4481 of FIG. 11A. NAND-gate 4492 has a second input I1TypeMAC fed from the instruction I1 decode that tells whether the candidate instruction I1 is a MAC type instruction or not. If the MAC0BUSY line is active so that the MAC unit is busy with an instruction with a different thread from the thread of instruction I1, and if the I1TypeMAC is active, the output of NAND-gate 4492 goes low and disqualifies AND gate 1975. In this way candidate instruction I1 of MAC type is prevented by NAND-gate 4492 from issuing to the MAC unit when the MAC unit is busy with an instruction from a different thread. Conversely, if either the MAC unit is not thus busy or the candidate instruction I1 is not of MAC type, then NAND-gate 4492 produces an output high that does not prevent issuance by AND-gate 1975 if no other condition preventing issuance is present.

In FIG. 5B-2, moreover, the AND-gate 1975 has further MAC-related qualifying input NMACInterDep which prevents simultaneous issuance of a MAC instruction from both threads at once due to a MAC interdependency in multi-threaded mode MT=1 or in dual issue operation of a single thread. Logic 4495 generates NMACInterDep signal N_0 to veto issuance of instruction I0 and signal N_1 to veto issuance of instruction I1 as follows:

N_0=NOT(SELECT0 & I1TypeMAC & IssueI1OK & I0TypeMAC & NOT MACBUSY).

SELECT0=STA_Th1 OR Priority1 OR (ThreadSelect & NOT(STA_Th0 OR STA_Th1)& NOT(Priority0 OR Priority1))

N_1=NOT(SELECT1 & I0TypeMAC & IssueI0OK & I1TypeMAC & NOT MACBUSY).

SELECT1=STA_Th0 OR Priority0 OR ((NOT ThreadSelect) & NOT(STA_Th0 OR STA_Th1)& NOT(Priority0 OR Priority1))

In single-threaded dual issue out of pipe0 (STA_Th0 high), this logic 4495 goes low at N_1 and vetoes issuance of a MAC-type candidate instruction I1 by AND-gate 1975 when the MAC unit 1745 is not busy and a MAC-type candidate instruction I0 is about to issue. Conversely, in single-threaded dual issue out of pipe1 (STA_Th1 high), logic 4495 goes low at N_0 and vetoes issuance of a MAC-type candidate instruction I0 by AND-gate 1975 when the MAC unit 1745 is not busy and a MAC-type candidate instruction I1 is about to issue.

In multithreaded operation (both STA_Th0 and STA_Th1 low), veto selection signals SELECT0 and SELECT1 provide a round robin priority to thread issuance to the MAC unit 1745. An embodiment for hardware-based round robin control utilizes the IQ control signal ThreadSelect because this signal either alternates or instead identifies an instruction queue for fetch when the other IQ is full. In the latter case, the non-full IQ is identified by ThreadSelect (e.g., low for Pipe0 and high for Pipe1), and issuance to the MAC from the other pipe having the full IQ is suitably vetoed, in this example of the logic. This policy is suitably applied in reverse to in another embodiment to veto issuance to the MAC from the pipe that has not-full IQ instead. When ThreadSelect is alternating, then the thread which is issued is determined by which state the alternating ThreadSelect signal exists in currently. In another embodiment for round robin control, the number of clock cycles allocated to a selected thread is extended over a predetermined number of clock cycles if consecutive MAC instructions are incoming from that thread and before selecting and executing consecutive MAC instructions from another thread. This operation further enhances pipeline usage of the MAC unit by equal priority threads.

In such round-robin multithreaded operation, suppose Thread Select is high when all other conditions are met to allow issuance to MAC from either pipe0 or pipe1. Logic 4495 goes low at N_0 and vetoes issuance of a MAC-type candidate instruction I0 by AND-gate 1965 when the MAC unit 1745 is not busy and a MAC-type candidate instruction I1 is about to issue.

The round robin operation is overridden by priority terms in the above logic when appropriate. For example, a Priority0 signal active in multithreaded mode means Pipe0 thread has priority over Pipe 1 thread, and Priority1 active means the converse. If Priority0 and Priority1 are both inactive, then neither thread has priority over the other thread, and round robin operation is permitted in multithreaded mode. In a multithreaded case where one real time thread and one non-real-time thread are both active, for instance, the SELECT0 and SELECT1 round robin logic is overridden and the real time thread is enabled to issue its MAC instruction if no other reason to prevent issuance exists. In such case, the real time thread has a higher priority relative to the non-real-time thread, and the MAC issuance selection favors the higher priority thread.

Thus, MACBusy0 or MACBusy1 prevents either lower scoreboard in any of FIGS. 3, 5, 5A and FIGS. 5B-1, 5B-2 from permitting issue of a second MAC instruction in the same clock cycle, even if it is in the same or another thread. This prevents the second MAC instruction from using the MAC 1745 as long as the MAC dependency is present.

When the MAC unit is ready and both of two threads are ready to issue a respective MAC instruction, the thread that is permitted to issue its next MAC instruction depends on the control circuitry selected—in one case a predetermined thread, in another case a round-robin result. If the percentage of MAC instructions in one thread or the other is very small, it does not matter which method to use. If both of two threads have a series of MAC instructions that are spaced closer together in the Issue Queue than the length of the MAC unit, the control circuitry may repeatedly confront the situation of both threads ready to issue a MAC instruction. Given a higher priority thread such as a real-time thread, the higher priority thread wins over and even excludes a lower priority thread in the example hereinabove, and round-robin is used for other cases. Where exclusion is not desired, the priority assignments of the threads involved are revised to be more equal at configuration time in Thread Priority register 3950 of FIG. 8.

Issue bits and Type routing down pipelines as described next and elsewhere herein. In FIG. 11A and FIG. 11C, these further bits are routed by muxing down the pipelines. Issue I0_0K and IssueI1_0K of FIG. 11 are respectively routed down pipeline Pipe0 and Pipe1. Type entry bits 1760 are selected by mux 1765.x of FIG. 5 of incorporated application TI-38176 which is controlled by the same Src decoders 2230.xx as in FIG. 11. The Type entry muxing is muxing 2240.xx with two additional inputs and fed to a non-shifted portion of pipeline registers 2250.xx that bypass shifters 2255.xx for the data forwarding singleton-ones in register 2250.xx.

Data forwarding, for instance as described in incorporated patent application TI-38176, need not be modified for multi-threading. An automatic consequence of the different uses of the execute pipes by one or more threads is that one-pipe data forwarding occurs within a thread in multi-threading instead of data forwarding between execute pipes when single-thread occupies both pipes. Isolation of the pipes is achieved for independent threads. Communication between threads is by way of memory, if at all. There is no need to pipeline a thread tag or thread ID down the execute pipeline to control data forwarding or limit it to within-pipe data forwarding in FIGS. 11A-F. There is no need to pipeline an MT/ST (multi-threading/single-threading mode) bit down the execute pipeline(s) for this purpose. Some embodiments may include such feature for other purposes.

In FIG. 11B, write logic 4425 of FIG. 11A is fed with destination A and B signals for each of instructions I0 and I1. AND-gate 2227.xA has an input for instruction I0 DSTA for destination A. AND-gate 2227.xB has an input for instruction I0 DSTB destination B. Both AND-gates 2227.xA and 2227.xB are qualified by signal line IssueI0OK. The output of each of the AND-gates 2227.xA and 2227.xB is fed to an OR-gate 4429.x0 for instruction I0. Analogously for instruction I1 DSTA and I1 DSTB, signal line IssueI1OK qualifies corresponding gates 2226.xA, 2226.xB. The gates 2226.xA, 2226.xB are connected to an OR-gate 4429.x1 in the same way.

Upper scoreboard logic arrays 4441 and 4442 each have a number of rows x corresponding to each of the registers in a register file block RFi for a thread in register files 1770. Logic 4450 couples the output of OR-gate 4429.x0 to write enable input WR_EN_TH0x of row x of upper scoreboard storage array 4441 and the output of OR-gate 4429.x1 to write enable input WR_EN_TH1x of row x upper scoreboard storage array 4442. In logic 4450, a 1:2 Demux 4455 and has its selector controls driven by both the MT Mode 3855 and signals STA_Th0 and STA_Th1 from Single Thread Active 3856 (compare FIG. 5B-1) according to the embodiment.

In single thread mode (MT=0 or MTC=00), the output of OR-gate 4458 is coupled via mux 4455 to AND-gate 4460 to WR_EN_TH1 and the upper scoreboard services the single thread. Gates 4466 and 4468 are conductive. In another embodiment, Mux 4455 is operated as a coupler from the output of OR-gate 4458 to both rows 4441.x and 4442.x and dual writes concurrently to both rows.

In the multi-threaded mode (MT=1, MTC=01, 10, 11), the outputs of OR-gates 4429.x0 and 4429.x1 are separately routed via gates 4464 and 4462 which are conductive respectively to rows 4441.x and 4442.x. During intervals of dual issue in MTC=10 or 11 modes, operations temporarily work as in MTC=00 mode.

An OR-gate 4458 has first and second inputs respectively fed by the output of OR-gate 4429.x0 and OR-gate 4429.x1. Each of two MT-gates 4462 and 4464 has an input end fed by the output of OR-gate 4429.x0 or OR-gate 4429.x1 respectively. MT-gate 4464 has its output end feeding line WR_EN_TH0. MT-gate 4462 has its output end feeding a write input of an AND-gate 4460 which in turn has an output to line WR_EN_TH1. AND-gate 4460 has a second input qualified by a line Single Pipe Mode. Demux 4455 has an input fed by the output of OR-gate 4458. Demux 4455 has outputs respectively coupled by not-MT-gates 4466 and 4468 to the line WR_EN_TH0 and the write input of AND gate 4460.

FIGS. 11C, 11D, 11E, 11F show blocks and circuitry for data forwarding in the execute pipelines. In single threaded mode MT=0, or MT=1 and MTC=00, or dual issue in the MTC=10 and 11 control modes, the description of correspondingly-numbered elements in incorporated patent application TI-38176 provides background. Data forwarding is permitted and supported between pipes when it occurs during dual issue single threaded operation, as well as within a pipe on single-issue single threading. In multithreaded mode MT=1 and MTC=01, 10 or 11, when different threads go down their respective pipes each thread is supported by one pipe. Data forwarding is permitted and supported within any one pipe for a given thread. In this embodiment data forwarding is not permitted between pipes in FIGS. 11C, 11D, 11E, 11F when different threads are in the pipes respectively. Real estate is efficiently used because data forwarding occurs free of pipelined Thread IDs.

FIG. 12 shows pertinent control circuitry for one execute pipeline acting as one thread pipe. The circuitry of FIG. 12 is replicated for a second thread pipe, and additionally replicated for each additional thread pipe (if used). In FIG. 12, the pipe thread suffixes on identifying legends and numerals are simply complemented to go from Pipe0 of FIG. 12 to depict the corresponding of circuitry for Pipe1.

In FIG. 12, the program counter outputs PCNEW.0 and PCNEW.1 are muxed and fed back to the Fetch Unit of FIGS.

6A and 6B according to the matching circuitry and muxes 1775.*i* of FIG. 8A. Muxes 3272.*i*, 3284.*i*, 3040.*i* are responsive to the thread specific Single Thread Active signals abbreviated STA_Th0 and STA_Th1. These muxes along with muxes 1775.*i* provide two independent FIG. 12 Pipe 0 and Pipe 1 circuitries 1870.*i* in multithreaded operation (STA_Th0 and STA_Th1 both inactive). In single threaded dual issue operation, those muxes respond to whichever signal STA_Th0 and STA_Th1 is active to splice two FIG. 12 circuitries together. Compare this improved FIG. 12 circuitry to the circuitry of FIG. 7 of incorporated patent application TI-38252, Ser. No. 11/210,354 wherein the latter acts as if it were a special case hardwired for only single thread dual issue operation.

In FIG. 12, thread-specific FIFO sections 1860.*i* provide respective predicted taken target PC addresses PTTPC.i. Thread-based program counter line PC1.0 is generated and used in Pipe0 except when mux 3272.*i* responds to Single Thread Active STA_Th1 to select PC1.1 analogously derived from Pipe1 for use in single threaded dual issue operation based on Pipe1 as primary pipe. Line PC1.0 is analogously sent to a corresponding mux 3272.1 in Pipe1, and mux 3272.1 is controlled by STA_Th0 for dual issue based on Pipe0.

In FIG. 12, Mux 3284.0 in branch execution in multi-threaded mode delivers address compare output COMPARE0 3010.0 to a flop for MISPREDICT.0. In single-threaded dual issue operation based on thread Pipe0, an OR-gate 3282.0 is fed by both COMPARE0 and COMPARE1. Mux 3284.0 delivers the output of OR-gate 3282.0 to MISPREDICT.0 when line Single Thread Active STA_Th0 is active (e.g., high). Analogously in Pipe 1, the corresponding circuitry with an OR-gate 3282.1 and mux 3284.1 is controlled by STA_Th1 and OR-gate 3282.1 there receives COMPARE0 from Pipe0 as well as COMPARE1 from Pipe1.

In FIG. 12, Mux 3040.0 in multithreaded mode is controlled by CC0 condition code from adder 3030.0 and signals MISPREDICT and CALL to select between the output of flop 3215 or actual target address ATA0. In single threaded dual issue operation, with STA_Th0 being active, the additional actual target address ATA1 from Pipe1 is included as a selection alternative by mux 3040.0. In Pipe1, a corresponding Mux 3040.1 receives ATA0 from Pipe1 as well as ATA1 in Pipe1.

Further muxes (not shown) are similarly provided and controlled by STA_Th0 or STA_Th1 as appropriate to provide various thread specific or dual issue single thread-based signals ISA, TAKEN, MISPREDICT, PREDICTTAKEN, CALL, PCCTL, and PC controls.

Figure 13:
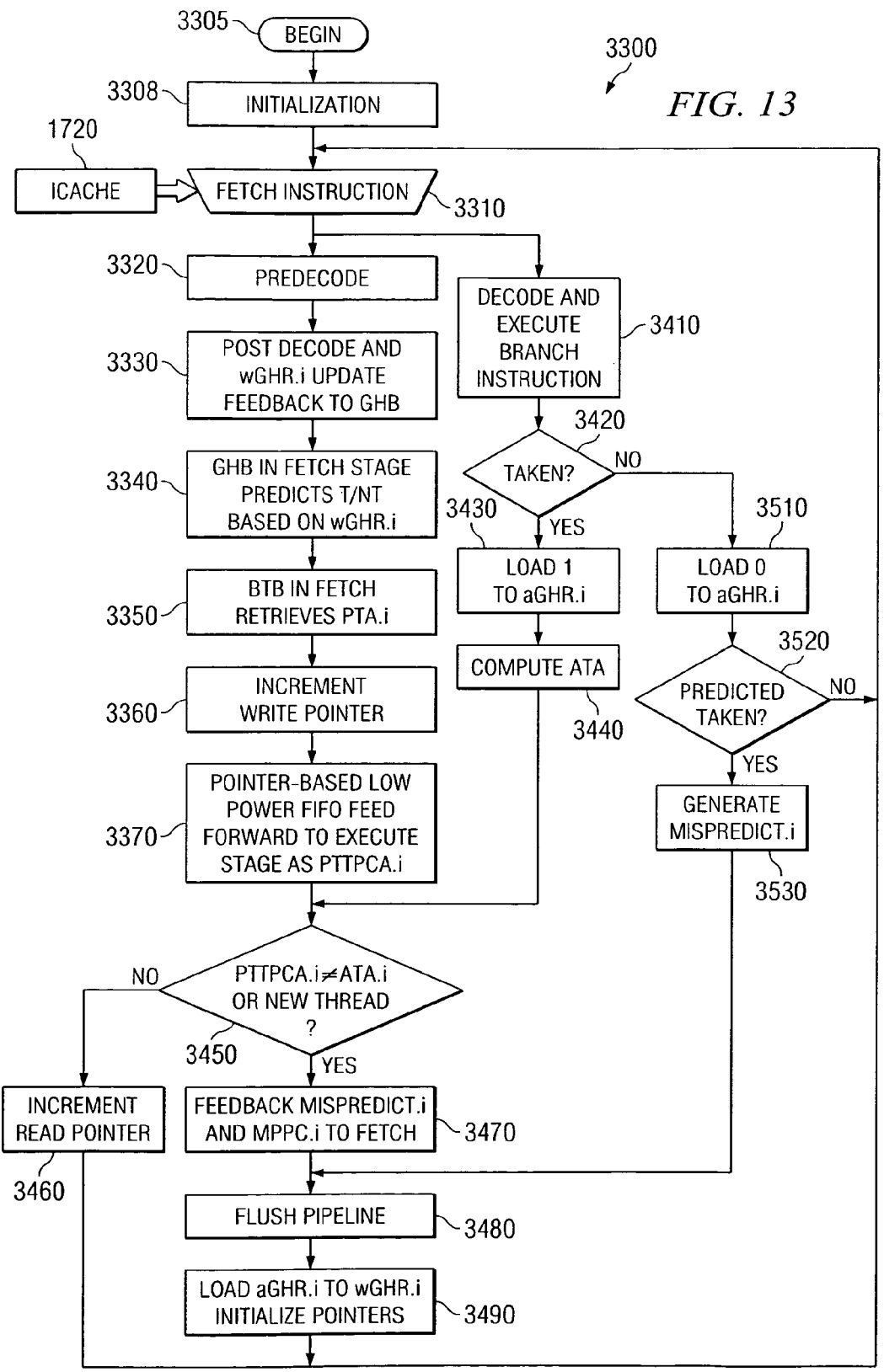
FIG. 13 is a flow diagram of an inventive thread-based process for starting a new thread by use of the MISPREDICT.i signal of FIG. 12.

In FIG. 13, a thread-based process starts a new thread by use of the MISPREDICT signal of FIG. 12. The operations in FIG. 13 mostly operate independently relative to two threads as if FIG. 13 were drawn twice, but with generally-alternated steps 3305, 3308, 3310, 3320, and post decode part of 3330 for the threads according to control by Thread Select block 2285. Otherwise, during operation the process may reach different steps in FIG. 13 as between different threads i considered at a given instant.

Figure 15:
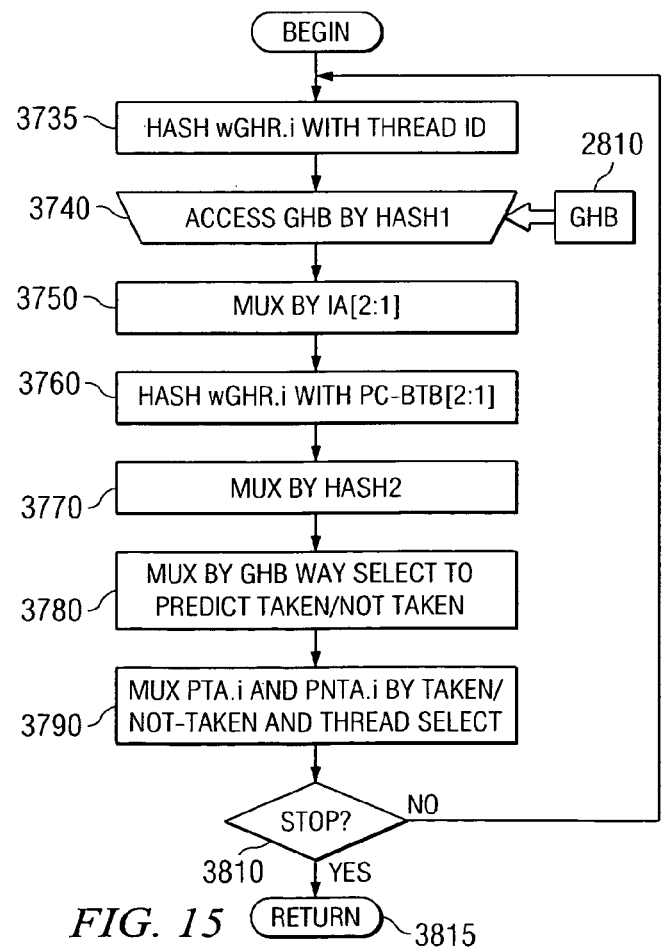
FIG. 15 is a flow diagram of an inventive thread-based process for accessing and reading a branch prediction from the Global History Buffer GHB of FIG. 7B.

Background information on single thread mode in FIGS. 13 and 15 is described in connection with FIGS. 8 and 9 of incorporated patent application TI-38252.

In FIG. 13 step 3450, multithreading introduces the alternative of launching a new thread as described in connection with FIGS. 16, 17, 17A, and 17B. In FIG. 13, a decision step 3450 herein determines whether a mis-predicted branch signified by predicted taken target PTTPCA.i for a thread pipe i is not equal to ATA.i (actual target address) or whether OS and Thread Control State Machine 3990 are launching a new thread in FIG. 8, 16, 17, or 17A. If Yes, then operations go to a step 3470 and feed back a MISPREDICT.0 or MISPREDICT.1 depending on whether the condition occurred in Pipe0 or Pipe1. In case of a new thread, step 3470 feeds back to fetch unit the PC program counter value R15 in register file RFi assigned to the new thread to start the new thread. In case of mispredicted branch in a current thread, step 3470 feeds back the MPPCi value of the appropriate target instruction to which the branch actually goes in the current thread. Step 3480 flushes the pipeline Pipe0 or Pipe1 to which the determination of step 3450 pertains. Step 3490 loads aGHR 2130.0 to wGHR 2140.0 or aGHR 2130.1 to wGHR 2140.1 in FIG. 7A and initializes pointers corresponding to the pipeline Pipe0 or Pipe1 to which the determination of step 3450 pertains. Operations then loop back to step 3310 to fetch the appropriate next instruction.

Figure 14:
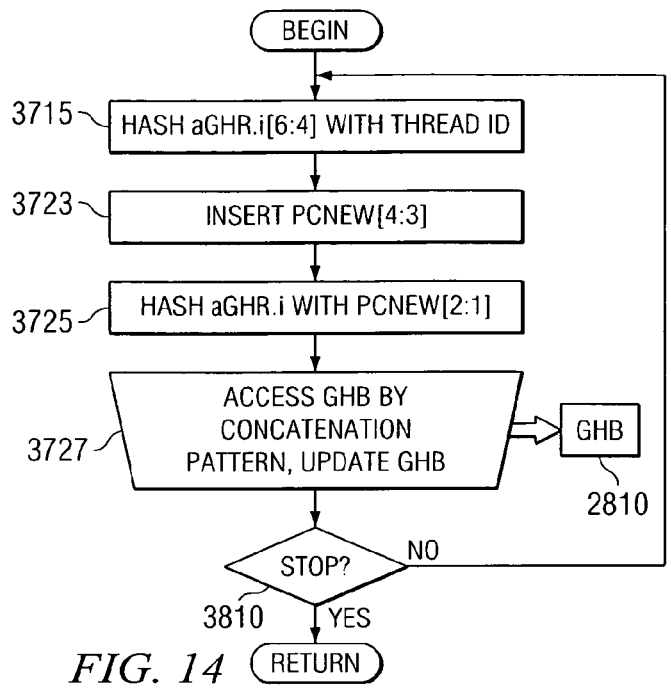
FIG. 14 is a flow diagram of an inventive thread-based process for write-updating the Global History Buffer GHB of FIG. 7B.

In FIG. 14, a thread-based process write-updates the Global History Buffer GHB of FIG. 7B. Operations in FIG. 14 step 3715 hash the actual branch information of aGHR 2130.0 or aGHR 2130.1 with applicable Thread ID according to the cycle by cycle state of the Thread Select control. PCNEW.0 [4:3] or PCNEW.1[4:3] is inserted at step 3723. Operations of a step 3725 hash the aGHR 2130.0 or aGHR 2130.1 according to the cycle by cycle state of the Thread Select control with PCNEW.0[2:1] or PCNEW.1[2:1]. The GHB is accessed at a step 3727 by the resulting concatenation pattern and the GHB 2810 is updated in FIG. 7B. The GHB 2810 real estate does not need to be replicated because the hashing operations with Thread ID distinguish the branch history of each thread from any other thread in the GHB 2810 at write-update time in this FIG. 14 and then at read time in FIG. 15 next.

In FIG. 15, a thread-based process accesses and reads a branch prediction from the Global History Buffer GHB of FIG. 7B. To do this in a multithreaded embodiment herein, operations in FIG. 15 step 3735 hash the speculative branch information of wGHR 2140.0 or wGHR 2140.1 with applicable Thread ID from Mux 3917 (FIG. 8) according to the cycle by cycle state of the Thread Select control. Then GHB 2810 at a step 3740 is accessed by the just-formed hash, designated HASH1. In the multithreaded process subsequent step 3750 muxes the result by IA[2:1], and then step 3760 hashes the Thread Select determined wGHR 2140.0 or 2140.1 with PC-BTB[2:1] to produce a HASH2, and GHB 2810 of FIG. 7B is further muxed by HASH2. Step 3780 further muxes the output by GHB Way Select to predict Taken/Not Taken PTA.0 or PTA.1 as controlled by Thread Select. In the meantime, predicted not-taken PNTA.0 and PNTA.1 are respectively formed and delivered to mux-pair 2150.0 and 2150.1 as shown in FIGS. 6A and 7B. Thread Select determines which mux 2150.0 or 2150.1 is applicable, and OR-gate 2172 determines whether the PTA.i or PNTA.i is output from that mux 2150.*i* selected by Thread Select.

Figure 16:
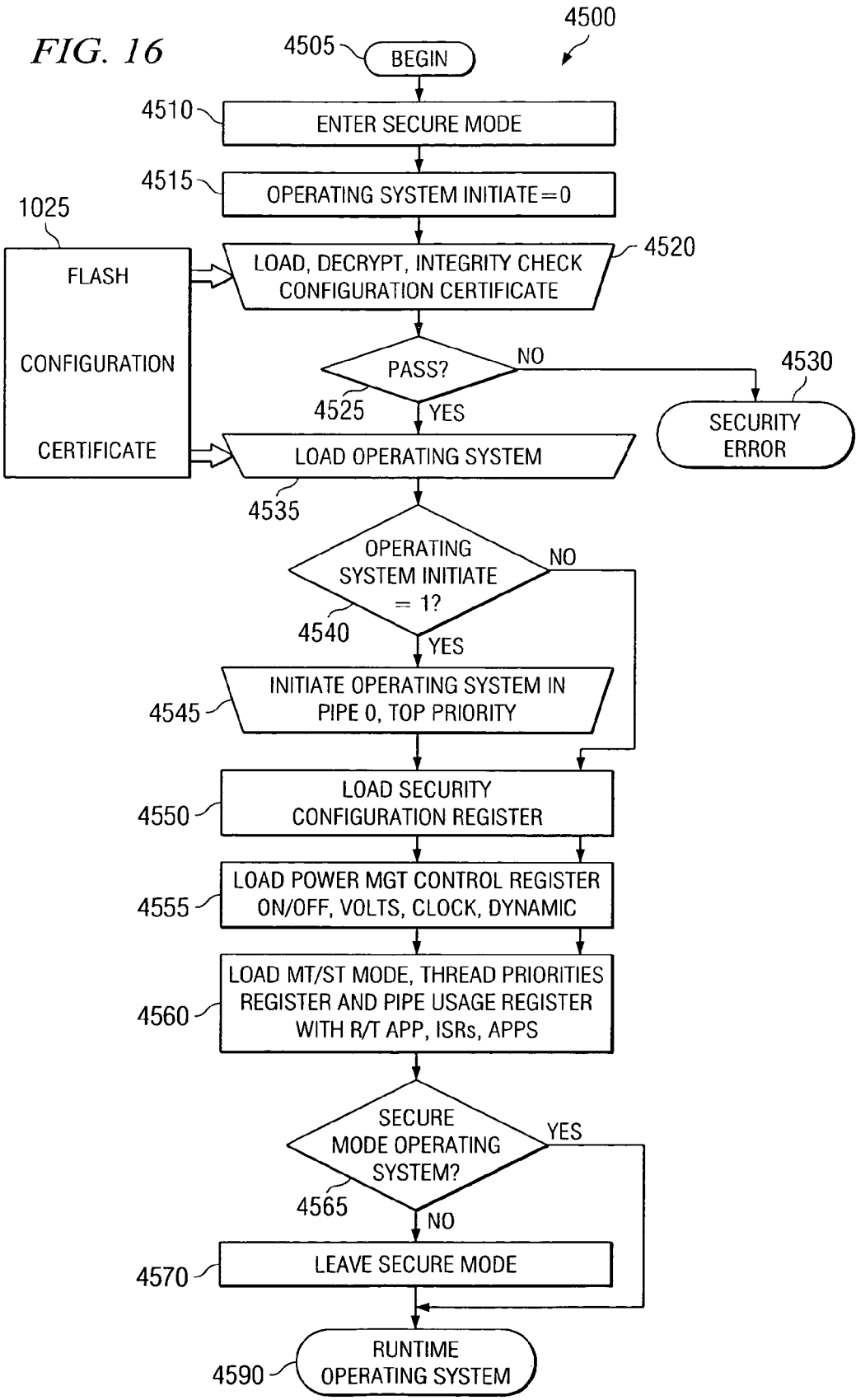
FIG. 16 is a flow diagram of an inventive Boot process for multi-threaded processors and systems of the Figures elsewhere herein.

In FIG. 16, a Boot Routine and improved operating system set thread configurations, priorities, and interrupt priorities. Prior to control of the threads the Operating System OS programs control registers as follows: 1) Thread Activity register 3930 with thread-specific bits indicating which threads (e.g., 0,1,2,3,4, etc.) are active (or not), 2) Pipe Usage register 3940 with thread-specific bits indicating by bit values 0/1 whether each thread has concurrent access to one or two pipelines, and 3) Thread Priority Register 3950 having thread-specific portions indicating on a multi-level ranking scale the degree of priority of each thread (e.g. 000-111 binary) to signify that one thread may need to displace another in its pipeline.

OS starts a high priority thread. When processor is reset, Boot routine initiates OS in Thread 0 as default thread ID.

Boot sets the priority of OS to top priority and Boot and/or OS sets up the priorities for the threads signifying various applications in Thread Priority Register 3950 and establishes scalar or superscalar mode for each thread in Pipe Usage register 3940. The control logic has a state machine 3990 to monitor which thread IDs are enabled in Thread Activity Register 3930 and identify the two threads with the highest priorities in the Thread Priority Register 3950, to run them.

The thread IDs of these two highest priority threads are entered into the Thread Activity register 3930. The OS also sets up the thread-specific PCs to the entry point of each thread which has an active state in the Thread Activity register. MISPREDICT.i is asserted for Thread0 and Thread1 in the respective Fetch and Decode pipes, so that the processor actually initiates Thread0 and Thread1 multi-threaded operation.

In FIG. 16, a Boot routine 4500 operates in a default mode of single thread mode MT=0 (or MT=1 and MTC=00). All the enable bits in register 3950 for all threads are cleared, and Boot thread ID has a bit that hardware reset establishes with a default value of one (1) to make the Boot thread ID currently active in the Activity Register 3930. Hardware reset establishes whatever default values are needed to make the Boot thread ID start running.

The OS is supported by and uses the replicated thread-specific PCs (program counters). Each thread has a specific instruction memory region and boot routine or interrupt routine (wherein the thread-specific PC is included in this routine) to start the thread. The boot code calls the thread-specific boot portion to start the thread. In another boot routine, the boot routine has a single-threaded mode code portion. When multithreading mode is turned on the boot routine calls a subroutine to run the boot for the multithreading.

In FIG. 16, when one of the processors of FIGS. 2-5A is reset or powered on, a Boot Routine 4500 in boot ROM space on-chip commences with BEGIN 4505, enters a hardware-protected Secure Mode in step 4510 and auto-initializes thread-control registers so that the Boot thread executes in Pipe0 at top priority. In a step 4515, a flag OS INIT is initialized by clearing it. Next a step 4520 accesses Flash memory 1025 and downloads, decrypts, integrity verifies and obtains the information in a Configuration Certificate in the Flash memory 1025. A further step 4525, determines whether the decryption and integrity verification are successful. If these security operations have not been successful, operations go to a Security Error routine 4530 to provide appropriate warnings, take any countermeasures and go to reset. If security operations have passed successfully in step 4525, then operations go to a step 4535.

Step 4535 downloads, decrypts and integrity-verifies Operating System OS from Flash memory 1025 as well as a configuration value of the flag OS INIT that replaces the initialization value from step 4515. A step 4540 determines whether the flag OS INIT is now set by the configuration value of that flag from step 4535. If OS INIT is set, then operations proceed to a step 4545 to initiate operations of the Operating System OS in Pipe0, Thread 0 as default thread ID, at top priority, with Thread Activity Register entry set for the OS thread, and proceed to OS-controlled initialization steps 4550, 4555 and 4560.

If the flag OS INIT is clear at step 4540, then Boot operations proceed directly to Boot-controlled initialization steps similar to steps 4550, 4555, and 4560 and shown for conciseness as distinct arrows to the FIG. 16 flow steps 4550, 4555, 4560. The use of the flag OS INIT provides flexibility for manufacturers in locating software or firmware representing steps 4550, 4555 and 4560 and Boot or OS operations for controlling those steps in Flash, in boot ROM on-chip or in a combination of locations.

In FIG. 16, the step 4550 loads the Security Configuration register 3970 of FIG. 8, shown as register 3970 of FIG. 8B. The Security Configuration register 3970 has security level values. An alternative embodiment suitably uses thread-specific pairwise access security bits if the security relations between threads are more complex than level values might describe. These security levels or bits are programmed or loaded in step 4550 by Boot routine or OS running in Secure Mode. Configurable thread-specific isolation from (or access to) the Register File and other resources of a given thread is provided by the Security Configuration register 3970.

In FIG. 16, the step 4555 loads the Power Management Control Register 3960 of FIGS. 8 and 8D-1, 8D-2. The Boot routine and/or OS is improved to configure any one, some or all of the FIG. 8 registers with initial values based on the application types and application suite of a particular apparatus. Also, the Boot routine or Operating System configures thread-specific Clock Rate Control, thread-specific Voltage Control, and thread-specific power On/Off control. An entire fetch, decode and execute pipeline pertaining to a given thread can be clock-throttled, run at reduced voltage, or powered-down entirely. The Boot routine or OS loads Thread ID-based configuration values for controlling Pipe On/Off, Pipe Voltage, and Pipe Clock Rate such as from the Configuration Certificate pre-loaded in Flash.

In this way, some embodiments use OS to provide and load the power-control values described hereinabove from the Configuration Certificate. Some embodiments also use OS to provide dynamic control over these values. In cases of asynchronous threads, the pipes are suitably run at clock frequencies appropriate to each of the threads, further conserving power. Using a skid buffer (e.g., pending queue, replay queue, and instruction queue) with a watermark on (fill level signal from) each buffer which depends on the rate at which instructions are drawn out of each buffer, the control circuitry is made responsive, as in FIGS. 8D-1, 8D-2, to the fill level signal on each buffer and/or to configuration information pre-stored for each application to run at any selected one of different clock frequencies.

In FIG. 16 step 4560, the Boot routine or Operating System OS pre-establishes the priority of each real-time application program in the event the real-time application program is activated. Similarly, the Boot routine pre-establishes the priority of each interrupt service routine (ISR). The Boot routine establishes the priority by entering a priority level for the thread ID of the real-time application program or interrupt service routine (ISR) in the Thread Priority Register 3950. The Boot routine sets the priority of OS to top priority and Boot and/or OS sets up the priorities for the threads signifying various applications in Thread Priority Register 3950 and establishes scalar or superscalar mode for each thread in Pipe Usage register 3940 of FIG. 8.

Prior to FIG. 17 run-time control of the threads the Boot routine or Operating System OS in FIG. 16 programs control registers: 1) Thread Activity register 3950 with thread-specific EN bits indicating which threads (e.g., 0,1,2,3,4) are initially requested (EN enabled, or not), 2) Pipe Usage register 3940 with thread-specific bits indicating by 0/1 whether each thread has concurrent access to one or two pipelines, and 3) Thread Priority Register 3950 having thread-specific portions indicating on a multi-level ranking scale the degree of priority of each thread (e.g. 000-111 binary) to signify that one thread needs to displace another in its pipeline.

The OS using ST/MT mode sets up various ones or all of the control registers and PCs for both threads identically or analogously except for setting up one single thread activity in ST (Single Thread) mode or multiple threads in MT mode.

The improved OS in step 4560 sets thread configurations, priorities, and interrupt priorities. Fast Internal Requests (FIQ) and high priority external interrupts are assigned high priority but at a priority level below priority assigned to Operating System OS. Other interrupt requests (IRQ) are assigned a regular, lower, priority than high priority interrupt level. These priorities are configured in the Thread Priority Register 3950 by Boot routine and/or OS. Real-time application programs, such as for phone call and streaming voice, audio and video applications, are suitably given a higher priority than non-real time application programs and a priority higher or lower relative to the interrupts. The priority of the real time program relative to each interrupt depends on the nature of the interrupts. If the interrupt is provided for the purpose of interrupting the real-time application, the priority is pre-established higher for that interrupt than the priority pre-established and assigned to the real-time program.

Further in FIG. 16, operations proceed after step 4560 to a step 4565 to determine whether the OS is configured to continue operating in secure mode at run-time. If not, operations proceed to a step 4570 to leave Secure Mode and then go the Run-Time OS at step 4590 and FIG. 17. If Yes at step 4565, then the OS remains in Secure Mode and operations branch to the OS operations called Run-Time OS at step 4590 and FIG. 17.

FIG. 17 operations are suitably performed by Run-Time OS, by Thread Control State Machine 3990 or by a combination of Run-Time OS and State Machine 3990 in various embodiments. In FIG. 17, operations commence at a BEGIN 4605 and proceed to a decision step 4610 which responds to the MT/ST field of Threading Configuration Register 3980. If ST (single threaded) mode, operations go from decision 4610 to single thread operation 4615 of the pipelines and the processor operates, for instance, as described in incorporated applications TI-38176 and TI-38252. If MT multithreaded mode, operations go from decision 4610 to a decision 4620 that identifies all Thread IDs 1, 2, 3, . . . N that are enabled in register 3950 of FIG. 8.

Among the enabled Thread IDs, operations then go to a step 4625 that selects the two highest-priority enabled Thread IDs, for instance. Then two parallel steps 4630.0 and 4630.1 respectively launch the first thread with a selected Thread ID into Pipe0 and the second thread with a selected Thread ID into Pipe1. Operations proceed from each of parallel steps 4630.0, 4630.1 to a step 4640. Step 4640 does mux selections for the instruction queues IQi, scoreboards SCBi, register files RFi, and program counters (PCi). In MT Control Mode MTC=01, these mux selections remain fixed or established while a given two particular threads are running and then are changed when one or more of the selected threads are changed on a subsequent pass through the loop of operations in FIG. 17.

Then a decision step 4650 determines whether a thread should be switched in case of OS launching a new application, thread completion or stall, interrupt or other appropriate cause of thread switching. If No in decision 4650 because no event causes switching, operations loop back to the same step 4650. If Yes, thread switching should occur, and operations proceed to a decision step 4660 which checks for a Reset. If Reset, operations reach RETURN 4690.

If no reset, operations loop back to step 4620 of FIG. 17 operations. At the end of each task thread, a software interrupt SWI instruction or software breakpoint is provided when the last instruction in the task retires, and then generates a signal to the Thread Control State Machine 3990 and/or executes a routine that does a context switch by clearing the activity bit to zero (0) for the Thread ID of the completed thread in Thread Activity Register 3930, and enables a selected new Thread ID and sets up a new PC and new task as in FIG. 17.

Similarly, but with a variation in case of an L2 Cache miss, a breakpoint or cache miss hardware generates a signal to the Thread Control State Machine 3990 that operates the threads according to the MT Control Mode MTC entry in the Threading Configuration Register 3980 and keeps track of which thread ID encountered the L2 cache miss and stalled such as by a STALL portion of Thread Activity Register 3930 in FIG. 8. The activity bit is cleared to zero (0) for the Thread ID of the stalled thread in Thread Activity Register 3930. The Thread Enable bit is set to one (1) for the stalled thread in register 3950 because the stalled thread is still requested.

According to a first MT Control Mode (MTC=01) in Threading Configuration Register 3980 for handling L2 Cache miss stalls, an L2 Cache miss recovery period elapses and the stalled thread resumes. In a second mode (MTC=10) for handling L2 Cache miss stalls, a currently active Thread ID is identified by presence of a one (1) the Thread Activity Register 3930. That currently active Thread ID is transitioned from single-issue to dual-issue by entering that Thread ID into both pipes of Pipe Thread Register 3915, and dual-issue responsive to the double-entries in register 3915 commences. When the L2 Cache miss recovery is achieved, then the steps here are reversed to resume the stalled thread.

In a third mode (MTC=11) that permits issue of a new thread in case of L2 Cache miss, the Thread Control State Machine 3990 enters a selected enabled new Thread ID in Thread Activity Register 3930 and sets up a new PC and new task as in FIG. 17. If a currently-active single-issue thread has higher priority, that thread is dual-issued as in the second mode (MTC=10) instead. Otherwise, the new Thread ID is entered as described and further entered in Thread Register File Register 3910 and Pipe Thread Register 3915. If a pipe is still available for yet another thread, the new Thread ID is itself dual-issued or a second new Thread ID is issued according to the same approach. When the L2 Cache miss recovery is achieved, then the steps are undone to the extent appropriate to resume the stalled thread.

In FIG. 17A further details of FIG. 17 operations for various multi-threaded processor embodiments are provided. The operations set up (and modify as appropriate) the PC (program control) and other control registers appropriately and respectively for each thread and then set up the thread activities at run-time. This puts the processor into multi-threaded mode.

Operations commence with a BEGIN 4705. BEGIN 4705 is a destination from Boot step 4590, or from an External interrupt 4702, from step 4890 of thread completion/stall of FIG. 17B, or from a L2 Miss Serviced condition 4704 meaning recovery from L2 miss. Then a step 4710 scans FIG. 8 register 3950 for the thread enables EN and Thread Priorities. Also, a step 4715 determines the number of ready pipes as the number of zeroes in the Pipe Thread Register 3915.

In FIG. 17A operations proceed to a case step 4720 that branches depending on the number of ready pipes 0, 1, or 2 determined from the Pipe Thread Register 3915. Note that the OS software already knows how many ready pipes there are because of its operations issuing threads and some embodiments use hardware to determine the number of ready pipes. In FIG. 8, the Thread Register Control Logic 3920 has a state machine 3990 to look which thread IDs are enabled and identify one or two threads with the highest priorities to run them.

If there is one (1) ready pipe at step 4720, then a step 4725 uses the state machine 3990 and identifies one highest priority enabled thread. If there are two ready pipes at step 4720, then operations branch to the step 4725 to use the state machine and identify the two highest priority enabled threads. In other words, depending on the results in step 4720, operations proceed to a step 4725 to use the state machine 3990 to identify the one or two threads with the highest priorities.

At this point, consider an example of guaranteeing at least one pipe to a real time thread. Such performance guarantee is provided, for instance, by an embodiment wherein one execute pipe is dedicated to the real-time thread, and switching to any other thread is prevented even in case of L2 cache miss. Preventing the switch to any other thread is provided in FIG. 8 register 3980 MT Control Mode by using a mode MTC=01 to prevent dual issue by currently-active single-issue thread into a pipe occupied by the real time thread and also to prevent even single-issue of a new thread into the pipe occupied by the real time thread. Another switch-preventing approach establishes a Pipe Usage Register 3940 entry for the real time thread, and that entry demands both pipelines for the real time thread, or otherwise prevents the switch. FIG. 17A steps 4730, 4735 and 4740 are suitably established to take account of the register 3980 MT Control Mode entry MTC and Pipe Usage Register 3940 entry. Also, operations at step 4770 based on priority register 3950 utilize the priority levels assigned to the threads to provide high performance.

In the case of two ready pipes in step 4725, operations go to a decision step 4730 to determine whether Pipe Usage Register 3940 demands or requires two-pipe pipe usage. If Yes in step 4730, then operations proceed to a step 4732. Otherwise at step 4730 (No), operations go directly to step 4735 and enter the two selected applications into the Thread Activity Register 3930 unless the MT Control Mode entry in register 3980 does not permit one or both changes to Thread Activity Register 3930.

Step 4732 determines whether there is no enabled Thread ID in register 3950, meaning that no thread is requested and any thread that is desired to run is set currently active in register 3930. If this is the case (NONE), then operations go directly to a step 4740, and otherwise operations go from step 4732 to step 4735 to enter a single highest priority selected application into the Thread Activity Register 3930.

Step 4735 has now entered the thread ID(s) of these one or two highest priority threads into the Thread Activity register 3930. Subject to the MTC entry in MT Control Mode, a step 4740 enters the one or two selected application Thread IDs in place of zeroes in the Pipe Thread Register 3915 and Thread Register File Register 3910. If one Thread ID is selected and two pipes are ready, and Pipe Usage Register 3940 requires both pipes for that thread, then the Thread ID is entered twice in both pipe entries of Pipe Thread Register 3915.

In one embodiment, Pipe Thread Register 3915 is updated by the hardware of state machine 3990 and Thread Register File Register 3910 is updated by the OS software. Consider when a new thread is set up, such as on interrupt routine context switch from an old thread to the new thread. The register file contents for the old thread are saved into memory. Memory-stored register file contents, if any, for the new thread are loaded by software into the particular register file RFi assigned to the new thread. Thread Register File Register 3910 tells which Thread ID is assigned to which particular register file RFi. In some embodiments, software saves and loads register file information to each particular register file RFi so software suitably also is in charge of entering Thread ID to the Thread Register File Register 3910 beforehand. Hardware handles priority determinations and loads a Thread ID assignment for a pipeline into the Pipe Thread Register 3915. The coupling circuitry of FIG. 8A carries the register file and pipeline assignments into effect.

If step 4740 was reached directly from step 4732 (None), then a currently-active Thread ID in register 3930 is entered into the Pipe Thread Register 3915 and register 3910 needs no updating. Power management is applied to power up a pipeline which has earlier been powered down by power management and that now has had a Pipe Thread Register 3915 zero entry changed to an actual Thread ID.

In a succeeding step 4745, the OS also sets up the thread-specific PCs to the entry point of each thread the thread ID of which has an active state in the Thread Activity register 3930. In a step 4750, the MISPREDICT.i line(s) of FIGS. 6A, 6B, 7A and 12 is asserted for Thread0 and Thread1 in the respective Fetch and Decode pipes, so that the processor actually initiates or launches Thread0 and Thread1 multi-threaded operation, whereupon a RETURN 4755 is reached.

In connection with step 4740, a step 4760 determines if one application is running, no other application is enabled, and the Pipe Usage Register 3940 permits two pipes (Pipe Usage bit=1 for the thread ID). If so, operations go to a step 4765 to activate and enable the issue unit for dual issue as in FIGS. 10 and 10A/10B, whereupon the RETURN is 4755 is reached. If the determination at step 4760 is No and None-enabled was the case at step 4732 so that step 4735 was bypassed, then operations go to RETURN 4755 and do not fill an empty pipe. Power management is suitably applied to power down the empty pipe.

If the determination at step 4760 is No and steps 4735/4740 were operative for one thread, or steps 4735 and 4740 were operative for two threads, then operations proceed from step 4740 to step 4745 and further as described in the previous paragraph hereinabove.

Each thread launched runs in an execute pipeline(s), subject to displacement by a higher priority thread. If a thread completes execution, then operations of FIG. 8D handle the completion, and Run-Time OS 4700 launches one or more new threads as described in connection with steps 4710 through 4765 hereinabove.

In FIG. 17A, the Run-Time OS 4700 uses Thread Priority values to also make decisions about displacing one thread with another as described next. As noted hereinabove, the Boot routine in FIG. 16 has entered a priority level for the thread ID of the real-time application program or interrupt service routine (ISR) in the Thread Priority Register 3950. If a low priority thread is running, and a high priority thread is activated by user or by software by setting the EN enable bit for instance, then the Run-Time OS 4700 stops the low priority thread, and saves the current value of the thread-specific PC pertaining to the low priority thread from the Writeback stage of the pipeline in which the low priority thread was just executing. OS or state machine 3990 sets the bit active in the thread ID entry in Activity Register 3930 pertaining to the high priority enabled thread in Thread Priority Register 3950. The OS loads the just-used thread-specific PC for the terminated low priority thread with the entry point address for the high priority thread, and then asserts MISPREDICT to Fetch and Decode pipelines to start the high priority thread.

In FIG. 17B, operations of Thread ID=z have completed or stalled at a step 4805. For example, a software interrupt inserted in the application signals completion whereupon an interrupt 4810 jumps to a Thread Completion Control BEGIN 4815. In the case of stall, an L2 Cache Miss line goes active and hardware-activates step 4815 in hardware state machine 3990 or activates a hardware interrupt to the OS. Either approach is illustrated by BEGIN 4815.

Then a step 4820 updates Power Management of FIGS. 8D-1, 8D-2 for the completed or stalled thread based on the MT Control Mode entry MTC in register 3980. The Thread Activity Register 3930 bit for Thread z is cleared to zero since Thread z is no longer currently active. In the process, power management steps 4350, 4360 clear the one or more Thread ID=z entries to zero in the Pipe Thread Register 3915 of FIG. 8 and clear to zero the Thread ID=z entry in the Thread Register File Register 3910. In some circuitry, clearing the Thread Activity Register 3930 bit for Thread z automatically disables Thread z and results in the pipe(s) for Thread z of register 3915 and register file for Thread z of register 3910 becoming unused. Then when a new thread is activated the entries in register 3915, 3910 are updated at that time.

In FIG. 17B, at step 4820, this power management process runs an unused pipe at half-clock or even completely switches off each pipeline that is not currently in use as indicated by zero entry in Pipe Thread Register 3915, until some other thread is applied. Thus when a zero entry in Pipe Thread Register 3915 is subsequently changed to a Thread ID entry, as in FIG. 17A step 4740, then the power management circuitry powers on the pipeline to which the Thread ID is assigned in Pipe Thread Register 3915. Some other embodiments limit the switch-off process of step 4820 to instances where the Pipe Usage Register 3940 entry and MT Control Mode in Register 3980 will definitely call for a pipe to be unused at this point. Determination whether a pipe is to be powered down is also suitably made in connection step 4732 of FIG. 17A in a case where none of the Thread IDs are enabled and the Pipe Usage is set for one-issue (0) and not dual-issue (1).

In FIG. 17B, a decision step 4830 determines whether Thread z has stalled. If stalled, then operations proceed to a step 4835 to set a Thread Enable bit in the Thread Enable Register 3950 for Thread z, and set a Stall bit in register 3930, whereupon operations at a step 4890 jump to step 4705 of FIG. 17. If no stall in step 4830, then operations bypass step 4835 and go directly to step 4890 and jump to step 4705 of FIG. 17A.

Returning to FIG. 17A, priority evaluation and thread displacement are illustrated in the case of zero (0) ready pipes at step 4720, whereupon operations branch to a step 4770. In the case of an external interrupt, such as pushing the call button on a cell phone or occurrence of an incoming e-mail, conceptually operations act as if they move directly through steps 4725-4750 as if there are two empty pipes because of the high priority of the external interrupt. The description here also provides some more detail about handling various situations where both pipes are currently active, i.e. the branch called No Empty Pipes at step 4720 herein, and wherein priority-significant information is involved. For a further example, in case of MT Control Mode MTC=10 or 11 in register 3980 and recovery from L2 cache miss, a stalled thread resumes operation although another lower priority thread is issuing into the pipe wherein the L2 cache miss occurred to keep the pipe loaded in the meantime.

In step 4770, a comparison operation compares the priority of one (or two) enabled (EN=1) thread IDs of non-running threads in Thread Priority Register 3950 with the priority of a thread ID of each of one (or two) running threads in the Thread Activity Register 3930. If the running threads have greater or equal priority compared with the enabled non-running thread(s), then operations branch to RETURN 4755 and the running status of the running threads is not displaced by the FIG. 17A operations. In case of a L2 cache miss recovery, the stall bit in register 3930 identifies the Thread ID of the stalled thread that should resume.

In step 4770, if the running threads have lower priority compared with the enabled non-running thread(s), then operations proceed to a step 4775 and the running status of the running threads is displaced by the Run-Time OS. The one or two lowest priority running threads are selected in step 4775 for displacement. Then a step 4780 saves the PC(s) (Program Counter) and thread status and thread register file RF 1770 information for each running thread that was selected for displacement in step 4775. Step 4780 is suitably omitted when one or more extra thread status registers and thread register file registers are available to accommodate the higher priority thread(s) via mux 1777 and the displaced thread information is simply left stored in place for access later when a displaced thread is re-activated.

Next, in FIG. 17A a step 4785 clears the Pipe Thread Register 3915 and Thread Register File Register 3910 entry for each running thread that is being displaced. An Enable EN in Priority Register 3950 is correspondingly set for each displaced thread to enable re-activation of such displaced thread at a later time.

At this point one or more threads are displaced, making way for one or more higher priority threads but each such higher priority thread is not yet activated. OS starts such a higher priority thread by looping back from step 4785 to step 4720. Now the number of ready pipes is greater than zero, and steps 4720, 4730, 4725, 4735, 4740, and the further steps 4745-4765 as applicable, are executed to actually launch each such higher priority thread.

As described in connection with FIG. 8D and FIG. 17, run-time control of the threads programs the control registers as follows: 1) Thread Activity register 3930 with thread Activity bits indicating which thread ID(s) are running threads, 2) Pipe Thread Register 3915 assigning each thread ID to one or pipes, 3) Thread Register File Register 3910 assigning each thread ID to a register file RFi, and 4) thread-specific EN bits in Priority Register 3950 indicating which threads (e.g., 0,1,2,3,4) are currently requested (EN enabled, or not) but are not activated (running) in Thread Activity Register 3930.

The just-described run-time updated information in registers 3910, 3915, 3930, and Enable EN in 3950 is used to access pre-established (or, in some embodiments, dynamically modify) information in other thread control registers 3940, 3950, 3960, 3970 of FIG. 8 using the pertinent thread IDs. The Run-Time OS thus operates using (and modifying as appropriate) pre-established information from the Boot routine or the OS initialization routine at steps 4550, 4555, 4560.

The information in Pipe Usage register 3940 has thread-specific bits to indicate by 0/1 whether each running thread of register 3915 has concurrent access to one or two pipelines. Thread Priority Register 3950 has thread-specific priority values indicating on a multi-level ranking scale the degree of priority of each thread (e.g. 000-111 binary). The priority values in register 3950 are used to determine and signify in FIG. 17A when one enabled thread (EN=1) in register 3950 needs to displace a running thread identified in Pipe Thread register 3915 in its pipeline. Thread Power Management Register 3960 has values to configure power control of on/off, clock rate and voltage according to FIGS. 8D-1, 8D-2 based on the thread ID of each running thread in register 3930. Thread Security Register 3970 has bits or level values to signify or determine whether a running thread in register 3930 has permission to access a resource of another thread as shown in FIGS. 8B and/or 8C.

In FIG. 17A, suppose a first thread occupies both pipelines and it is desirable to permit another equal priority thread or higher priority thread some access to the multithreading processor resources before the first thread completes. To accomplish such access, one or more breakpoints are also suitably provided in the first thread and/or for real-time access by the second thread, or an interrupt is used. Then during the execution of that thread, the operations of FIG. 17A are entered. The equal or higher priority second thread displaces the running thread from at least one of the two pipelines and the second thread is set up by the operations of FIG. 17A and issued into one or both pipelines. This type of displacement is permitted in MT Control Mode MTC=10 and MTC=11 in register 3980. In MT Control Mode MTC=01 the first thread is in scalar mode and executes on a single execute pipeline, and the premise of occupying both pipelines is absent. In MTC=01, if the other pipeline is available, FIG. 17A operations issue the second thread into the available pipeline. In single threaded ST mode (MT=0 or MTC=00), the first thread occupies both pipelines and runs to completion before another thread is launched.

In connection with FIG. 17A operations, some embodiments have a secure scratch memory such as in RAM 1120 or 1440 of FIG. 2 that is efficiently used by Load Multiple and Store Multiple operations to establish, maintain, and save and/or reconstitute the processor context for the thread suitably depending on the embodiment, wherein the image includes the RFi registers, the aGHR and wGHR, and status and control registers information for that thread ID. For instance, in FIG. 3 the Register file 1770 has a register file RF0 and RF1 for two threads. In case of L2 cache miss or displacement of thread 1 in register file RF1, then software Store Multiple puts the entire contents of register file RF1 and rest of the context information for Thread 1 back in memory for Thread 1 at step 4820 of FIG. 17B or step 4780 of FIG. 17A. Some other thread, say Thread 5, is launched in place of Thread 1, by software at step 4745 doing a Load Multiple on a register file image and rest of the context information for Thread 5 from a memory space for Thread 5 into register file RF1 in register files 1770 and into the aGHR, wGHR and status and control registers respectively. Some switching hardware is thereby obviated. When the L2 cache miss for Thread 1 is serviced, software Store Multiple at step 4780 puts the entire contents of register file RF1 and rest of the context information for Thread 5 back in a memory space for the Thread 5 register file image. Then software Load Multiple at step 4745 restores the register file image for Thread 1 into register file RF1 as well as the rest of context information for Thread 1 from the location in memory where the Store Multiple for Thread 1 had occurred, and Thread 1 resumes. In other embodiments, the Register file not only has a register file RF0 and RF1 for two threads but also has one or more additional scratch portions such as RF2 as shown in FIG. 4 that are fast-accessed by muxing to establish, maintain, and save and/or reconstitute the processor context for the thread suitably depending on the embodiment, wherein the context includes the RFi registers, the aGHR and wGHR, and status and control registers information for that thread. Conveniently, the circuitry and operations bypass the cache hierarchy and rapidly transfer thread specific data between the scratch RAM and the RFi registers, the aGHR and wGHR, and status and control registers information for a given thread.

A new thread is started in the hardware by MISPREDICT.i or interrupt setting up a new PC called PCNEW.i. An L2 cache miss generates a signal on a line in the hardware that tells the state machine 3990 in FIG. 8 and FIG. 17A and picks up next priority thread from register 3950 and sets up registers 3915 and 3910. In response to the Thread ID entries in the registers 3915 and 3910, the mux hardware of FIG. 8A sets up and establishes a new PC having the next address from which the Fetch Unit of FIGS. 6A, 6B operates. That change produces a signal that is treated as a MISPREDICT.i to tell the Fetch Unit to start fetching from the new PC.i. The L2 cache miss signal or other signal indicative of a thread switch is suitably delayed a few clock cycles and then routed as a MISPREDICT.i to the fetch unit. As described in connection with FIGS. 17A and 17B, the L2 cache miss signal suitably causes an interrupt and the OS and/or state machine 3990 changes the PC.i in step 4745 as shown in FIGS. 17A and 17B.

When a misprediction occurs, the scoreboard and execute pipeline are cleared for the thread in which the misprediction has occurred. In that case the appropriate instructions are fetched and the scoreboard is appropriately constituted. The third thread enters (in MTC=11 mode) and creates its own scoreboard entries. On the resumption of the first thread after L2 cache miss service, the scoreboard arrays 3851, 4441 or 3852, 4442 are cleared as to the scoreboard array that was used by the thread which occupied the pipeline in which the first thread stalled. PC.i tells fetch unit to start fetching from the point where the L2 cache miss occurred in the first thread, and the first thread operations are reconstituted and resumed.

Instruction Set (ISA). Some embodiments conveniently avoid use of any new instructions to add to the ISA to support multi-threading. Other embodiments add new instructions to provide additional features.

Where software is used to load and store the Register Files 1770, some embodiments provide a new instruction extensions for single threaded mode and for multithreading to enhance a Load Multiple instruction and to a Store Multiple instruction as described next. The Register Files 1770 and Status/Control Registers of FIGS. 3, 4, 5, 5A suitably are kept out of processor address space, and the new instruction extensions thereby facilitate register file management and security.

Each such instruction is extended with one or more bits that identify which particular register file RFi is the subject of the Load Multiple or Store Multiple. When a context switch is performed or in the boot code, the OS sets up the register file. In the single threaded ST mode (MT=0), one register file is set up. The Store Multiple instruction is extended to identify which register file RFi to store to memory (e.g., direct to a secure scratch RAM). The Load Multiple involves a load from memory and is extended to identify which register file RFi is the destination of the load from memory. In multi-threaded mode (MT=1) Software puts each entry into the Thread Register File Register 3910 and identifies the latest particular register file RFi for data transfer operations. The extended Store Multiple and extended Load Multiple instructions as above operate on the particular register file RFi thus identified by Thread Register File Register 3910.

Some other embodiments put the Register Files 1770 in the address space and do unextended Load Multiple and Store Multiple operations between memory and the Register File RFi identified by an address in address space. Suitable security precautions are taken to prevent corruption of the register files by other inadvertent or unauthorized operations in address space. For example, a secure state machine in Security block 1450 of FIG. 2 of an application processor 1400 is configured to monitor and prevent inadvertent or unauthorized accesses and overwriting of the Register Files 1770.

Processes of Manufacture

In FIG. 18, an example of manufacturing processors and systems as described herein involves a manufacturing process 4900. Process 4900 commences with a BEGIN 4905 and proceeds to a design code preparation step 4910 that prepares RTL (register transfer language) code for a multi-threaded superscalar processor as described herein and having thread-specific security, thread-specific power management, thread-specific pipe usage modes, thread priorities, scoreboards for issue scoreboarding and data forwarding of multiple threads, and branch prediction circuitry for multiple threads including speculative GHRs and actual GHRs.

Further in FIG. 18, a step 4915 prepares a Boot routine or Boot upgrade, an operating system or operating system upgrade, a suite of applications, and a Configuration Certificate including information for configuring any one, some or all of the Boot routine, Operating System (OS) for initialization and Run-Time, and the suite of applications. Step 4915 also prepares a hardware system design such as one including a printed wiring board and integrated circuits such as in FIGS. 1 and 2 and including a multi-threaded superscalar processor of step 4910 according to the teachings herein.

A step 4920 verifies, emulates and simulates the logic and design of the processor and system. The logic and operation of the Boot routine, operating system OS, applications, and system are verified and pre-tested so that the code and system can be expected to operate satisfactorily.

For example, a step 4925 verifies that the security logic captures and/or prevents forbidden accesses between threads. A step 4930 tests and verifies that the Power Management circuitry selectively delivers thread-specific block on/off power controls and thread-specific clock rates and thread-specific voltages to various parts of the hardware for which such controls, clock rates and voltages are configured on a static and/or dynamic power control basis. A step 4935 tests and verifies that the muxed/demuxed scoreboards, pipelines, register files, and GHRs respond on a multi-threaded basis according to pipe usage modes, thread priorities and thread displacement operations, transition to new thread(s) on completion of each thread, and perform as described herein on each of the instantiated MT/ST threading modes. Steps 4925, 4930, 4935 and other analogous test and verification steps are suitably performed in parallel to save time or in a mixture of series and parallel as any logic of the testing procedures make appropriate.

The skilled worker tests and verifies any particular embodiment such as by verification in simulation before manufacture to make sure that all blocks are operative and that the signals to process instructions for threads in the pipeline(s) are timed to coordinate with each particular multi-threaded mode and to operate in the presence of other threads.

If the tests pass at a step 4940, then operations proceed to a step 4945 to higher-level system tests in simulation such as phone calls, e-mails, web browsing and streaming audio and video. If the tests pass at step 4945 operations proceed to manufacture the resulting processor at a step 4950 as verified earlier and do early-unit tests such as testing via scan chains in the processor to verify actual processor superscalar multi-threading hardware operation, contents and timing of fetch and branch prediction, decode pipelines, issue stage including scoreboards, execute pipelines, register files in various modes.

First-silicon is suitably checked by wafer testing techniques and by scan chain methodology to verify the contents and timing of multithreading block 3900, Pre-Decode, Post-Decode, aGHR.i and wGHR.i, GHB, BTB output, FIFOs 1860.*i*, IQ1, IQ2, IssueQ1, IssueQ2, scoreboards SB1, SB2 and pipeline signals, registers, states and control signals in key flops in the circuitry as described herein. If any of the tests 4940, 4945, or 4955 fail then operations loop back to rectify the most likely source of the problem such as steps 4910, 4915 or manufacturing 4950.

Operations at step 4960 load the system into Flash memory 1025, and manufacture prototype units of the system such as implemented as integrated circuits on the integrated circuit board PWB. Tests when running software with known characteristics are also suitably performed. These software tests are used to verify that computed results and performances are correct, instruction and power efficiency are as predicted, that branch prediction accuracy exceeds an expected level, and other superscalar multi-threading performance criteria are met. Then a step 4965 performs system optimization, adjusts configurations in the Configuration Certificate such as for operating modes, thread-specific security, thread-specific power management, and thread-specific priorities and pipe usages. One or more iterations back to step 4960 optimize the Configuration Certificate contents and the system, whereupon operations go to volume manufacture and END 4990.

Aspects (See Explanatory Notes at End of this Section)

1A. The multi-threaded microprocessor claimed in claim 1 wherein said coupling circuitry is further operable to couple the second thread to both said second and first execute pipelines instead of the first thread.

1B. The multi-threaded microprocessor claimed in claim 1 further comprising a power control circuit having thread-specific configurations to provide a power-related control in said first mode to said first decode and first execute pipelines for the first thread and independently provide a power-related control in said first mode to said second decode and second execute pipelines for the second thread.

1C. The multi-threaded microprocessor claimed in claim 1B wherein said power control circuit has at least a second thread-specific configuration for said second thread to provide a power-related pipeline control in said second mode for the second thread.

1D. The multi-threaded microprocessor claimed in claim 1 wherein said coupling circuitry includes issue circuitry and said issue circuitry is operable as first and second issue circuits coupled respectively to said first and second decode pipelines and operable in a first mode substantially independently for different threads and operable in a second mode with at least one issue circuit dependent on the other for issuing instructions from a single thread to both said first and second execute pipelines.

2A. The multi-threaded microprocessor claimed in claim 2 further comprising first and second instruction queues respectively coupled to the coupling inputs of said first and second instruction input coupling circuits.

2B. The multi-threaded microprocessor claimed in claim 2 further comprising a control logic circuit operable to supply a first selector signal to said first instruction input coupling circuit and to said output logic, said first selector signal representing dual issue by said first scoreboard.

2C. The multi-threaded microprocessor claimed in claim 2B wherein said control logic circuit is operable to supply a second selector signal to said second instruction input coupling circuit and to said output logic, said second selector signal representing dual issue by said second scoreboard.

2D. The multi-threaded microprocessor claimed in claim 2 further comprising first and second execute pipelines respectively coupled to said instruction issue outputs of said output logic.

2E. The multi-threaded microprocessor claimed in claim 2 further comprising first and second decode pipelines respectively coupled to a corresponding coupling input of said first and second instruction input coupling circuits.

2F. The multi-threaded microprocessor claimed in claim 2 further comprising scoreboard routing circuitry and wherein said scoreboards share said scoreboard routing circuitry together.

4A. The multi-threaded microprocessor claimed in claim 4 further comprising control logic specifying whether a thread has access to more than one execute pipeline, and coupling circuitry responsive to said control logic in a first mode to direct first and second threads via said first and second decode pipelines to said first and second execute pipelines respectively, and said coupling circuitry responsive in a second mode to direct the first thread to both said first and second execute pipelines.

5A. The processor claimed in claim 5 wherein said register files each have plural ports, said coupling circuitry operable to couple at least two said execute pipelines to respective ports of a same one register file when said storage has a same thread identification assigned to the at least two said execute pipelines.

6A. The multi-threaded microprocessor claimed in claim 6 wherein said hardware state machine is operable to respond to a thread security configuration representing respective security levels of the first and second threads.

6B. The multi-threaded microprocessor claimed in claim 6 wherein said hardware state machine is operable to respond to a thread security configuration representing permitted direction of access between threads pairwise.

7A. The multi-threaded microprocessor claimed in claim 7 wherein said power control circuit is operable to activate or deactivate different parts of the at least one processor pipeline depending on the threads.

7B. The multi-threaded microprocessor claimed in claim 7 wherein said power control circuit is operable to establish different power voltages in different parts of the at least one processor pipeline depending on the threads.

7C. The multi-threaded microprocessor claimed in claim 7 wherein said power control circuit is operable to establish different clock rates in different parts of the at least one processor pipeline depending on the threads.

7D. The multi-threaded microprocessor claimed in claim 7 wherein said processor pipeline includes a plurality of decode pipelines and a plurality of execute pipelines.

7E. The multi-threaded microprocessor claimed in claim 7D wherein said power control circuit is operable to provide a thread-specific power control to different ones of said decode pipelines.

7F. The multi-threaded microprocessor claimed in claim 7D wherein said power control circuit is operable to provide a thread-specific power control to a respective number of said execute pipelines depending on how many execute pipelines are assigned to a given thread.

9A. The processor claimed in claim 9 wherein said issue circuitry includes a scoreboard for holding information representing issued instructions from the plural threads, said scoreboard coupled to said busy-control circuit.

9B. The processor claimed in claim 9 wherein said issue circuitry is operable as first and second issue circuits coupled respectively to the first and second decode pipelines and operable in a first mode substantially independently for different threads subject to said busy-control circuit and operable in a second mode with at least one issue circuit dependent on the other for issuing instructions from a single thread to both said first and second execute pipelines subject to said busy-control circuit.

9C. The processor claimed in claim 9 wherein said fetch unit includes an instruction queue for instructions from plural threads and a circuit coupled to said instruction queue for issuing a thread select signal to said issue circuitry to control which thread issues the next shared execution unit instruction when more than one shared execution unit instruction from plural threads are ready for issue concurrently.

10A. The processor claimed in claim 10 wherein said first pipeline has a first branch execution circuit and said second pipeline has another branch execution circuit, said first branch execution circuit and said other branch execution circuit each having substantially analogous circuitry to each other and operable in a first mode substantially independently for different threads and operable to be coupled in a second mode for executing branch instructions from a single thread and for detecting a mis-prediction by said branch prediction circuitry.

10B. The processor claimed in claim 10 wherein said first pipeline has a first branch execution circuit and said second pipeline has another branch execution circuit, and said first and second branch execution circuits are coupled to said global history buffer (GHB) to feed back mis-predicted branch information to said global history buffer (GHB).

10C. The processor claimed in claim 10 wherein said branch prediction circuitry includes a circuit operable to combine information from at least one said global history register (GHR) with thread identification information to access said shared global history buffer (GHB).

10D. The processor claimed in claim 10 further comprising a branch target buffer (BTB) coupled to said fetch unit and shared by the plural threads.

10E. The processor claimed in claim 10D wherein said first pipeline has a first branch execution circuit and said second pipeline has another branch execution circuit, and said processor further comprising a first-in-first-out (FIFO) circuit coupled to said branch target buffer (BTB) for thread-specifically supplying predicted taken branch target address information to said first and second branch execution circuits respectively.

10F. The processor claimed in claim 10 further comprising an instruction queue for instructions from plural threads and a circuit coupled to said instruction queue for issuing a thread select signal to control access to the global history buffer (GHB).

10G. The processor claimed in claim 10F wherein said instruction queue is operable to supply fill status for each thread to said circuit for issuing the thread select signal.

11A. The processor claimed in claim 11 further comprising a dependency scoreboard coupled to said issue circuitry, said dependency scoreboard having a write circuit coupled to said first and second single thread active lines and operable to enter information about each instruction as it issues, including a selected instruction given priority for write to the scoreboard during dual issue of instructions.

11B. The processor claimed in claim 11A wherein said dependency scoreboard has at least first and second storage arrays for different threads.

11C. The processor claimed in claim 11A wherein said dependency scoreboard has at least one storage array for dual issue of a thread and wherein said write circuit is responsive during at least dual issue of a single thread to assign priority for write to the scoreboard differently in response to the first single thread active line being active than the priority in response to the second single thread active line being active.

11D. The processor claimed in claim 11 further comprising a dependency scoreboard coupled with said issue circuitry and having a plurality of scoreboard inputs, and multiplexing circuitry coupled between said first and second issue queues and said scoreboard inputs in a manner to establish a mirror-image reversal of the coupling of the issue queues and scoreboard inputs depending on whether the first single thread active line is active or the second single thread active line is active.

11E. The processor claimed in claim 11D wherein said multiplexing circuitry is further coupled in a multithreading mode to establish coupling of the first issue queue to a first of the scoreboard inputs, and coupling of the second issue queue to a second of the scoreboard inputs for independent scoreboarding of the threads individually.

11F. The processor claimed in claim 11 having a dependency scoreboard coupled with said issue circuitry for in-order dual issue from the first and second issue queues of candidate instructions from a single thread, and responsive to said first single thread active line to prevent issuance of a candidate instruction from the second issue queue if a candidate instruction from the first issue queue is not issued, and responsive to said second single thread active line to prevent issuance of the candidate instruction from the first issue queue if the candidate instruction from the second issue queue is not issued.

11G. The processor claimed in claim 11 wherein said first pipeline has a first branch execution circuit and said second pipeline has another branch execution circuit, said first branch execution circuit and said other branch execution circuit each having substantially analogous circuitry to each other and operable substantially independently for different threads when both single thread active lines are inactive and operable when the first single thread active line is active for executing different branch instructions from a single thread based from the first branch execute circuit.

11H. The processor claimed in claim 11G wherein said second branch execute circuit is operable when the second single thread active line is active for executing different branch instructions from a single thread based from the second branch execute circuit.

12A. The processor claimed in claim 12 wherein said control circuitry is responsive after the second selected thread is launched and encounters a stall condition, to dual issue the first selected thread until the stall condition ceases.

12B. The processor claimed in claim 12A wherein said control circuitry is responsive after the first selected thread is launched and encounters a respective stall condition, to dual issue the second selected thread until the respective stall condition ceases.

12C. The processor claimed in claim 12 wherein said control circuitry is responsive after the second selected thread is launched and said control circuitry has a higher priority enabled third thread, to displace the second selected thread and launch the higher priority third thread instead.

12D. The processor claimed in claim 12 wherein said control circuitry is responsive after the second selected thread is launched and encounters a stall condition, to launch a third thread for execution until the stall condition ceases.

12E. The processor claimed in claim 12 wherein said control circuitry has a mode storage and said control circuitry is responsive to the mode storage after the second selected thread is launched and encounters a stall condition, to execute a mode selected from the group consisting of 1) stall the pipe for the second selected thread or 2) dual issue the first selected thread until the stall condition ceases or 3) launch a third thread for execution until the stall condition ceases.

12F. The processor claimed in claim 12 wherein said control circuitry is responsive after the one of the selected threads is launched and completes, to select a highest priority enabled third thread as a selected thread and launch said selected third thread for execution.

13A. The process of manufacturing claimed in claim 13 further comprising testing at least one said fabricated unit for thread execution efficiency in case of stall of a particular thread.

13B. The process of manufacturing claimed in claim 13 wherein the preparing design code step establishes plural modes of response to stall of a particular thread.

13C. The process of manufacturing claimed in claim 13 further comprising assembling the multithreaded superscalar processor units into telecommunications units.

13D. The process of manufacturing claimed in claim 13C further comprising conducting higher-level system tests on at least one of the telecommunications units.

13E. The process of manufacturing claimed in claim 13 further comprising assembling systems each including at least one of the multithreaded superscalar processor units combined with at least one nonvolatile memory having multithreaded configuration information.

14A. The processor claimed in claim 14 further comprising at least two global history registers (GHRs) for branch histories of the two threads and coupled to said scratch memory for transfer of data for said at least one additional thread from said scratch memory to at least one of said GHRs.

14B. The processor claimed in claim 14 further comprising at least two sets of status/control registers for the two threads and coupled to said scratch memory for transfer of data for said at least one additional thread from said scratch memory to at least one of said sets of status/control registers.

14C. The processor claimed in claim 14 wherein the processor is operable for Load/Store Multiple operations on the scratch memory and register files.

14D. The processor claimed in claim 14 wherein the processor is responsive to an interrupt to transfer the data.

14E. The processor claimed in claim 14 wherein the processor is operable to complete a transfer of the data and then launch the additional thread.

14F. The processor claimed in claim 14 wherein the processor is responsive to at least one kind of cache miss to transfer the data.

Notes: Aspects are paragraphs of detailed description which might be offered as claims in patent prosecution. The above dependently-written Aspects have leading digits and internal dependency designations to indicate the claims or aspects to which they pertain. Aspects having no internal dependency designations have leading digits and alphanumerics to indicate the position in the ordering of claims at which they might be situated if offered as claims in prosecution.

Other Types of Embodiments

Some embodiments only use selected portions of the branch prediction function described herein. Various optimizations for speed, scaling, critical path avoidance, and regularity of physical implementation are suitably provided as suggested by and according to the teachings herein.

The multithreading improvements are suitably replicated for different types of pipelines in the same processor or repeated in different processors in the same system. For instance, in FIG. 2, any one, some or all of the RISC and DSP and other processors in the system are suitably improved to deliver superscalar multi-threaded embodiments described herein. Suppose RISC processor 1105 is a first processor so improved. Then one or more additional microprocessors such as DSP 1110, and the RISC and/or DSP in block 1420, and the processor in WLAN 1500 are also suitably improved with the advantageous multithreading embodiments. AFE 1530 in WLAN 1500, and Bluetooth block 1430 are examples of additional wireless interfaces coupled to the additional microprocessors. Other improved symmetric multithreading circuits as taught herein are also suitably used in each given additional microprocessor.

The branch prediction described herein facilitates operations in RISC (reduced instruction set computing), CISC (complex instruction set computing), DSP (digital signal processors), microcontrollers, PC (personal computer) main microprocessors, math coprocessors, VLIW (very long instruction word), SIMD (single instruction multiple data) and MIMD (multiple instruction multiple data) processors and coprocessors as multithreaded multiple cores or standalone multithreaded integrated circuits, and in other integrated circuits and arrays. The branch prediction described herein is useful in various execute pipelines, coprocessor execute pipelines, load-store pipelines, fetch pipelines, decode pipelines, in order pipelines, out of order pipelines, single issue pipelines, dual-issue and multiple issue pipelines, skewed pipelines, and other pipelines and is applied in a manner appropriate to the particular functions of each of such pipelines.

Various embodiments as taught herein are useful in other types of pipelined integrated circuits such as ASICs (application specific integrated circuits) and gate arrays and to all circuits with a pipeline and other structures involving processes, dependencies and analogous problems to which the advantages of the improvements described herein commend their use. Other structures besides microprocessor pipelines can be improved by the processes and structures, such as a 10 GHz or other high speed gate array.

In addition to inventive structures, devices, apparatus and systems, processes are represented and described using any and all of the block diagrams, logic diagrams, and flow diagrams herein. Block diagram blocks are used to represent both structures as understood by those of ordinary skill in the art as well as process steps and portions of process flows. Similarly, logic elements in the diagrams represent both electronic structures and process steps and portions of process flows. Flow diagram symbols herein represent process steps and portions of process flows, states, and transitions in software and hardware embodiments as well as portions of structure in various embodiments of the invention.

It is emphasized that the flow diagrams of FIG. 8D-1 and FIGS. 13-18 are generally illustrative of a variety of ways of establishing the flow and the specific order and interconnection of steps is suitably established by the skilled worker to accomplish the operations intended. It is noted that, in some software and hardware and mixed software/hardware embodiments, the steps that execute instructions as well as steps that perform other operations in the flow diagrams are suitably parallelized and performed for all the source operands and pipestages concurrently. Other embodiments in hardware or software or mixed hardware and software do the steps serially. Some embodiments virtualize or establish in software form advantageous features taught and suggested herein.

A few preferred embodiments have been described in detail hereinabove. It is to be understood that the scope of the invention comprehends embodiments different from those described yet within the inventive scope. Microprocessor and microcomputer are synonymous herein. Processing circuitry comprehends digital, analog and mixed signal (digital/analog) integrated circuits, digital computer circuitry, ASIC circuits, PALs, PLAs, decoders, memories, non-software based processors, and other circuitry, and processing circuitry cores including microprocessors and microcomputers of any architecture, or combinations thereof. Internal and external couplings and connections can be ohmic, capacitive, direct or indirect via intervening circuits or otherwise as desirable. Implementation is contemplated in discrete components or fully integrated circuits in any materials family and combinations thereof. Various embodiments of the invention employ hardware, software or firmware. Process diagrams herein are representative of flow diagrams for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in either the detailed description and the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. A microprocessor comprising:
   (A) clock signal circuitry having clock outputs of different frequency rates;
   (B) power supply circuitry having voltage outputs of different voltages;
   (C) thread pipelines having clock signal inputs and voltage inputs; and
   (E) thread register control circuitry having inputs coupled to the clock outputs and the voltage outputs, and having outputs coupled to the clock signal inputs and voltage inputs of the thread pipelines, the thread register control circuitry including thread power management circuitry having registers for thread identification, pipe clock rate, and pipe voltage.

2. The microprocessor of claim 1 in which a register for thread identification corresponds to one register for pipe clock rate and one register for pipe voltage.

3. The microprocessor of claim 1 in which there are multiple registers for thread identification.

4. The microprocessor of claim 1 in which there are multiple registers for thread identification, and in which a register for thread identification corresponds to one register for pipe clock rate and one register for pipe voltage.

5. The microprocessor of claim 1 in which a thread pipeline includes a decode pipe having a clock input and a voltage input, and an execute pipe having a clock input and a voltage input separate from those of the decode pipe.

\* \* \* \* \*